US009501097B2

(12) United States Patent
Moser

(10) Patent No.: US 9,501,097 B2
(45) Date of Patent: Nov. 22, 2016

(54) MULTITASKING PORTABLE COMPUTER

(76) Inventor: George Moser, Redwood City, CA (US)

( * ) Notice: Subject to any disclaimer, the term of this patent is extended or adjusted under 35 U.S.C. 154(b) by 1133 days.

(21) Appl. No.: 13/046,778

(22) Filed: Mar. 14, 2011

(65) Prior Publication Data

US 2012/0274565 A1 Nov. 1, 2012

Related U.S. Application Data

(60) Provisional application No. 61/458,849, filed on Dec. 2, 2010.

(51) Int. Cl.
*G09G 3/36* (2006.01)
*G06F 1/16* (2006.01)

(52) U.S. Cl.
CPC ............. *G06F 1/1616* (2013.01); *G06F 1/166* (2013.01); *G06F 1/1647* (2013.01); *G06F 1/1649* (2013.01); *G06F 1/1654* (2013.01); *G06F 1/1662* (2013.01)

(58) Field of Classification Search
CPC .......... G06F 3/041; G06F 3/02; G06F 3/038; G06F 5/00; G06F 1/16
See application file for complete search history.

(56) References Cited

U.S. PATENT DOCUMENTS

| | | | | |
|---|---|---|---|---|
| 5,583,539 | A * | 12/1996 | Hiketa | G06F 3/0238 345/173 |
| 5,692,330 | A * | 12/1997 | Anderson, Jr. | G09F 11/025 40/473 |
| 6,414,842 | B1 * | 7/2002 | Cipolla | G06F 1/1616 361/679.46 |
| 7,127,776 | B2 | 10/2006 | Park | |
| 7,221,330 | B2 | 5/2007 | Finke-Anlauff | |
| 7,656,652 | B2 | 2/2010 | Moser | |
| 7,724,328 | B2 | 5/2010 | Kim et al. | |
| 8,264,829 | B2 | 9/2012 | Moser | |
| 2002/0075236 | A1 | 6/2002 | Danzyger et al. | |
| 2004/0212598 | A1 | 10/2004 | Kraus et al. | |
| 2006/0082518 | A1 * | 4/2006 | Ram | G06F 1/1601 345/1.1 |
| 2007/0013662 | A1 | 1/2007 | Fauth | |
| 2007/0075915 | A1 | 4/2007 | Cheon et al. | |
| 2007/0268264 | A1 | 11/2007 | Aarras et al. | |
| 2008/0062625 | A1 | 3/2008 | Batio | |
| 2008/0309254 | A1 | 12/2008 | Berger | |
| 2009/0033522 | A1 | 2/2009 | Skillman et al. | |
| 2011/0199319 | A1 | 8/2011 | Moser | |
| 2011/0199726 | A1 | 8/2011 | Moser | |
| 2011/0216483 | A1 * | 9/2011 | Vesely | B60N 3/004 361/679.01 |
| 2011/0248967 | A1 * | 10/2011 | Wang | G09G 3/344 345/204 |
| 2012/0274565 | A1 * | 11/2012 | Moser | G06F 1/1616 345/168 |

FOREIGN PATENT DOCUMENTS

WO WO2012024337 A1 2/2012

OTHER PUBLICATIONS

PCT Search Report, PCT Appln PCT/US11/47985, Jan. 5, 2012, 13 pages.
PCT International Search Report, PCT Application No. PCT/US11/62975, Apr. 3, 2012, 3 pages.

* cited by examiner

*Primary Examiner* — Tony N Ngo
(74) *Attorney, Agent, or Firm* — Brad Bertoglio

(57) ABSTRACT

A portable computer is provided having a first display panel in a display unit, a second display panel in a base unit, and a keyboard structure requiring less surface area than conventional keyboards. Keyboard keys are at least partially transparent, revealing an underlying display panel. The display panel can display a plurality of icons that may be alternatively associated with each key, such that keyboard input can be achieved using a reduced quantity of keys.

18 Claims, 72 Drawing Sheets section X-X

Multitasking Laptop

Instructions for first time users

*How to turn on one of the screens?*
Drag the cursor to that screen. It will turn on automatically.

*How to turn off a screen?*
Left-click anywhere on that screen, and click on 1st option.

Turn off this screen
Make this screen your default screen
Turn on both screens when PC starts
Organize icons on this screen
Graphics Properties
Graphics Options
New
Personalize

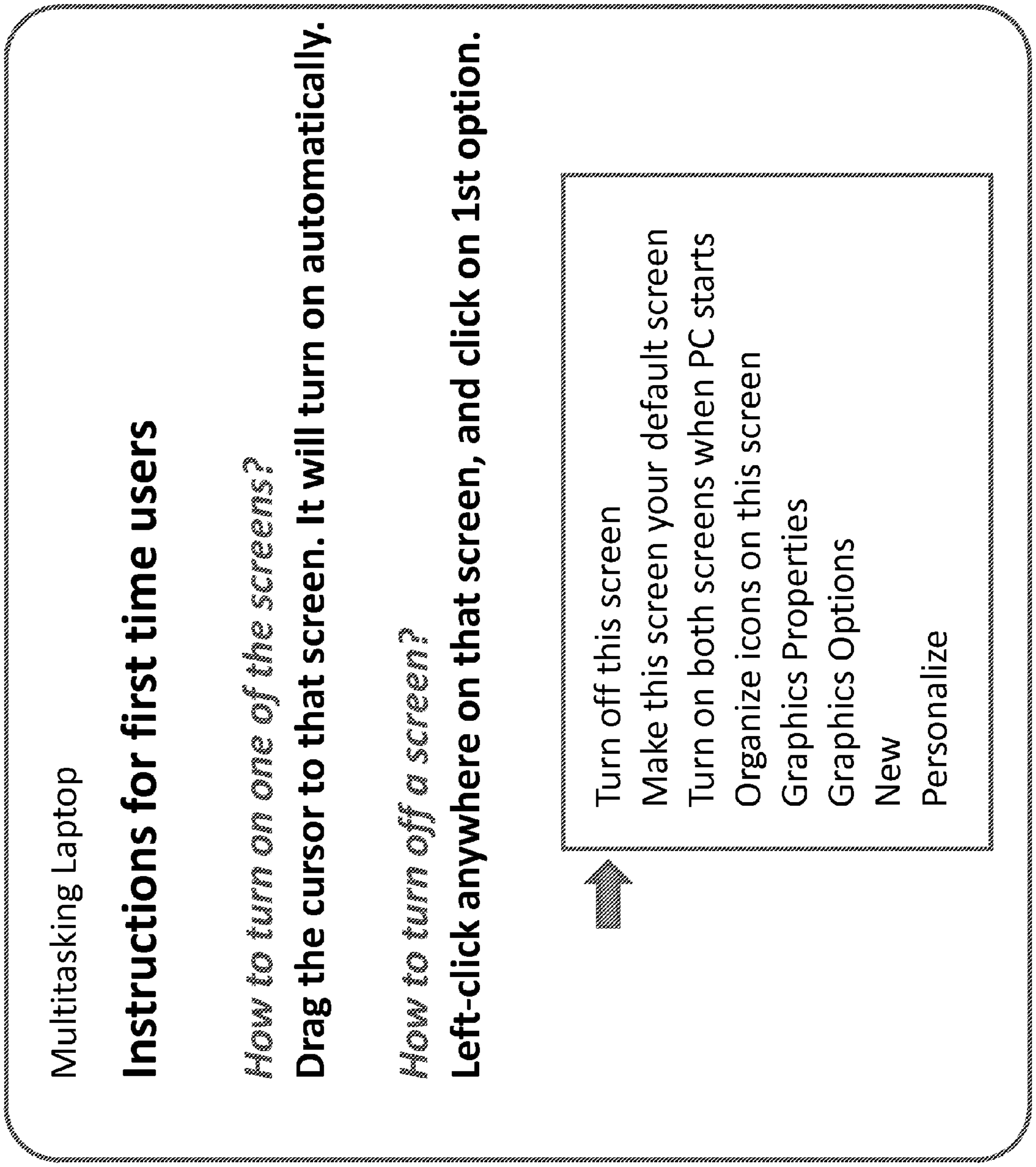

Fig. 83

Multitasking Laptop

Instructions for first time users

*How can I transfer objects from screen to screen?*
You can drag them over with the mouse. You can also cut objects in one screen and paste them in another screen.

*How can I send the results of a task to a particular screen?*
Define that screen as your OutputScreen by left-clicking on it and then selecting option 1 (assign task to this screen).

*How can I re-assign a task to another screen?*
Left-click on the task icon and choose Option 1.

Assign task to this screen
Assign task to the other screen
Cut
Start task (on this screen)
Delete
Properties

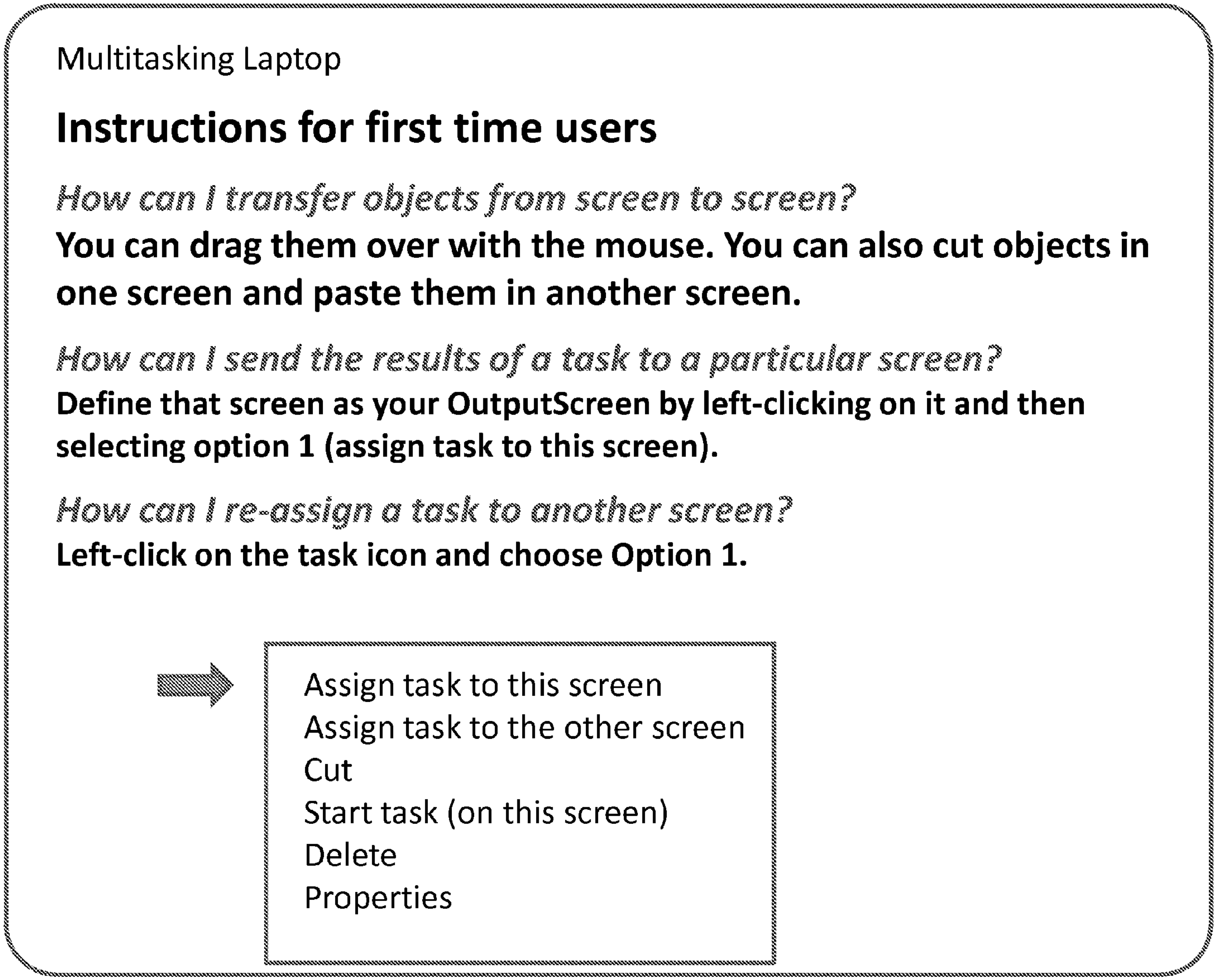

Fig. 86

MULTITASKING PORTABLE COMPUTER

FIELD OF THE INVENTION

The present invention relates in general to the computer field, and in particular, to portable computers.

BACKGROUND OF THE INVENTION

Laptop computers have grown in popularity and usage across the world because of their portability and growing computing power and speed. However, some major shortcomings remain, some of which are addressed by aspects of this invention. One of those major shortcomings is the limited ability of a user to multitask on a conventional laptop. Even through the modern CPUs, chipsets and busses are already amply able in many cases to provide computational power sufficient to support multitasking by the user, in many instances, traditional hardware form factors and software architecture makes the simultaneous performance of multiple tasks difficult or cumbersome.

FIGS. 1 and 2 show a typical prior art laptop computer 10. This configuration, commonly referred to as a clamshell configuration, includes base unit 12, which is rotatable connected to display unit 11 through hinges 15 and 16. The base unit 12 includes a keyboard 14, touch buttons 17 and 18 and a touchpad 19. The touchpad and the touch buttons are needed when the user does not have a mouse handy, for instance during travel. The display unit 11 includes a display panel 13, typically an LCD panel.

A common challenge for many computer users is the need to see more than one document or image at the same time. For instance, when working on a document, the need often comes up to compare with another document. However, splitting the screen to display the two documents side by side on conventional display panel 13 typically makes the documents so small that they are difficult to read. Another possibility is to print one of the documents and hold it close to the screen. However, a printer is not always available. Printing documents for comparison purposes can also be a costly and wasteful process. Another solution is to close or minimize one document being compared, and open a second document, and then switching back and forth between the two documents being compared. For many users, that process can be time-consuming, ineffective, tiring and failure-prone.

With the increasing use of the Internet, the need for consulting multiple sources of information on a computer has increased dramatically. For instance, while working on one document, the need will often arise to search for some information online and then incorporate it into the document. Users also have a need to frequently check for emails without necessarily closing the job they are working on.

FIG. 3 shows a prior art solution that attempts to at least partly address the above-described issues. An external monitor 20 with display panel 22 is connected via a video cable 21 to portable computer 10. The external monitor 20 acts as a slave screen, with the computer's display panel 13 becoming a master screen. Objects from the master screen can be dragged with the mouse over to the slave screen. This arrangement of FIG. 3 can provide significant productivity advantages for many tasks. However, the arrangement of FIG. 3 also presents significant compromises. It is not a portable solution. Also, this solution can be costly and require significant amounts of physical desk space.

Attempts have been made to provide a second screen on a portable computer. U.S. Pat. No. 7,221,330, issued to Finke-Anlauff, discloses a folding terminal (cell phone, PDA, laptop, or similar) where the base is equipped with a second screen. The main screen can be rotated until it is substantially parallel to the secondary screen, with the two screens effectively forming a larger aggregate screen in the same plane. Sliders attached to the sides make it possible to keep the device in this flat configuration while working. In a separate embodiment, this device can also used in a regular clamshell laptop configuration, but with two screens. However, while the '330 patent provides additional screen area, the formation of a single coplanar screen when sliders lock the device into a flat configuration may be objectionable to some users due to the visual gap between first and second display panels, and challenges in placing the device in a comfortable and stable working position. Additionally, the keyboard still occupies as significant portion of the bottom screen, limiting its usefulness. The viewing angle of the bottom screen during regular use may present challenges with user visibility.

Another portable computer with dual display panels is described in U.S. Pat. No. 7,127,776, issued to Park, which discloses a hinge mechanism and a computer wherein the special hinge can be used to position the two screens parallel to each other in approximately the same plane, forming a larger aggregate screen. This invention presents some of the same compromises as the Finke-Anlauff patent, such as the parting line between the two screens and the impracticality to handle such a large and unwieldy aggregate screen. In addition, Park does not provide a physical keyboard, instead relying entirely on touch screen input, which can be undesirable for many users of laptop computers. Many laptops users desire a comfortable physical keyboard, with tactile feedback, that lets them enter text and data at the normal speed and reliability of a typical laptop keyboard. Also, embodiments illustrated in the Park patent may also present obstacles with achieving a proper viewing angle of the base screen.

Therefore the need for a practical solution that facilitates multitasking by users on a laptop computer still persists.

SUMMARY OF THE INVENTION

In accordance with one aspect of the invention, a portable computer system is provided having a display unit and base unit connected in a clamshell configuration via a hinge structure, such that a front surface of the base unit and a front surface of the display unit can fold adjacent to one another for, e.g., portability. A first display panel is mounted within the display unit, and a second display panel is mounted within the base unit. The first and second display panels both occupy the majority of the surface area of the surface on which they are mounted. A third display panel is provided in the base unit, smaller than the second display panel. Preferably, the second display panel occupies at least 3-4 times the surface area of the third display panel. A keyboard structure overlays the third display panel. The keyboard structure may include at least portions that are transparent, enabling light from the third display panel to pass through the keyboard for observation by a user. The third display panel displays icons beneath each key indicative of the operation associated with each key. In some embodiments, the keyboard structure may include two groups of keys separated to provide improved ergonomics. A touchpad surface may be situated between the first and second groups of keys. A function key can be provided to alter the image and operation associated with some or all of the keys.

In accordance with another aspect of the invention, a portable computer is provided having a first display panel in the display unit, a second display panel in the base unit, and a primary motherboard providing a video output driving at least one of the first and second display panels. In some embodiments, the first and second display panels are provided with master and slave video outputs from the motherboard. In other embodiments, the motherboard may contain a graphics controller, and a video router receiving the output of the graphics controller, and selectively routing the graphics controller output to the first or second display panels. In other embodiments, the portable computer includes two graphics controllers, each providing an image output signal to one of the two display panels. The motherboard can be disposed within the base unit or within the display unit.

In yet other embodiments of the invention, two motherboards are provided, each containing a graphics processor. One motherboard is disposed within the display unit to provide a video signal to the display unit display panel, while a second motherboard is disposed within the base unit to provide a video signal to the base unit display panel.

Optionally, the display unit can be removably attached to the base unit via, e.g., at least one connector. The display unit may include a battery and data storage device, such that it is operable both when attached to and when detached from the base unit. The base unit may include a supplemental data storage unit accessible to the display unit motherboard when the display unit is engaged with the base unit.

In some embodiments, the display unit can be removably engaged with the base unit in either a landscape or portrait orientation. The base unit includes one or more connectors adapted for removable engagement with one or more corresponding receptacles in the display unit. Sets of receptacles may be provided along adjacent edges of the display unit to provide multiple orientations for engagement with the base unit.

In accordance with another aspect of the invention, a portable computer system includes features enabling the adjustment of the portable computer position during use. For example, a support structure can be moved between stowed and deployed positions. The support structure may be hinged along an axis coextensive with, and/or parallel to, the hinge structure connecting the portable computer base unit and display unit, and extendable downwards from the bottom side of the base unit. A recess can be provided with the base unit to stow the support structure when not in use. In some embodiments, the support structure will be a telescoping member, such that its length can be adjusted by a user.

Some embodiments of the portable computer further include a base unit display hinge connecting a second display panel with the base unit along one edge of the second display panel, such as the front edge of the second display panel, so that the angle of the second display panel can be readily adjusted.

In accordance with another aspect of the invention, a keyboard can be provided which is selectively deployed from and retracted within a recess in the front edge of the base unit.

In accordance with other aspects of the invention, computer keyboards are provided which reduce the key count and surface area of the keyboard without necessarily reducing the size of each key. Specifically, a computer keyboard includes a display panel, and a key positioned on the display panel. The key includes a keycap having a top surface generally parallel with the display panel. At least a portion of the keycap (such as the center portion) is transparent, to reveal a portion of the display panel underneath. The brightness or intensity of the display panel output can be controlled to provide optimal appearance in different lighting conditions. A stem extends from the underside of the keycap, towards the display panel. An elastic membrane cradles the keycap within a cup portion and is curved, e.g. in a dome structure, to bias the keycap away from the display panel. However, application of pressure to the keycap deforms the display panel and activates a contact switch, thereby indicating actuation of the key.

In some embodiments, a normally-open contact switch is provided to facilitate keypress detection. The contact switch is comprised of a first layer substantially adjacent to the display panel. An insulating layer blankets the first layer, and separates the first layer from a second layer. Gaps are provided in the insulating layer to form a recess where conductive pads are placed on the topside of the first layer and the bottomside of the second layer. Application of pressure to the contact switch structure causes the second layer to deform, such that the conductive pads contact one another.

In accordance with another aspect of the invention, a portable computer is provided incorporating the keyboard structures described herein. The portable computer can include controls enabling a user to vary the intensity of a backlight within an LCD underlying the keyboard structures. They keyboard can include keycaps having transparent center portions and non-transparent peripheries, such that a keycap stem, and optionally other components of the keyboard, lie beneath the non-transparent periphery of the keycap, such that only the underlying display panel is visible through the transparent center portion.

According to some portable computer embodiments of the invention, the portable computer base unit features a display panel with keyboard keys overlaying only a portion of the display, such as a minority of the display surface area, preferably less than one-quarter or one-fifth of the display. In such embodiments, the display panel can be utilized both as an auxiliary computer display, as well as a mechanism for displaying variable keyboard symbols beneath transparent keys. The keys may be arranged in three rows, with a function select key utilized to alter both the image displayed beneath some or all of the keys, as well as the operation associated with those keys. In some embodiments, the function key alternates between a first keyboard arrangement comprised primarily of letters, and a second keyboard arrangement comprised primarily of numbers and symbols.

In accordance with another aspect of the invention, a computer keyboard is comprised of a display panel and keys overlaying the display panel. Each key includes a keycap having a top surface generally parallel with the display panel, with at least a portion of the top surface being transparent. A stem extends from the underside of the keycap, towards the display panel. A transparent layer overlays the display panel, and a spring (such as a coil spring), or a compressible member (such as rubber or foam), is disposed between the transparent layer and the keycap to normally bias the keycap away from the display panel. The stem includes a conductive path electrically connecting first and second portions of the stem, and the transparent layer includes two conductive pads. When the keycap is depressed, the spring or compressible member compresses, and the first and second portions of the stem contact the transparent layer conductive pads to close a circuit and indicate actuation of the keyboard key.

In accordance with another aspect of the invention, a subsurface keyboard is provided with a tactile key mechanism underlying a generally flat surface. The keyboard includes a flexible, elastic top layer, such as a silicone film, oriented above and generally parallel with a display panel. At least a portion of the top layer corresponding to the location of keys is transparent, allowing visibility to the display panel beneath. A grid is disposed between the top layer and display panel. The grid is preferably transparent, and comprised of a plurality of walls running in perpendicular directions to define a compartment corresponding to each of the plurality of keys. Sliding platforms are positioned within the compartments defined by the grid. The sliding platforms may include stems extending downwards towards the display panel. An elastic layer forms a flexible dome beneath each sliding platform, cupping the sliding platform stem, and operating to bias the sliding platform away from the display panel and towards the top layer. The flexible dome structure may also include a secondary stem extending downwards towards a normally-open contact switch, which is positioned beneath each of the sliding platforms. When pressure is applied to the top layer proximate one of the sliding platforms, the top layer deforms downwards, the elastic dome underlying the sliding platform deforms downwards, and the sliding platform closes its associated contact switch, thereby indicating actuation of the key.

In some embodiments of the subsurface keyboard, the elastic top layer includes a plurality of folds extending downwards towards the sliding platform, such that application of pressure to one of the folds causes the top layer to elastically unfold and deform downwards towards the display panel, thereby providing an elastic tactile response to depression of a key.

In accordance with another aspect of the invention, a subsurface keyboard is provided which utilizes optical means of detecting a keypress. For example, the keyboard may include a display panel, and an elastic top layer oriented above and parallel to the display panel. A transparent grid defining compartments arranged in rows and columns is disposed between the top layer and display panel. Column light emitters are oriented near a first end of each column, transmitting a light signal along the length of each column. Column light receivers are positioned on the opposite end of each column, to detect receipt of the signal emitted by the corresponding column light emitter. Similarly, row light emitters are oriented near a first end of each row, transmitting a light signal along the length of each row. Row light receivers are positioned on the opposite end of each row, to detect receipt of the signal emitted by the corresponding row light emitter. A controller detects the outputs of the column light receivers and row light receivers to identify a grid compartment associated with obstruction of one or more light emitter signals. When pressure is applied to the top layer above one of the grid compartments, the top layer deforms downwards, interrupting light signals emitted by a row light emitter and a column light emitter, thereby generating light receiver output indicative of the grid compartment above which pressure was applied.

In some embodiments, the grid may be formed in a plane parallel with the underside of the to layer, with a matrix of substantially round, concave depressions extending downwards therefrom, where each depression corresponds to a key in a keyboard. In other embodiments, the grid is comprised of two portions. A first portion is formed in a plane parallel with the underside of the to layer, with a matrix of substantially round, concave depressions extending downwards therefrom. A second portion is formed in a plane parallel with, and proximate to, the display panel, with a matrix of substantially round, convex protrusions extending upwards therefrom. The first and second portions of the grid are oriented relative to one another such that each concave, downward protrusion from the first portion corresponds to a convex, upward protrusion in the second portion.

In accordance with another aspect of the invention, a subsurface keyboard provides a tactile key response while utilizing a touchscreen display panel to detect the location of key actuations. The keyboard includes a touchscreen display panel and elastic top layer. A rectangular grid is disposed between the top layer and touchscreen panel. Sliding platforms are disposed within compartments formed by the grid, and made from a material for which contact may be detected by the touchscreen display panel, such as a conductive material. Application of pressure to the top layer causes the top layer to deform downwards, moving a sliding platform to contact the display panel at a position uniquely associated with a selected key.

In accordance with another aspect of the invention, a method is provided for controlling the display of information in a portable computer having first and second display screens. The method includes the step of determining a user preference selection for each of a plurality of processes that generates video output. When one of those processes is initiated by the computer CPU, the CPU conveys an output signal to a graphics controller, as well as an output signal indicative of a user preference display selection. The graphics controller generates an output signal, which is selectively routed by a video router to either the first or second display screen, based on the CPU output signal indicative of the user display preference.

These and other aspects of the invention will be apparent to a person of ordinary skill in view of the disclosure herein.

BRIEF DESCRIPTION OF THE DRAWINGS

FIGS. 83-86 illustrate instructions and assistance that can be displayed to users in the embodiment of FIG. 82.

DETAILED DESCRIPTION OF THE DRAWINGS

Figure 2:
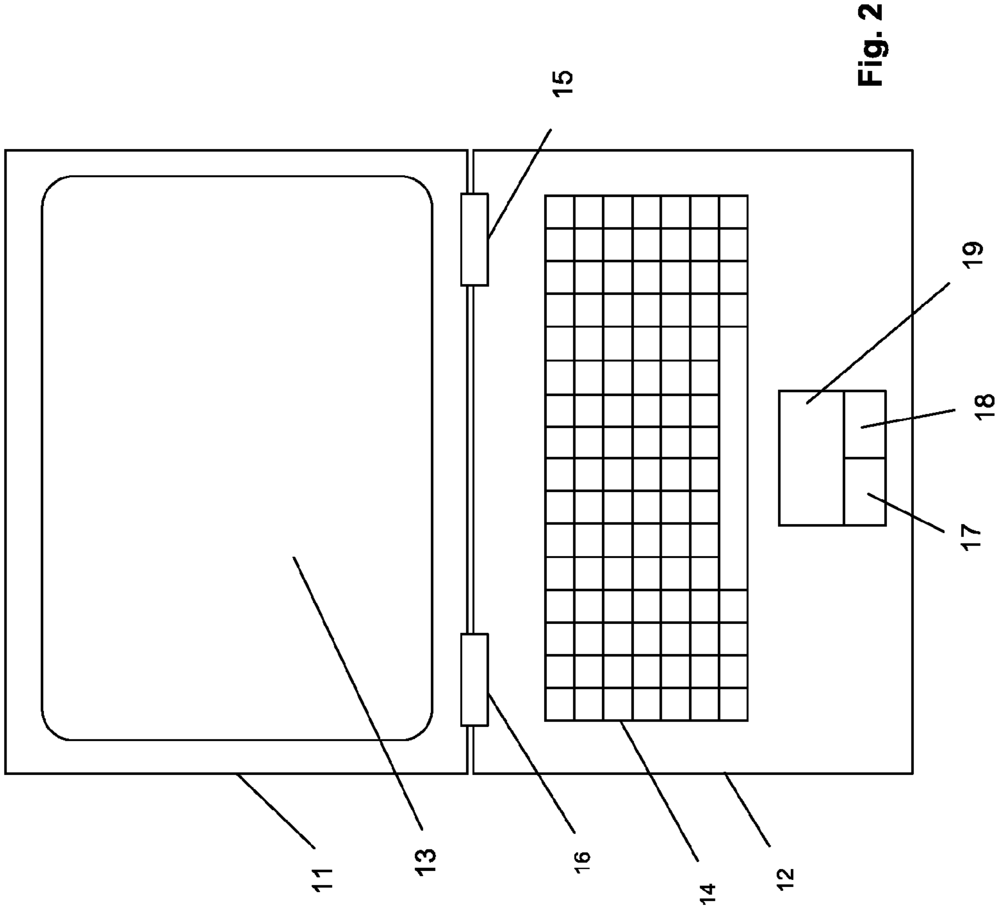
FIG. 2 is a top plan view of a prior art portable computer.
Figure 1:
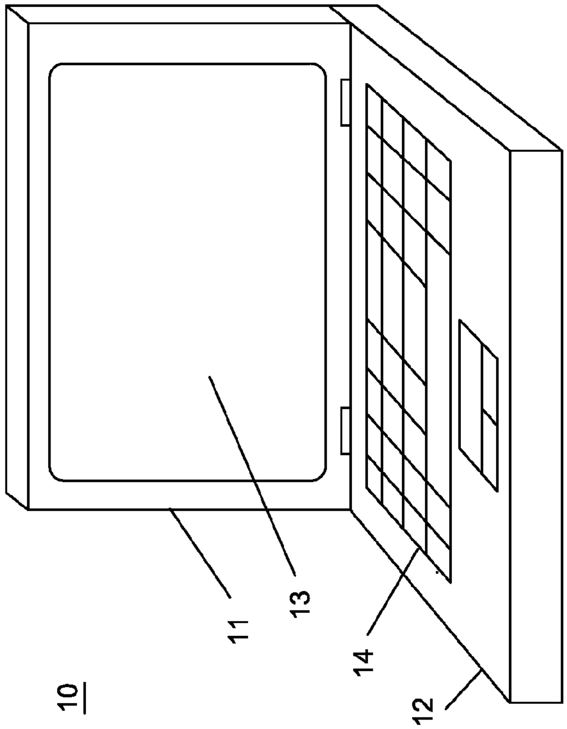
FIG. 1 is a perspective view of a prior art portable computer.
Figure 3:
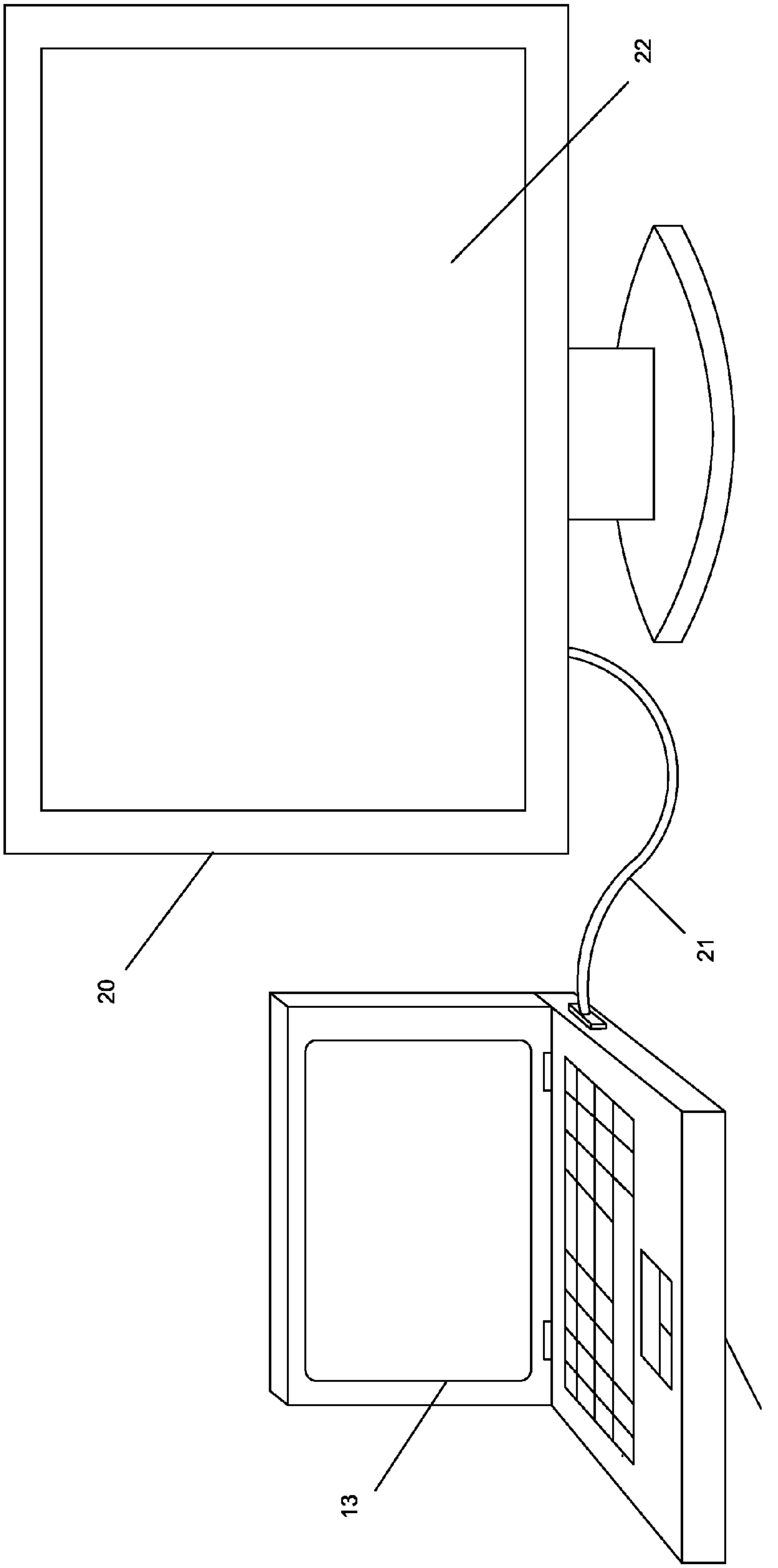
FIG. 3 is a perspective view of a prior art portable computer connected to an external monitor.

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to the embodiments illustrated.

Figure 4:
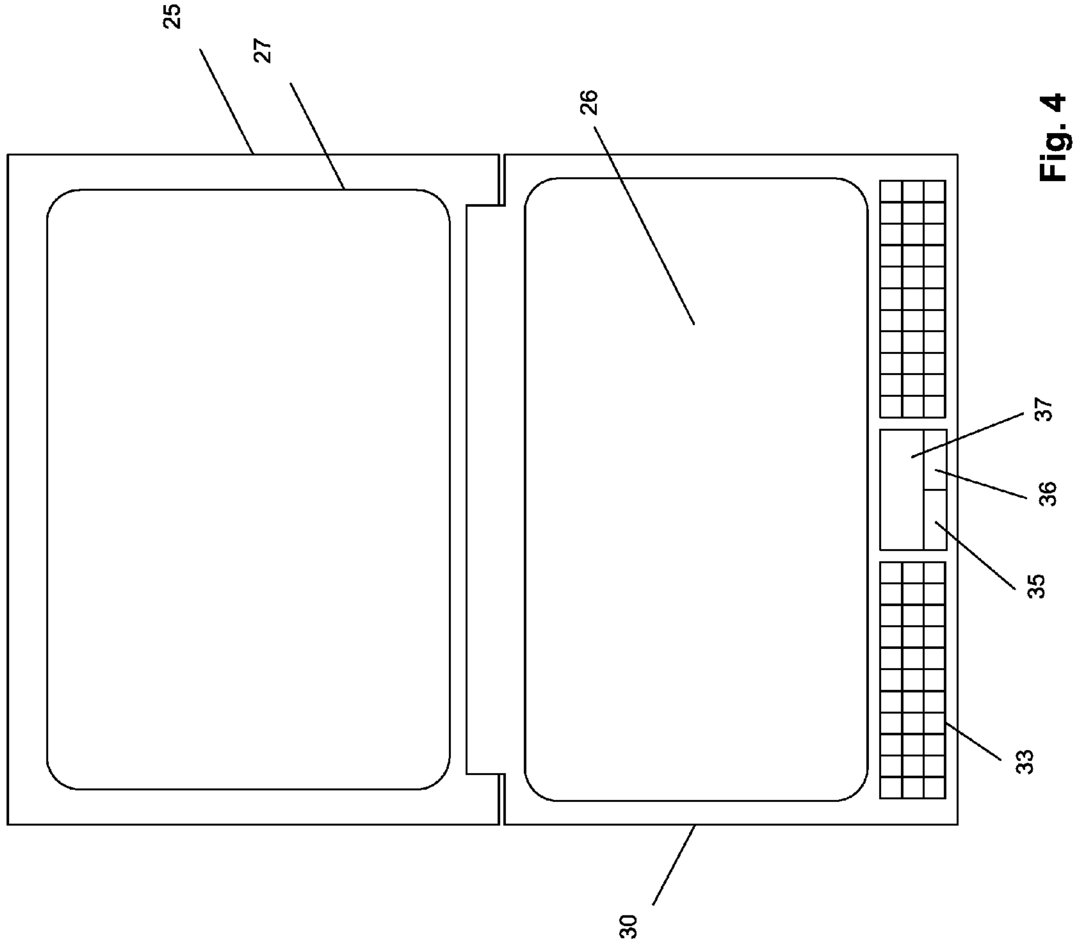
FIG. 4 is a top plan view of a portable computer in accordance with one embodiment of the invention.

In accordance with one embodiment of the invention, FIG. 4 shows a laptop computer having a base portion 30 and display portion 25. Display portion 25 includes first screen 27. Base portion 30 includes a second screen 26, a keyboard 33, a touchpad 37 and touch buttons 35 and 36. To provide greater usability, particularly in multitasking applications, the second screen 26 is preferably of substantial size, such as a size substantially similar to the size of the first screen 27. However, current keyboards occupy the majority of the available space on conventional portable computer base portions. Merely shrinking the size of the keyboard by reducing key size and spacing can significantly impact the user's comfort, typing speed and accuracy. Therefore, alternative keyboard configurations may be advantageously utilized, as described further below.

While the portable computer of FIG. 4 provides a secondary screen 26 within base unit 30, it may be desirable to adjust the physical orientation of base unit 30 to improve the user's viewing angle of screen 26. LCD panels can be viewed only at certain angles, often referred to as the viewing cone. Even within the viewing cone, the brightness and contrast of a display may be improved at certain angles. Therefore, the portable computer of FIG. 4 further includes a mechanism to adjust the viewing angle of base 30, illustrated in FIG. 5.

Figure 5:
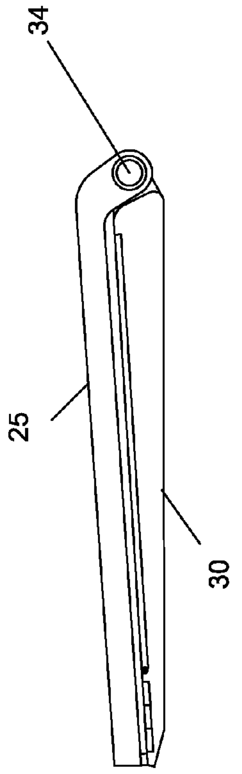
FIG. 5 is a side elevation of a portable computer in accordance with the embodiment of FIG. 4, shown in closed position.

FIG. 5 shows a side view of the enhanced portable computer of FIG. 4, with display unit 25 hinged to the base 30 around a pivot 34.

Figure 6:
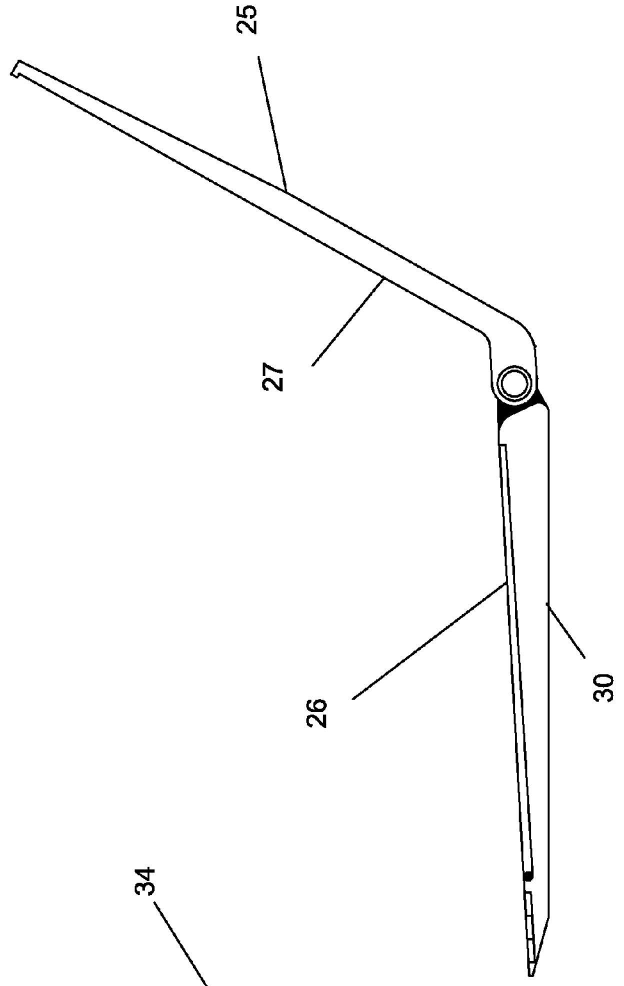
FIG. 6 is a side elevation of the portable computer of FIG. 5, shown in open position.

FIG. 6 shows the enhanced portable computer of FIG. 5 in open position, with primary display unit 27 and base display unit 26. The base display unit 26 is still in a retracted position, offering limited visibility and convenience to the user due to its angle of view.

Figure 7:
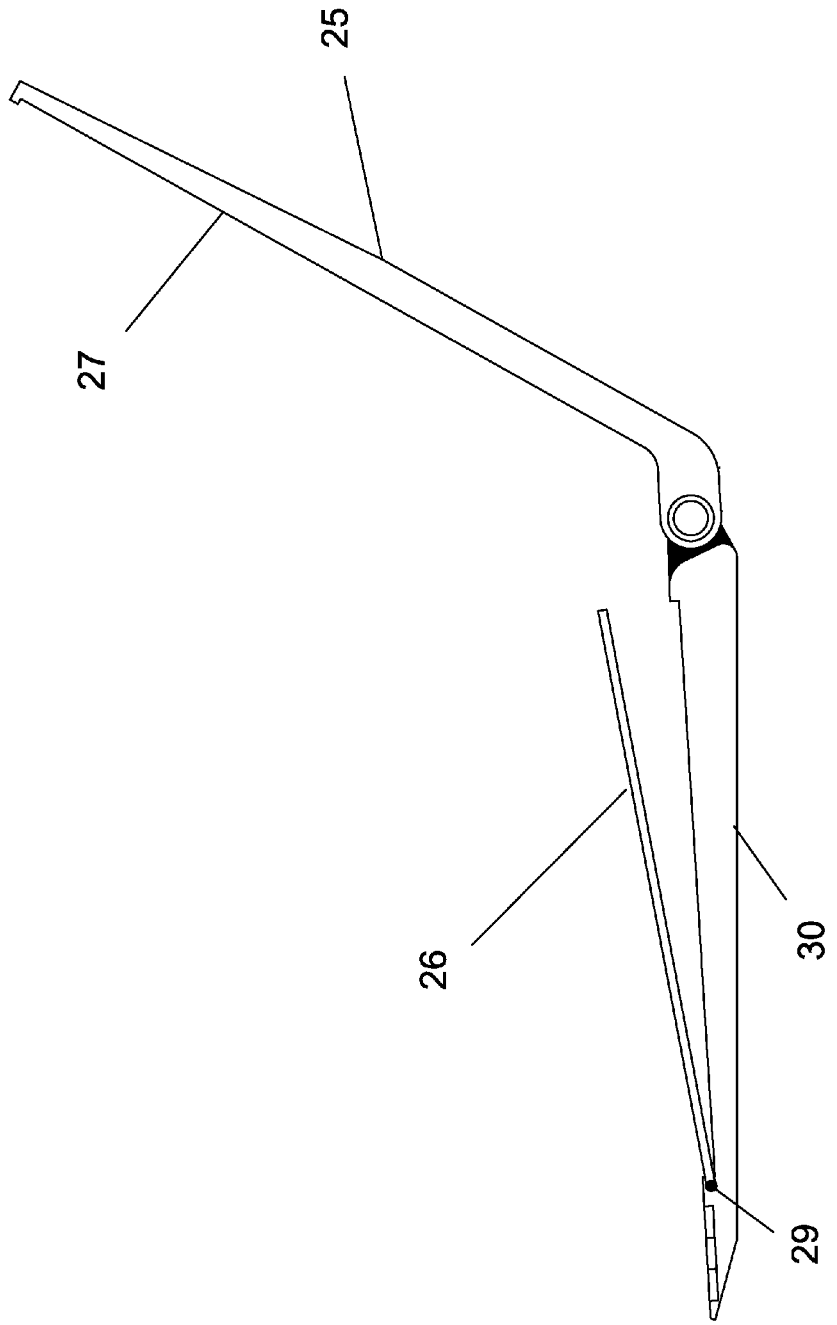
FIG. 7 is a side elevation of the portable computer of FIGS. 5 and 6, with the base display panel deployed.

FIG. 7 shows the enhanced portable computer of FIG. 6, in which base display unit 26 has been deployed by lifting it with respect to the base around its friction hinge 29.

Figure 8:
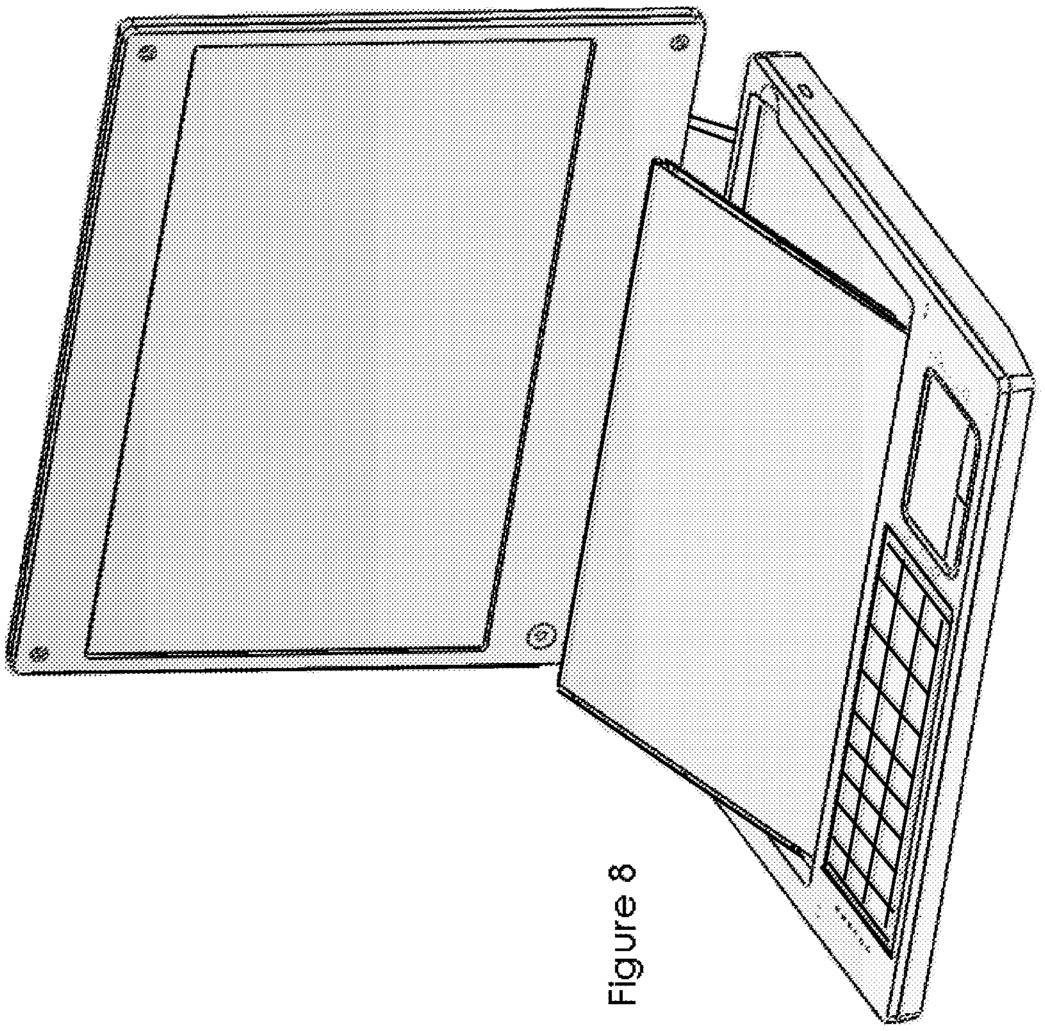
FIG. 8 is a perspective view of the portable computer with the base display panel deployed.
Figure 9:
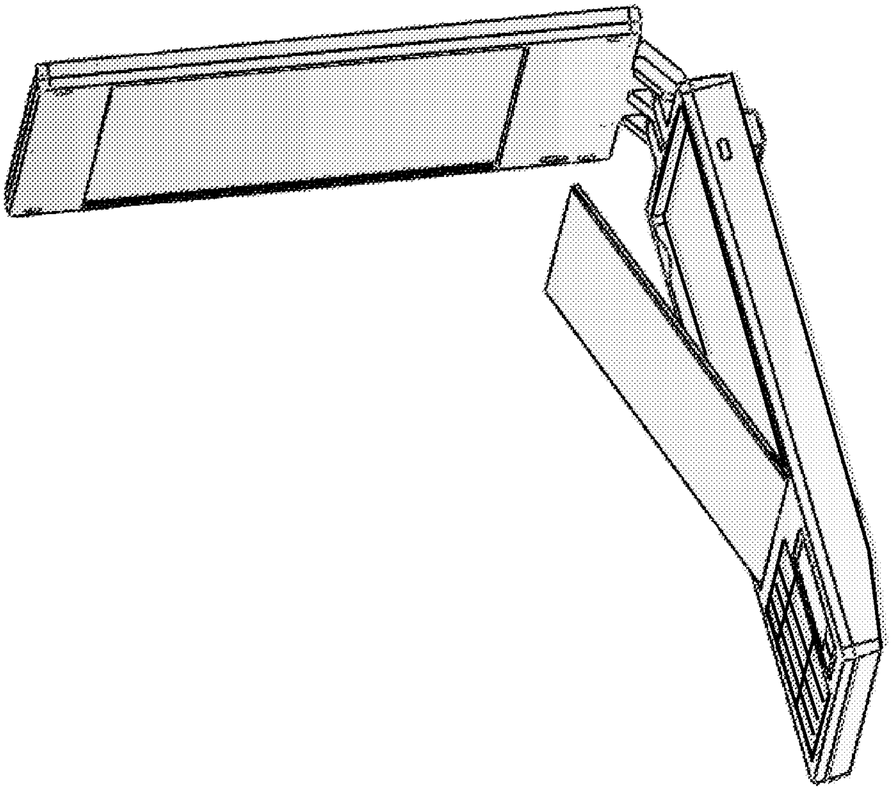
FIG. 9 is another perspective view of the portable computer with the base display panel deployed.

FIGS. 8 and 9 show perspective views of a preferred embodiment of the invention.

Figure 9A:
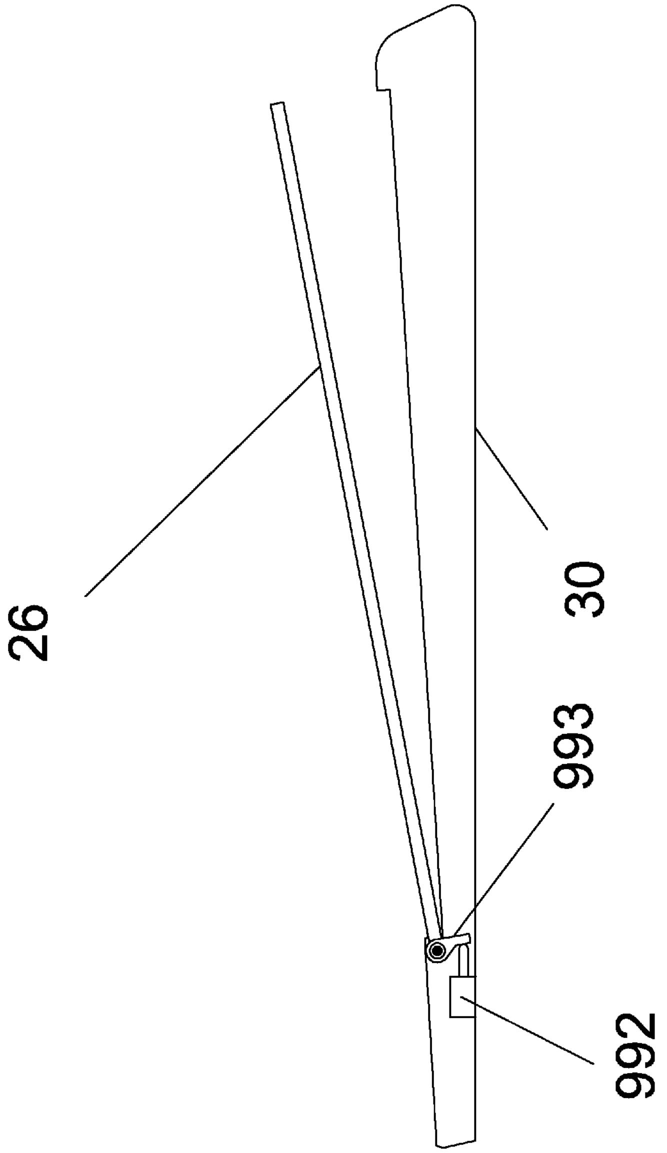
FIG. 9A shows a motorized deployment system for the base display panel.

The deployment of the base display unit can be manual or motorized. FIG. 9A shows an example of motorized deployment. The user pushes either a mechanical switch button or a virtual graphical button on the screen, triggering linear solenoid 992, which pushes a cam 993, causing it to rotate along with the base display unit, deploying it. Instead of a linear solenoid, it is also possible to use a rotary solenoid, a stepper motor, an electric motor or other mechanisms.

Figure 9B:
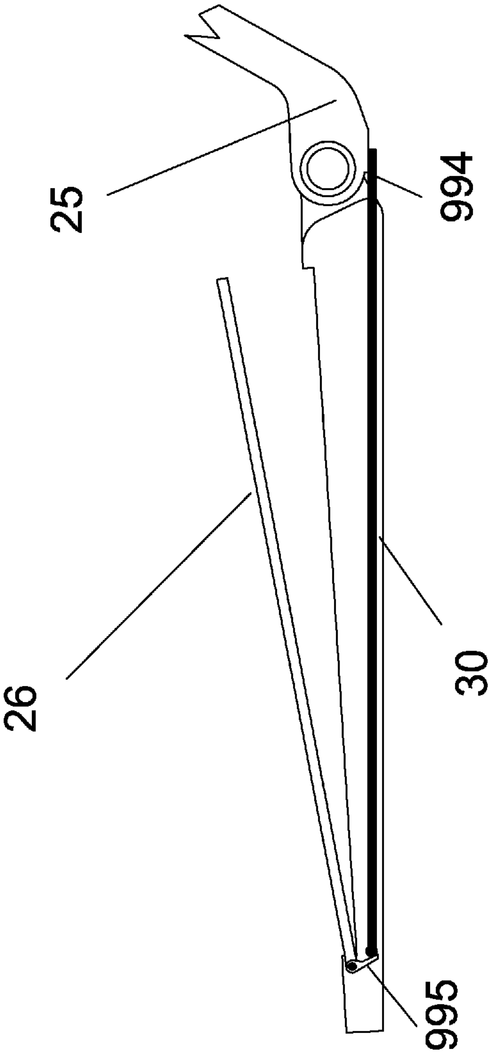
FIG. 9B shows a safety system to avoid potential screen damage.

FIG. 9B shows a safety mechanism that prevents a user from inadvertently closing the lid of the computer without first stowing the base display unit and possibly breaking it. The linkage mechanism shown in FIG. 9B consists of a cam 995 which rotates along with the base display unit 26. When the base display unit is lifted, the rotation of the cam 995 pushes rod 994, causing it to engage the primary display unit 25, locking it in a safe angular position range that allows view adjustment but not closing of the lid to an extent that could cause a clash with the deployed base display unit 26.

Figure 10:
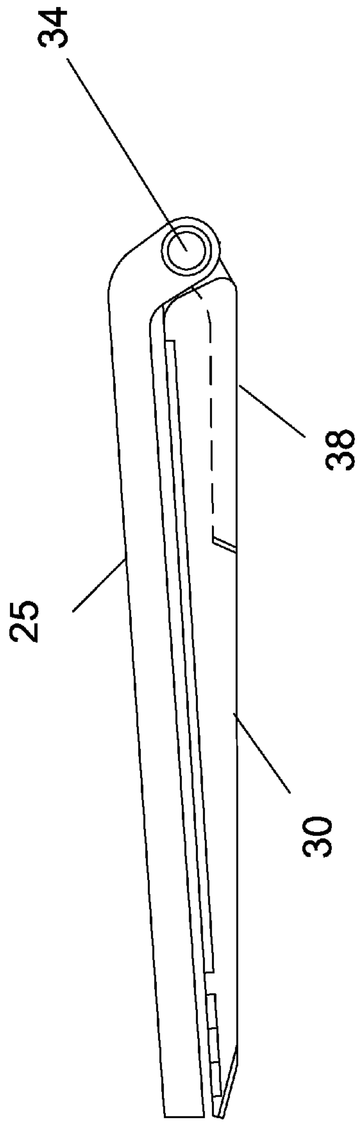
FIG. 10 shows a side elevation of the portable computer, with the support structure in stowed position.

FIG. 10 shows a side view of the enhanced portable computer, with display unit 25 hinged to the base 30 around a pivot 34. A deployable support structure 38 is configured to move between a retracted position, in which it resides inside the outer perimeter defined by base unit 30, and a deployed position. In FIG. 10, support structure 38 is shown in its retracted position inside the bottom side of base unit 30. In the illustrated embodiment, support structure 38 is attached at one end to base unit 30.

Figure 11:
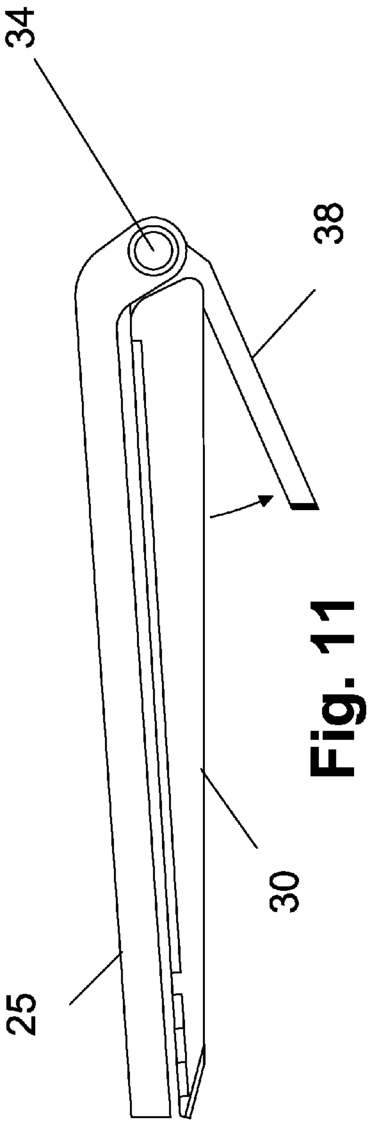
FIG. 11 shows a side elevation of the portable computer, with the support structure in the process of being deployed

FIG. 11 shows the support structure 38 in the process of being deployed, i.e. in a partially deployed position. The support structure 38 is supported by and rotates around the same pivot 34 as the display unit 25.

Figure 12:
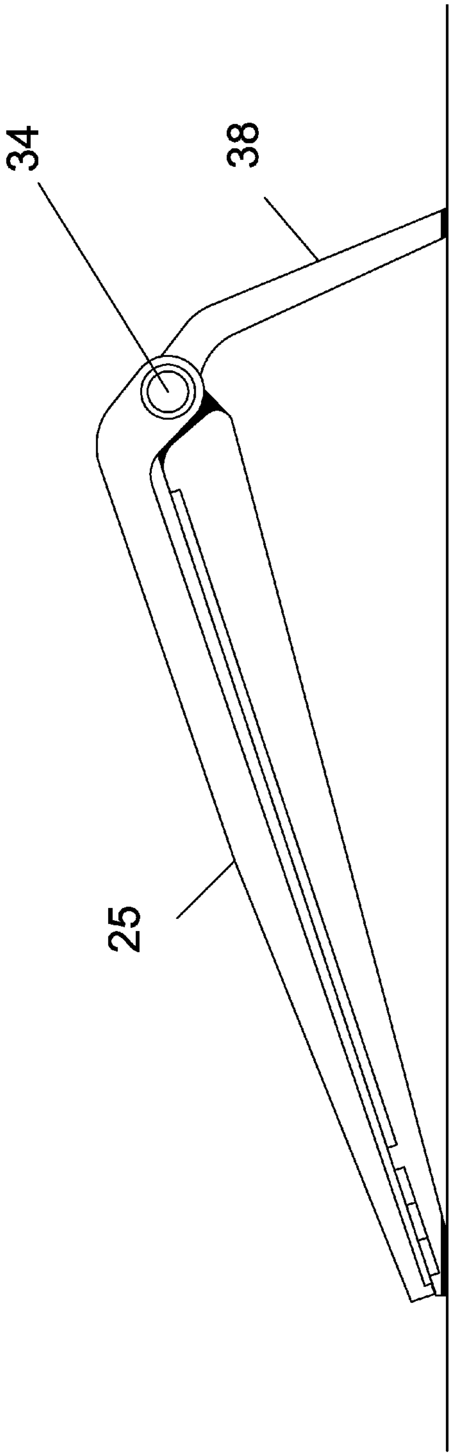
FIG. 12 shows a side elevation of the portable computer, with the support structure in deployed position.

FIG. 12 shows the support structure fully deployed, extending downwards and back relative to base unit 30 and pivot 34. When the portable computer is placed on a flat surface, support structure 38 holds the computer at an angle that may improve the user's viewing angle for both screens 26 and 27.

Figure 13:
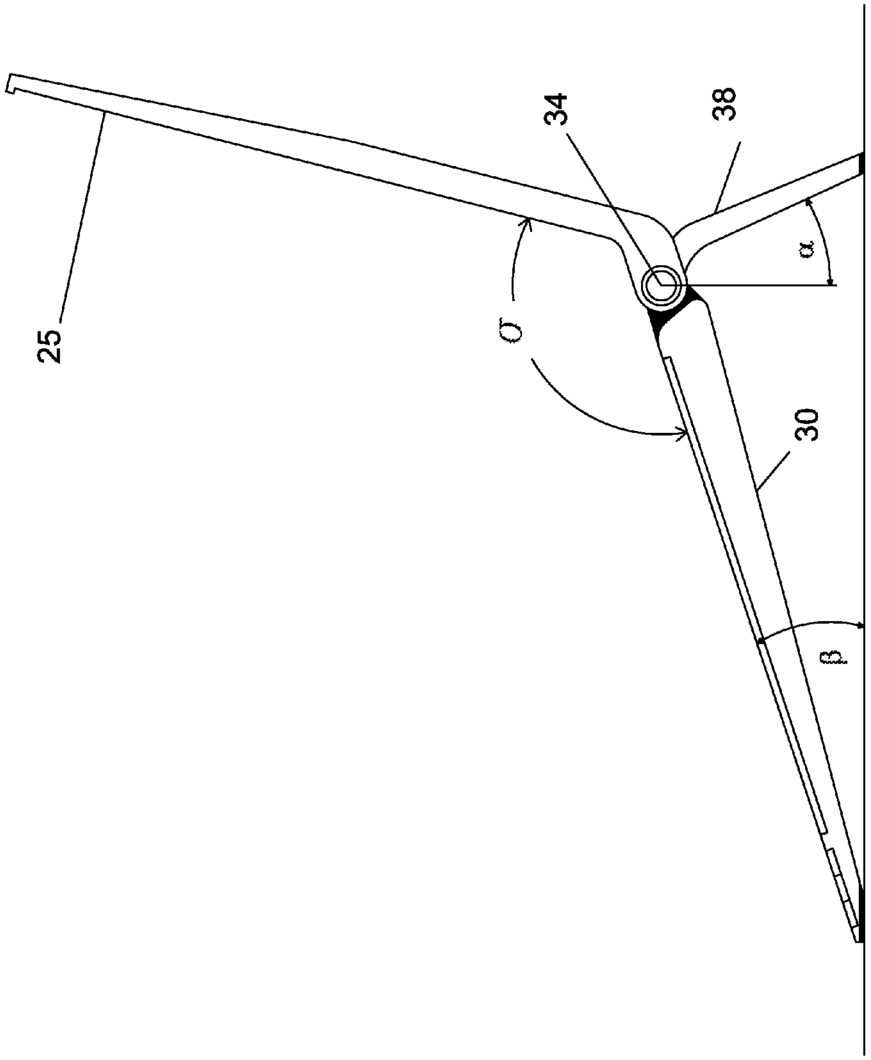
FIG. 13 is another side elevation of the portable computer, showing different possible adjustment angles.

FIG. 13 shows the computer fully deployed, with the support structure 38 providing an optimized viewing angle for both base display 26 and upper display 27. Base unit 30 is inclined by angle $\beta$, which angle can be controlled by adjusting the angle $\alpha$ at which support structure 38 is deployed. The support structure angle $\alpha$ can be made adjustable by, for example, providing a ratchet, friction or similar mechanism at the hinge 34. Because base unit 30 is inclined by angle $\beta$, hinge 34 provides a range of adjustment of angle $\sigma$ for display unit 25 relative to base unit 30 that is greater than conventional laptop computer hinges to ensure that display unit 25 can still be positioned for optimal viewing angle. In some embodiments, hinge 34 permits display unit 25 to incline relative to base unit 30 such that angle $\sigma$ is at least 160 degrees.

Figure 14:
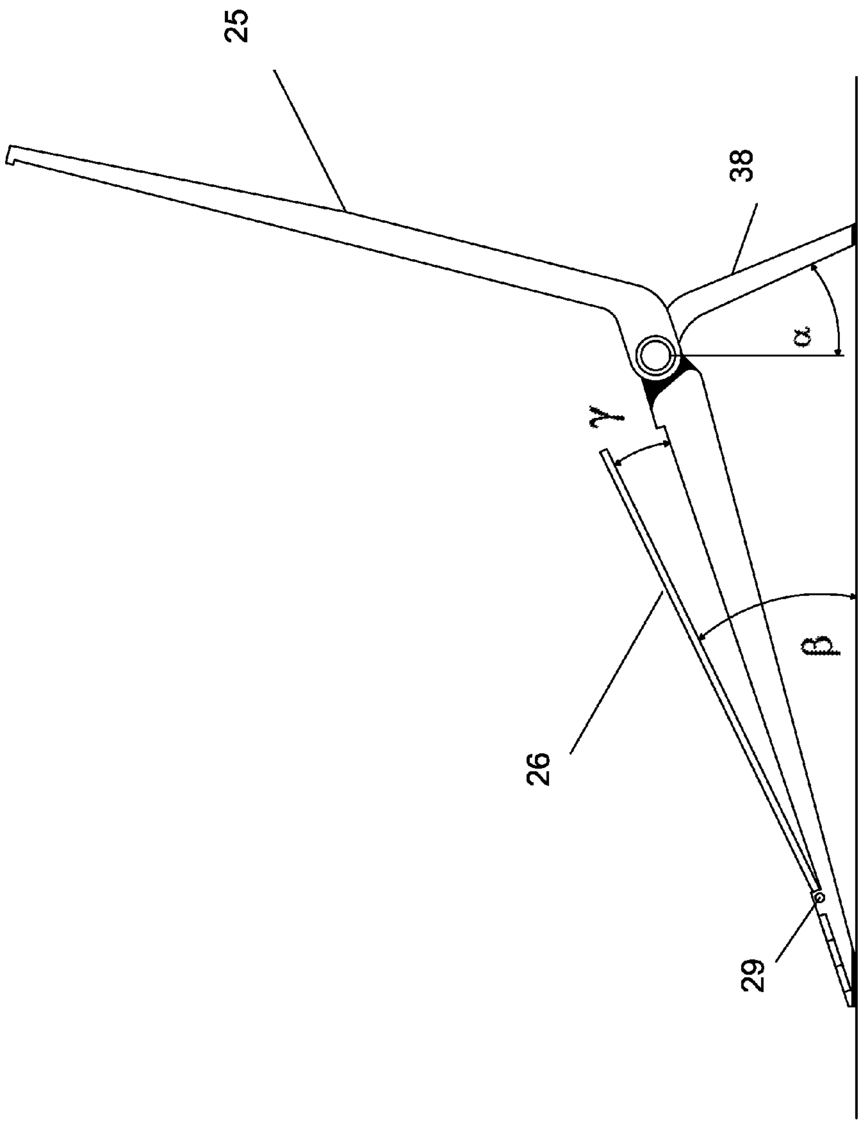
FIG. 14 shows the portable computer with both an adjustable base display panel and an adjustable support structure.

The embodiment of FIG. 14 includes both a support structure 38 and a hinge 29 that allows the user with multiple degrees of freedom to find the ergonomically optimal position. In the illustrated embodiment, hinge 29 is a friction hinge that allows a continuous adjustment of the angular position of the base display unit 26. In one possible mode of usage, adjustment of base unit angle $\alpha$ will be used for a first rough adjustment, while the angle $\gamma$ will be used for fine adjustment of the viewing angle.

Figure 15:
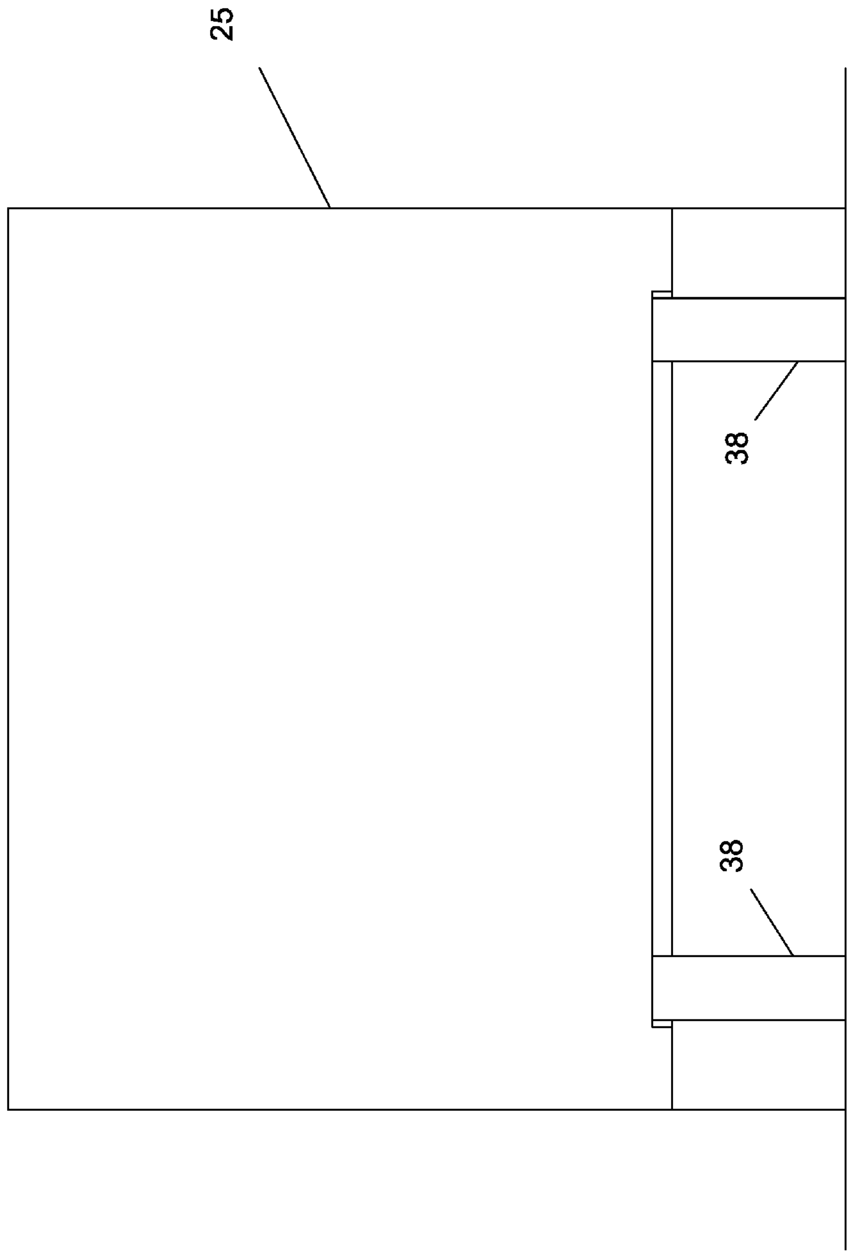
FIG. 15 is a rear elevation of the portable computer.

FIG. 15 is a rear view of the computer further illustrating base unit support structure 38. The support structure 38 includes two legs that are hinged around the same axis as, or an axis parallel to, the axis about which display unit 25 rotates relative to base unit 30. The support structure has physical stops that limit its maximum angle of rotation.

Figure 16:
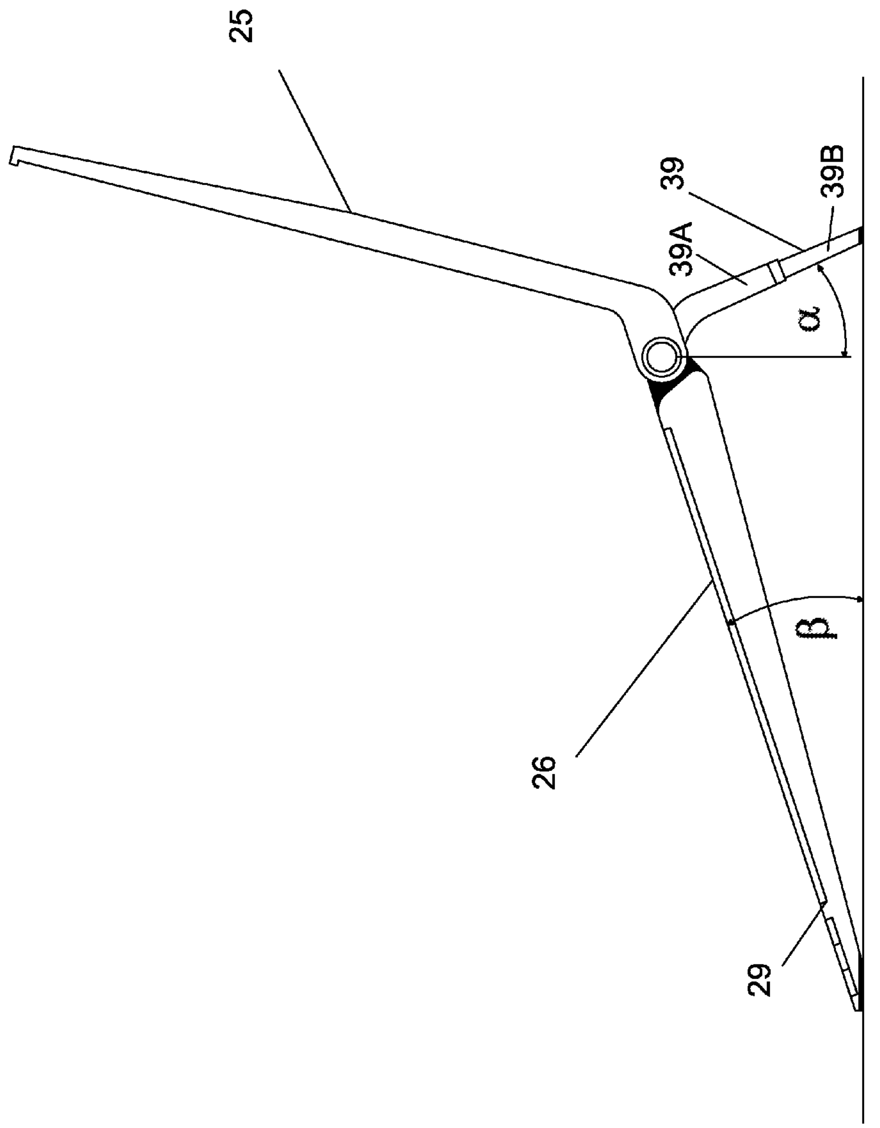
FIG. 16 is a side elevation of a portable computer, having a support structure with a telescoping length.

The embodiment of FIG. 16 illustrates an alternative embodiment in which the length of the support structure legs is adjustable to provide further degrees of adjustment of angles $\alpha$ and $\beta$. Specifically, support legs 39 include fixed portion 39A and telescoping portion 39B arranged along a common axis. The distance from which telescoping portion 39B extends from fixed portion 39A can be manually adjusted by a user. By extending the overall length of legs 39, the angle $\beta$ of base unit 30 relative to a surface on which the computer rests can be increased.

Figure 17:
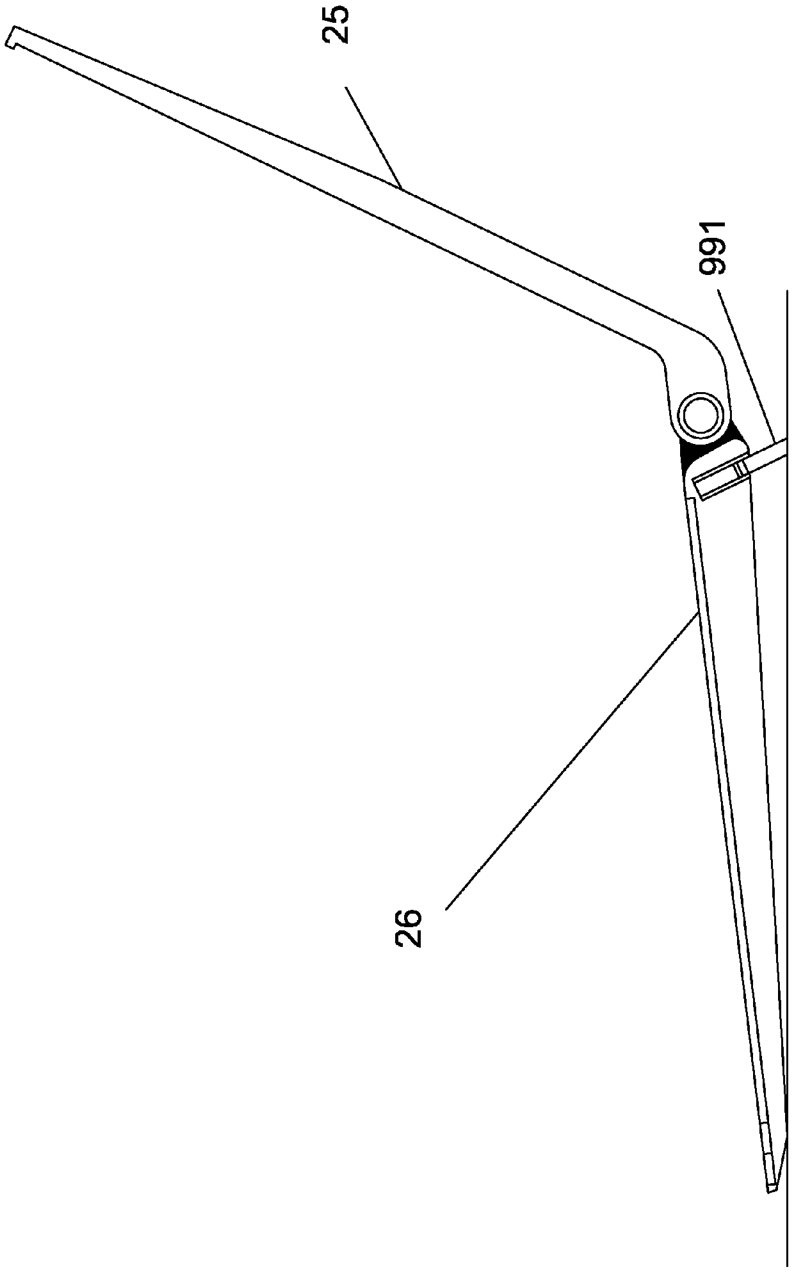
FIG. 17 is a side elevation of a portable computer, having a support structure with linearly adjustable tabs.

FIG. 17 shows that the support structure can also be of a linear nature (as opposed to the rotational structure 38 previously shown). The tabs 991 can be pushed down to lift the computer base. This type of support structure can also be telescopic.

Features provided in the illustrated embodiments herein can assist users by providing improved visual and ergonomic adjustment of the screens. Proper adjust can provide increased productivity, comfort, convenience and health for users.

As previously mentioned, the keyboard in the computer of this invention will preferably address the conflicting requirements of reasonably large keys for user comfort, while at the same time minimizing total area requirement to expose portions of the base unit screen for display purposes. One solution is the smart keyboard described herein.

Figure 18:
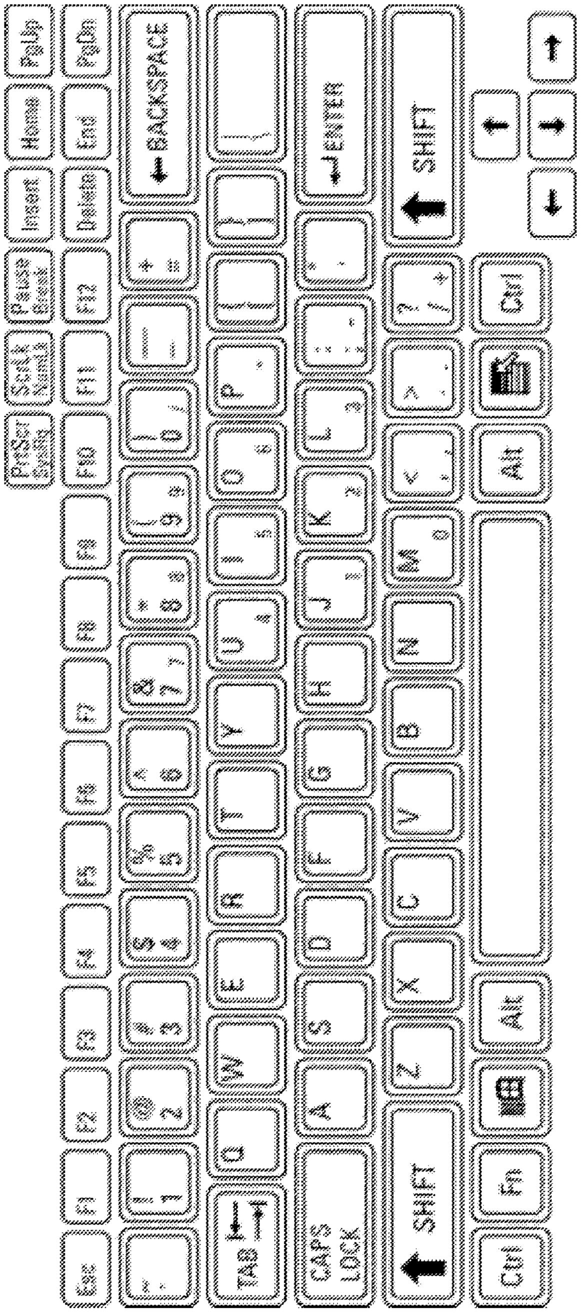
FIG. 18 is a schematic view of a prior art portable computer keyboard.
Figure 19:
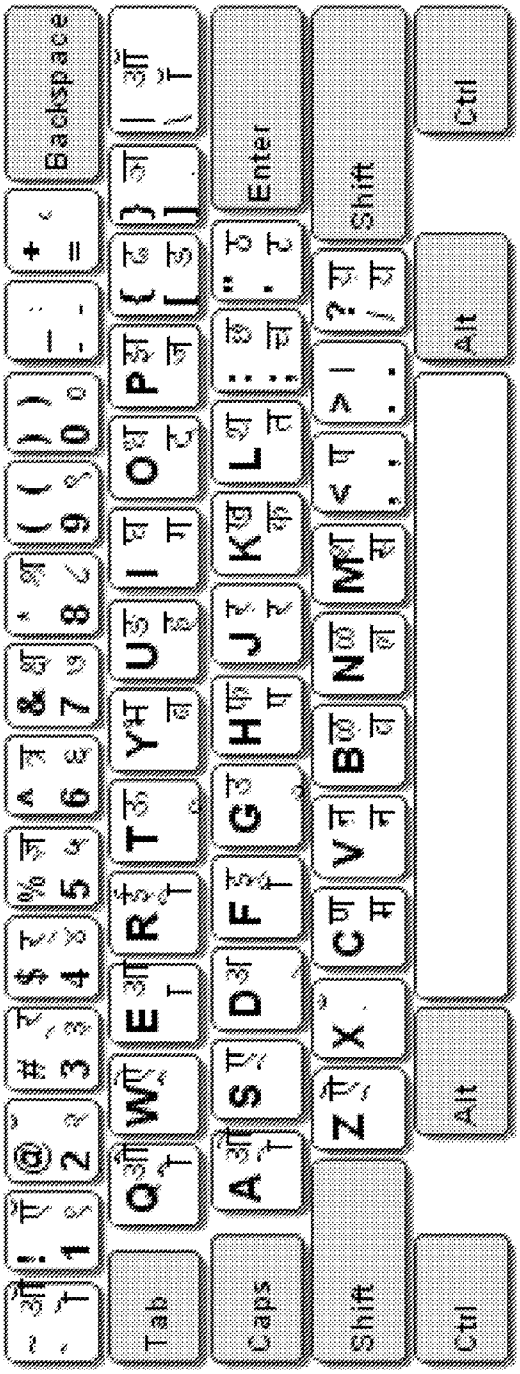
FIG. 19 is a schematic view of a prior art foreign language portable computer keyboard.

FIG. 18 shows a prior art keyboard, which includes the following characteristics:

a) is the keyboard has a large number of keys, including keys even for characters or functions that are rarely or almost never used (for instance:],}, |, F5, PrtScr, Home, etc.). Some of those keys are actually never used by many users, yet they occupy valuable real estate on conventional laptop base units;

b) each key is relatively large because space is needed on the top of each key in order to accommodate the multiple labels that may be actuated by different combinations of keypresses. FIG. 18 shows how crowded the top surface of many keys is on English-language keyboards. As illustrated in the foreign-language keyboard of FIG. 19, the crowding is even worse in many foreign keyboards, such as Chinese or other Asian keyboards. European keyboards are not as crowded as Asian keyboards, but they are also typically much more congested than U.S. keyboards, with some keys being assigned three different labels. Computers are designed for the global markets, with different key caps printed with different labels for the different markets, but the keyboards are basically the same. That forces manufacturers to make the keys large enough for the worst cases. The result is that the keys may be larger than they need to be from a user ergonomics point of view.

An alternative keyboard structure described herein includes a partially transparent keyboard that is mounted on top of an LCD panel, so that the labels are not printed on top of the keycaps, but instead they are displayed on the LCD panel under the keyboard in the appropriate position so that the user can see them through the transparent portions of the keyboard. The key label becomes just an image on the LCD panel, which can be anything the software and/or the user may want it to be at any time.

By utilizing a partially transparent keyboard to enable visibility through to an underlying LCD display, symbols corresponding to keyboard keys can be conveyed to a user without printing multiple labels on the keys, as typically done on conventional keyboards, or having dedicated keys for numbers, punctuation, functions, special symbols, etc. For instance, the default keyboard layout could include just the standard QWERTY characters and a few of the most frequently used control keys (such as Enter, Del and Backspace). When the user wants to enter a number, he/she can press a key (labeled, e.g., Num for Numbers, or something similar) in response to which the keyboard would instantly switch to numeric input and numeric symbols would be displayed beneath keyboard keys. The same mode of operation can be achieved for punctuation, special symbols, foreign keyboards, etc. The punctuation, which is often small and difficult for users to see on standard keyboards, can now be displayed in large size using the full keytop surface, avoiding the common confusions between similar punctuation symbols.

A further advantage of some embodiments of the invention is that the keyboard can also be configured by the software application to cooperate with the application, such as dynamically and contextually re-defining certain keys as YES, NO, BACK, GO ON, GO TO, STOP, CANCEL, EXIT, etc. The application can blink certain keys corresponding to expected input, or change the color of certain keys to contextually guide the user. A smart keyboard opens many new possibilities to the software and the application. As another side benefit, this can lead to some level of standardization in application software which can simplify the learning and usage of software applications.

Another potential benefit would be that embodiments of such a keyboard could be global in application, working without hardware changes, with languages used across the world, such as New York, New Delhi, Berlin, Paris, Madrid, London, Beijing, Moscow or Tokyo. Such keyboard globalization can lead to substantial cost savings and logistical simplification for computer manufacturers. Country-specific customization for computers could be primarily achieved through software, which may be easier and less expensive to implement, and in many cases may be accomplished by the user through an Internet download. The hard disk could come with the necessary keyboard drivers loaded in it, and the user could select a setting for the desired driver.

To the extent that symbols corresponding to each key are displayed on a display panel underlying the keys, it may be desirable in some embodiments to provide for variable brightness or intensity of said display panel output to accommodate different working conditions. In some embodiments, users are provided with controls for setting the brightness of a display underlying a keyboard structure to suite user preference and ambient conditions. In other embodiments, keyboard display brightness may be controlled automatically. For example, it is known in the art of portable computers to provide for detection of ambient light conditions, so that the brightness of a primary computer display can be increased in the presence of high levels of ambient light, and decreased in the presence of lower levels of ambient light, thereby maintaining comfortable working conditions. However, many prior art keyboards are either unlighted, or may provide for fixed intensity of backlighting. In an exemplary embodiment of the present invention, detected intensity of ambient light is used to vary the intensity of the display panel underlying various keyboard structures.

Figure 20:
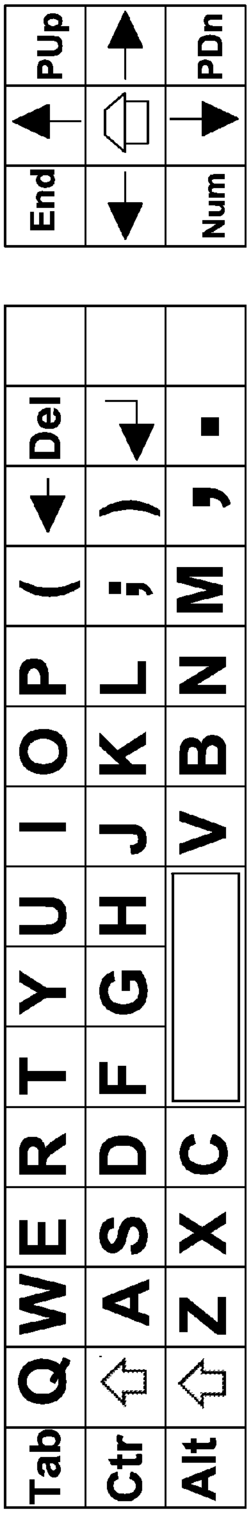
FIG. 20 is a schematic view of a portable computer keyboard in accordance with an embodiment of the present invention.
Figure 21:
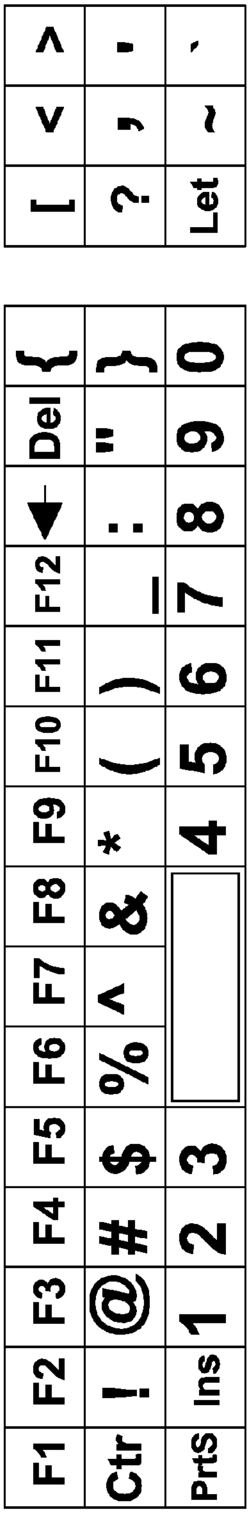
FIG. 21 is a schematic view of the portable computer keyboard of FIG. 11A, with an alternative key set display selected.

FIGS. 20 and 21 illustrate an embodiment of a smart keyboard in accordance with aspects of the present invention, which does not require dedicated keys, such that the keyboard can be made with significantly fewer physical keys than in conventional keyboards. Also, since there is no need to squeeze multiple labels on the keytop, each individual key area can be made smaller. As a result, the total keyboard can be made significantly smaller than conventional keyboards, without sacrificing user convenience. In some applications, user convenience can even be improved, because the label can show punctuation and other small characters in full size, making it easier to see them, even for users with some level of vision deterioration or handicap. Many people could find themselves typing on the keyboard without needing glasses. Meanwhile, the tactile feedback may remain the same as in a standard keyboard.

FIG. 20 shows one possible layout of the smart keyboard of this invention. The layout of FIG. 20 requires only 3 rows of keys as opposed to the customary 6 or more rows in a conventional keyboard, while maintaining standard orientation of English-language letter keys relative to one another. If the user wants to enter a number or a special punctuation not shown in FIG. 20, he/she can press the key "Num", which will switch the layout image to the one shown in FIG. 21. Specifically, the computer responds to depression of the "Num" key by altering a display underlying the partially-transparent keypad to illustrate the symbols on FIG. 21.

FIG. 21 shows the numbers, function keys and punctuation symbols in large, clearly visible images.

Using this invention, it is possible to also design a layout that would have less than three rows of keys. Such a layout would differ from the traditional QWERTY layout, but for users who can accept that, it would provide even greater screen area for information display on the base unit, potentially with just one row of keys at the bottom of the base unit. This is a feature that could be very useful in tablet computers that try to maximize available screen area.

Figure 22:
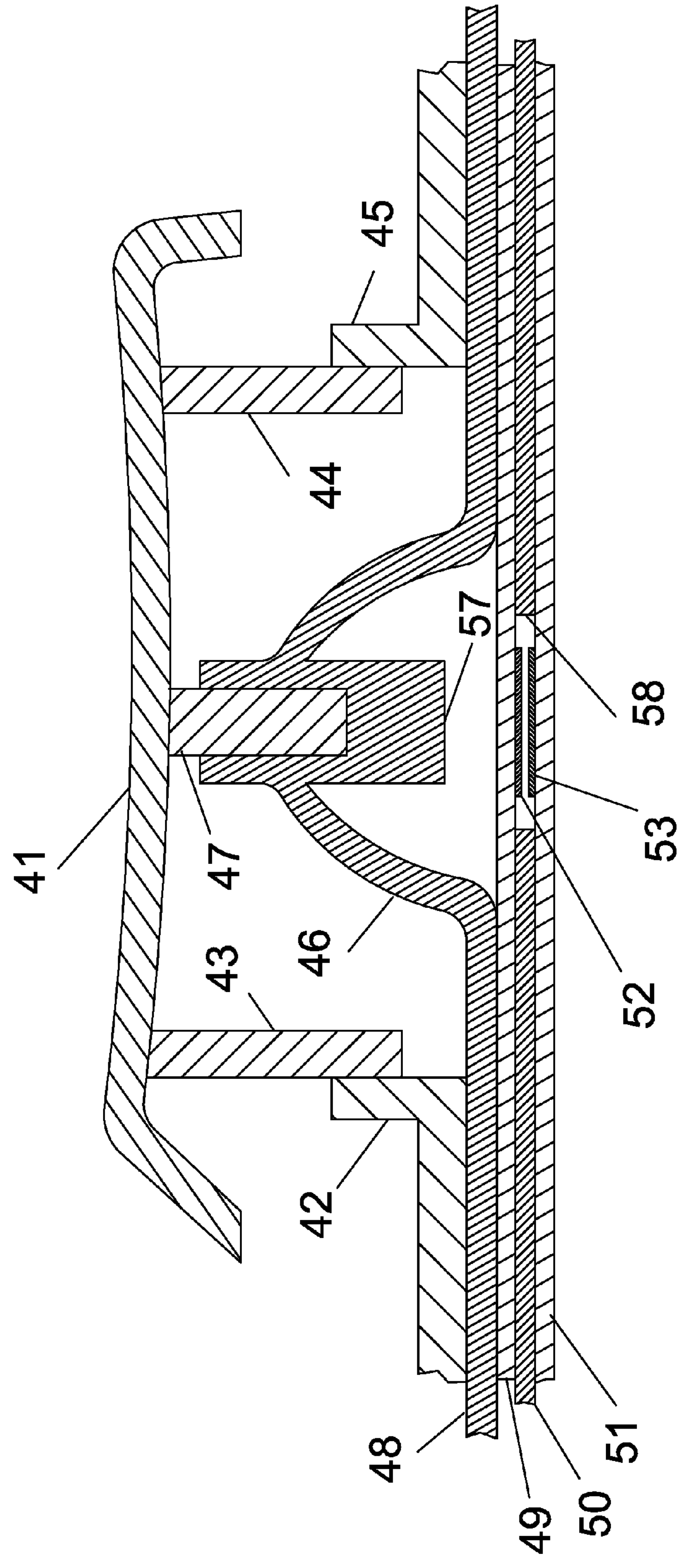
FIG. 22 is a cross-sectional side elevation of a prior art portable computer keyboard key mechanism.

FIG. 22 shows a prior art conventional keyboard of the most commonly used membrane type. The keycap 41 is supported by posts 43 and 44, which are slidably guided by the guiding structure 45 and 42. The stem 47 is inserted into the flexible membrane dome 46. The membrane 48 rests on top of a 3 layer "sandwich", which constitute the actual electrical portion of the keyboard:

a) layer 49 is a non-conductive film with conductive circular pad 52 printed on it;

b) layer 51 is a similar non-conductive film with conductive circular pad 53 printed on it; and c) the intermediate layer 50 is an insulating film with circular hole 58, which is concentric with the circular pads 52 and 53.

Because of the thickness of the insulator layer 50, there is normally a small gap between the conductive pads 52 and 53, i.e. the circuit is open.

Figure 23:
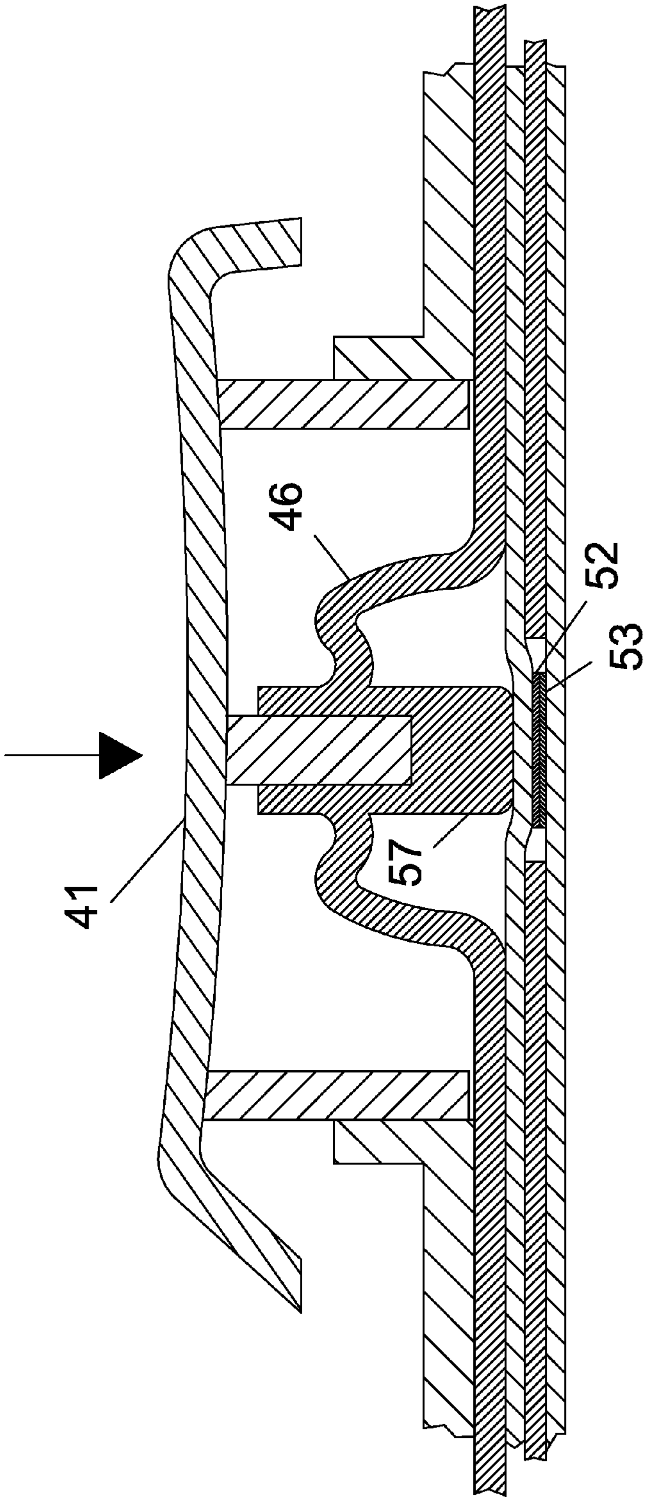
FIG. 23 is the cross-sectional side elevation of the mechanism of FIG. 22, with the key in a depressed position.

FIG. 23 shows what happens when the user depresses keycap 41. The keycap 41 descends, pushing down the dome 46 and causing it to collapse and fold as shown. The collapse of the dome, the downward stroke and the resistance of the collapsing rubber structure is what provides the tactile feedback to the user. The rubber stem 57 compresses layers 49 and 51 underneath, closing the circuit between pads 52 and 53. The keyboard microprocessor, which is connected to the layers and the conductive pads 52 and 53 by multiple conductive traces on the layers (not shown), interprets this closed circuit as the key having been actuated by the user.

Figure 24:
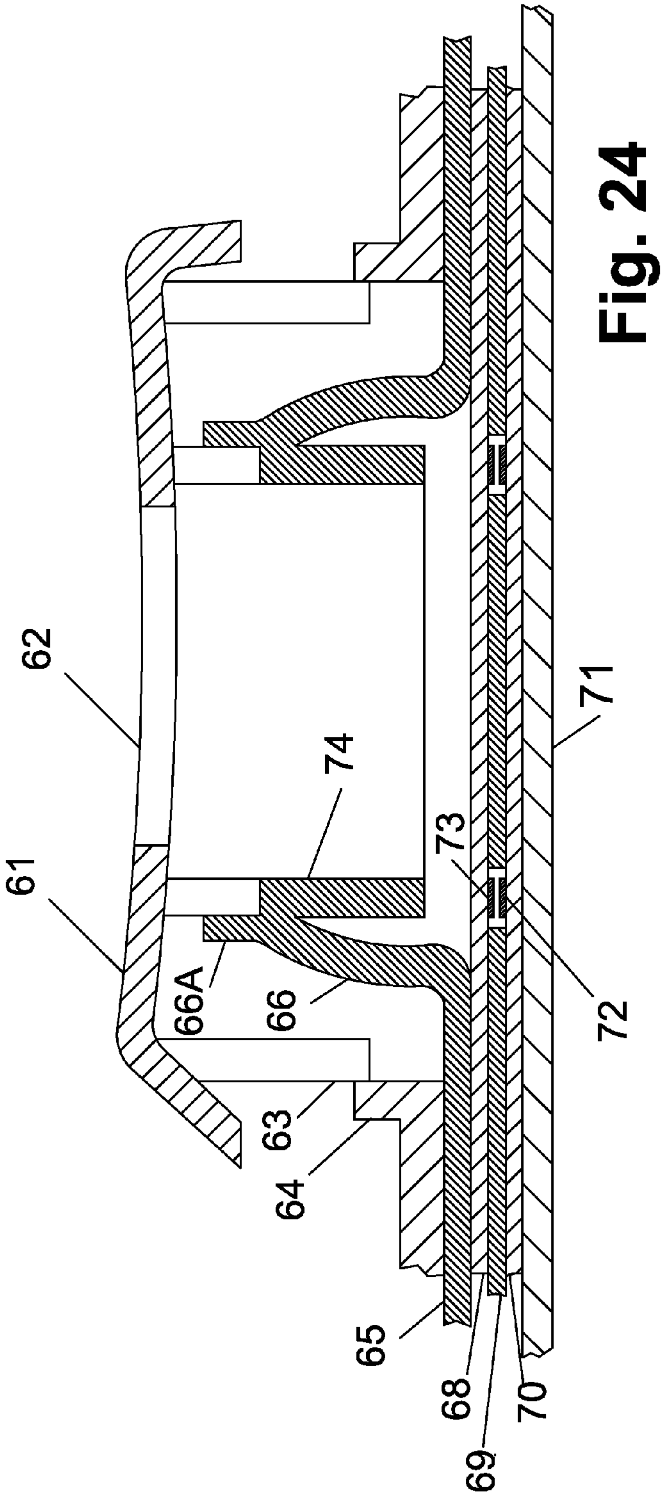
FIG. 24 is a cross-sectional side elevation of a portable computer keyboard key mechanism, in accordance with an embodiment of the invention.

FIG. 24 shows one of the preferred embodiments of the new keyboard of this invention. The keycap 61 is comprised of transparent plastic, glass or other transparent material. Area 62 is largely transparent, so that the user can readily see through it. Shaded (cross-hatched) areas of keycap 61 are preferably painted or made of semi-translucent material such as smoked glass, to reduce the extent to which the user also sees the internal mechanisms of the keyboard. The stem 67 of keycap 61 is inserted into the top cup 66A of the membrane dome 66. The dome also has an internal hollow cylindrical stem 74, which can be pushed down by stem 67 of keycap 61 to compress layers 68, 69 and 70. The conductive pads 72 (attached to layer 70) and 73 (attached to layer 68) are normally open, with a small gap between them. Layers 68, 69 and 70 are fully or partially transparent (except on the conductive pads 72 and 73 or conductive traces), thereby providing visibility to areas of LCD display 71. As described above, the brightness of LCD display 71 varies with detected levels of ambient light. The conductive pads 72 and 73 are shaped as rings (or portions of a ring, or dots within the projected area of the cylinder) that confront the bottom of the hollow cylindrical rubber stem 74 when keycap 61 is depressed.

Figure 25:
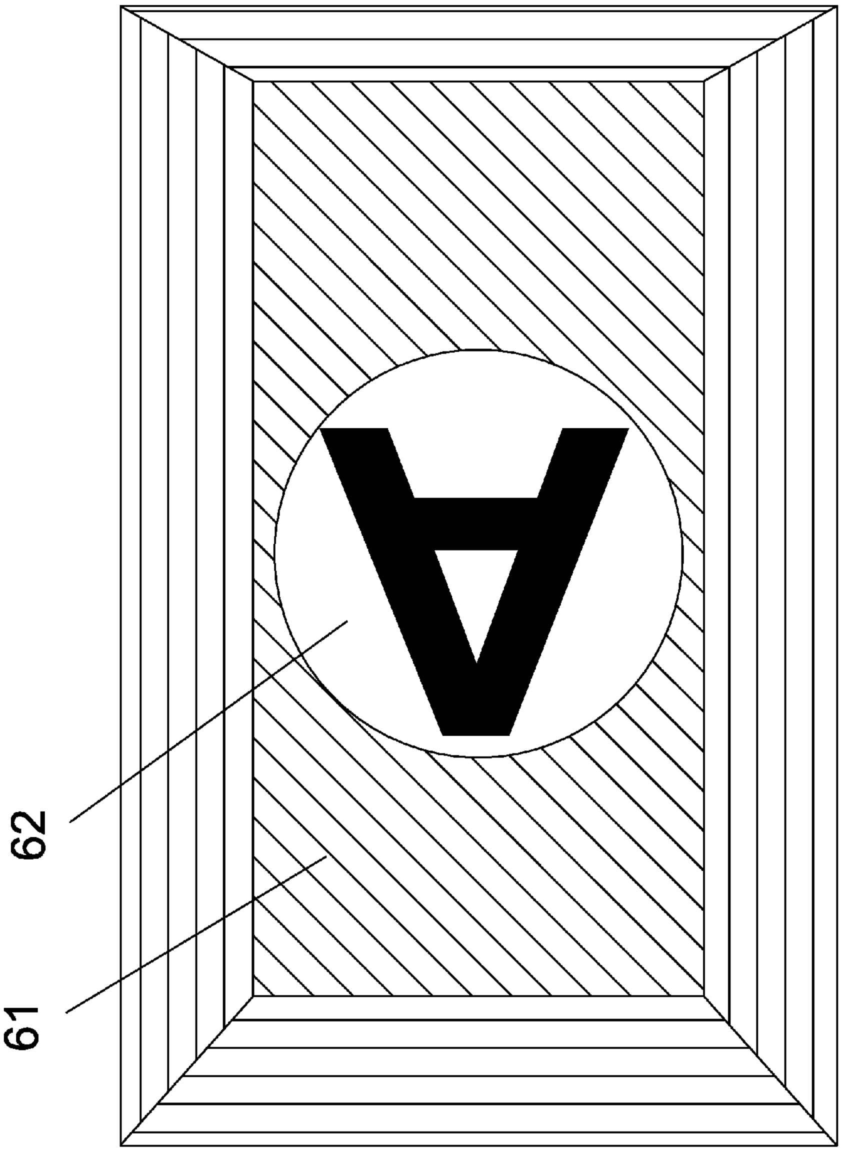
FIG. 25 is a top plan view of the key in FIG. 24.

FIG. 25 shows a top view of a key in accordance with the embodiment of FIG. 24, showing transparent area 62 and the non-transparent area 61. The letter A seen on the center is actually displayed on LCD 71 located underneath keycap 61 and layers 68, 69 and 70.

Figure 26:
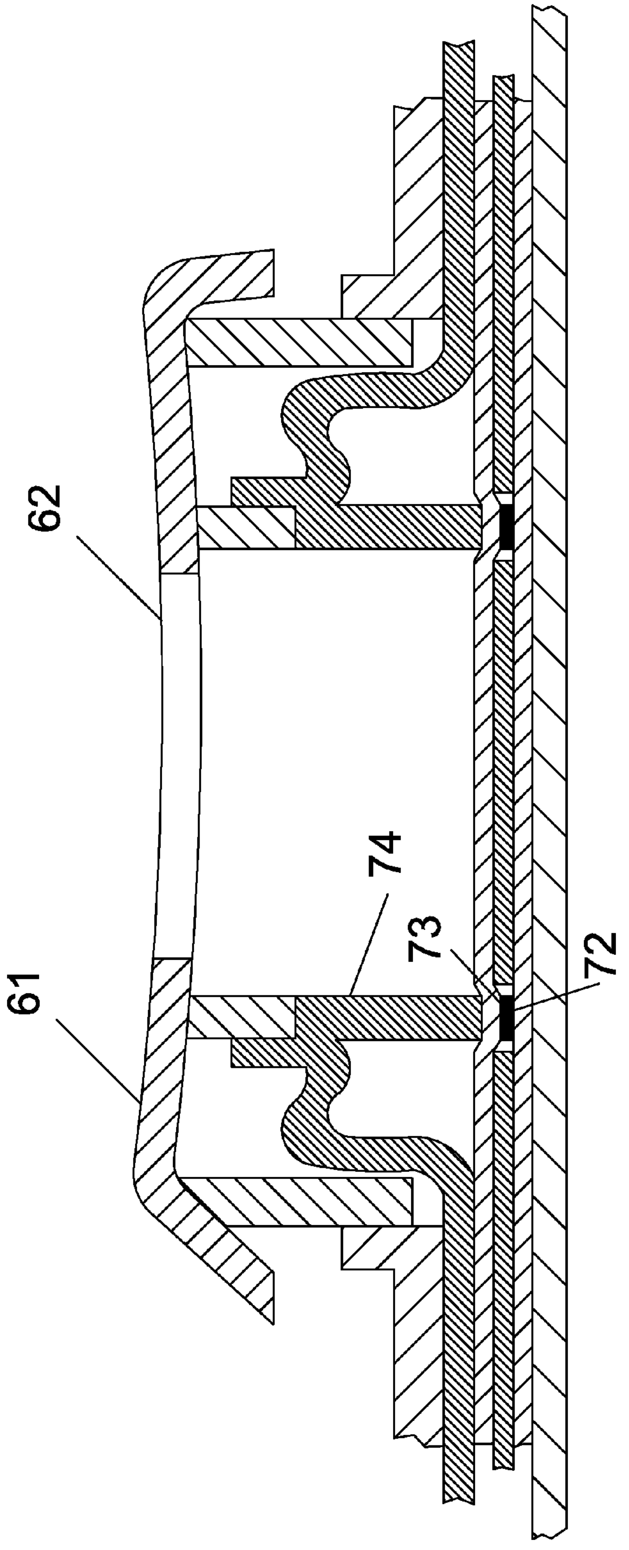
FIG. 26 is the key mechanism of FIG. 24, with the key in a depressed position.

FIG. 26 shows what happens when keycap 61 is depressed. Hollow cylindrical stem 74 causes dome 66 to collapse and compresses layers 68 and 70, causing pads 72 and 73 to contact one another and closing the circuit.

Figure 27:
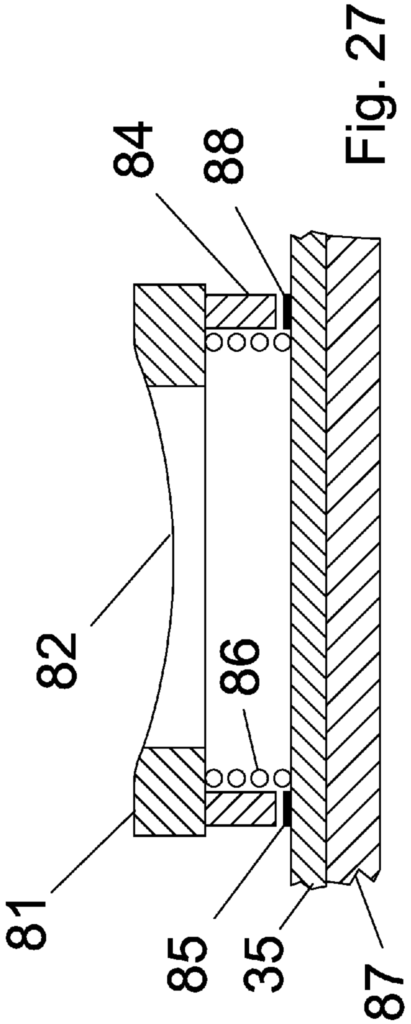
FIG. 27 is a cross-sectional side elevation of a portable computer keyboard key mechanism, in accordance with another embodiment of the invention.

FIG. 27 shows another embodiment of a smart keyboard, which uses a cylindrical coil spring 86 (instead of a flexible dome) to provide resistance to depression of keycap 81, and corresponding restoring force. Keycap 81 includes cylindrical stem 84, comprised of an electrically-conductive material. The embodiment of FIG. 27 further includes transparent layer 35 positioned over LCD display panel 87. Conductive pads 85 and 88 are mounted on transparent layer 35, at positions directly beneath keycap stem 84. Thus, when keycap 81 is depressed, compressing spring 86, keycap stem 84 contacts both pads 85 and 88, thereby connecting them electrically and closing a circuit to indicate depression of keycap 81.

Figure 28:
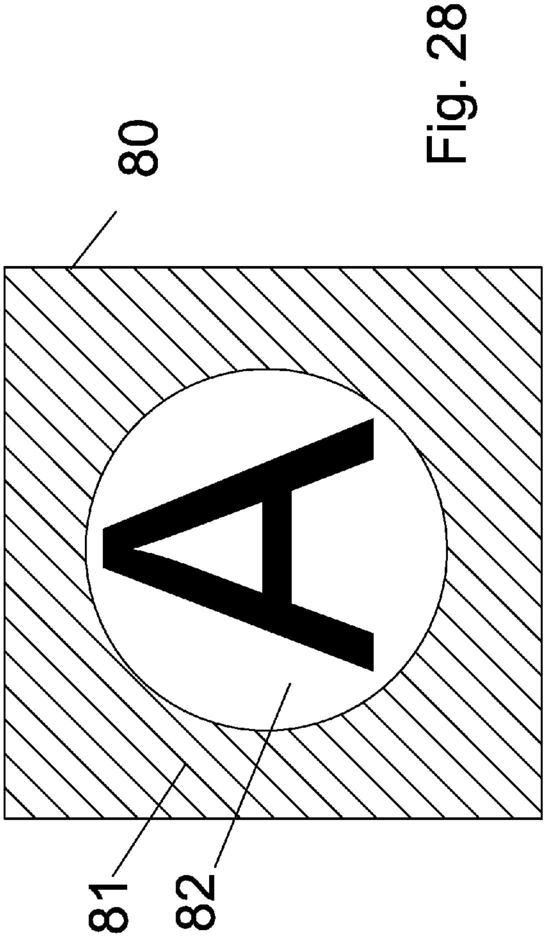
FIG. 28 is a top plan view of the key in FIG. 27.

FIG. 28 is a top plan view of keycap 81, in the embodiment of FIG. 27. Transparent center region 82 allows a user to view a portion of LCD 87, while non-transparent portion 81 visually obscures keyboard mechanisms such as coil spring 86 and conductive pads 85 and 88. It is to be understood that, as used herein, terms such as transparent and opaque are relative terms meant to convey varying levels of visibility through a material. It is understood that description herein of materials as "transparent" is intended to convey they ability of a user to see through the material sufficiently to receive information displayed beneath the material. Thus, materials described as "transparent" may, in fact, have some level of translucency.

Figure 29:
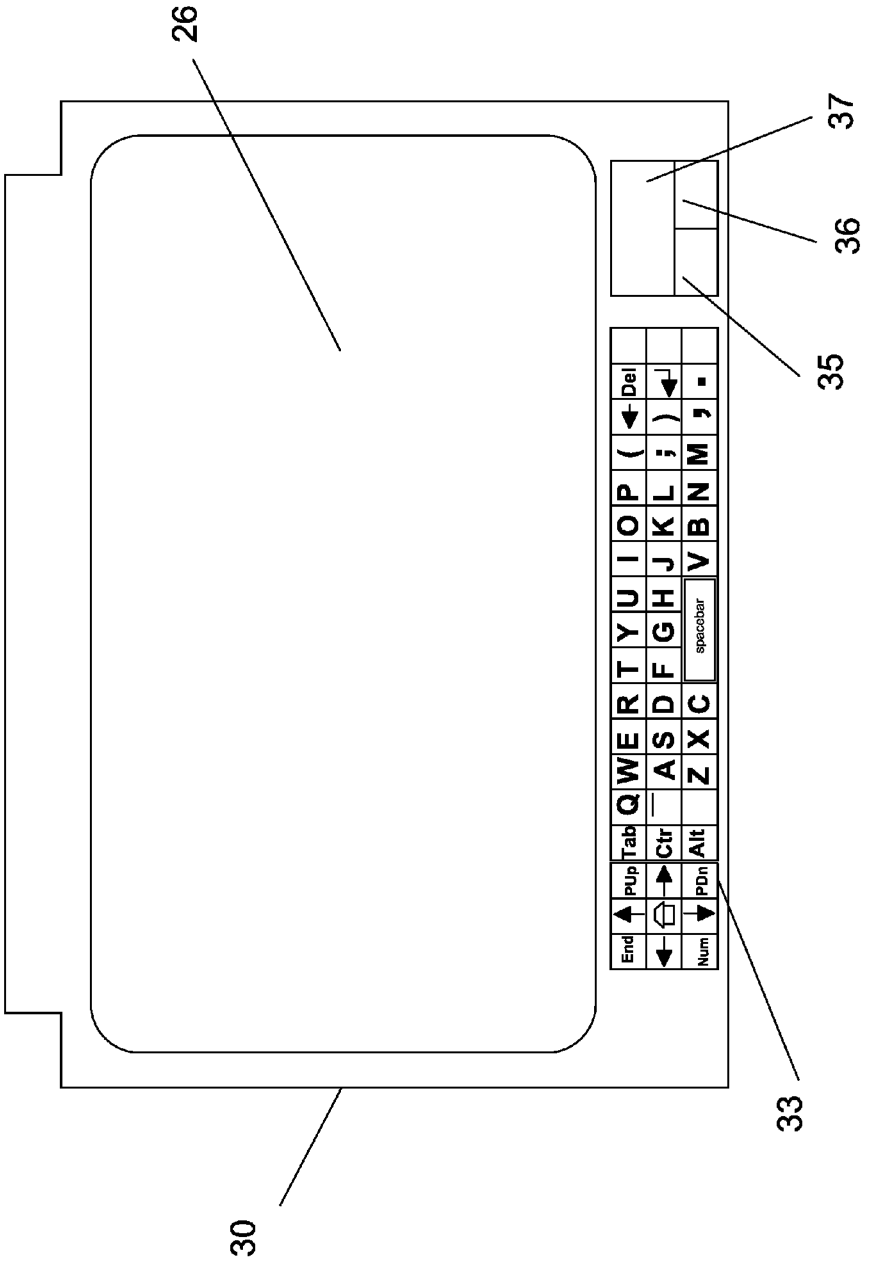
FIG. 29 is a top plan view of a portable computer base unit, having a keyboard in accordance with an embodiment of the invention.

FIG. 29 illustrates an embodiment with an advantageous form factor enabled by keyboard structures described herein. FIG. 29 provides a top plan view of a portable computer base unit 30 having display panel 26 and keyboard structure 33. Keyboard 33 provides standard, full-size keys, yet the surface area occupied by keyboard 33 is substantially less than conventional keyboards, thereby providing substantially more surface area for display panel 26. Specifically, keyboard 33 comprises only three rows of keys. The symbol or action associated with each key is indicated by an icon displayed beneath each key on a display panel. The symbol or action associated with at least some of the keys can be changed dynamically to provide ready access to standard characters.

Figure 30:
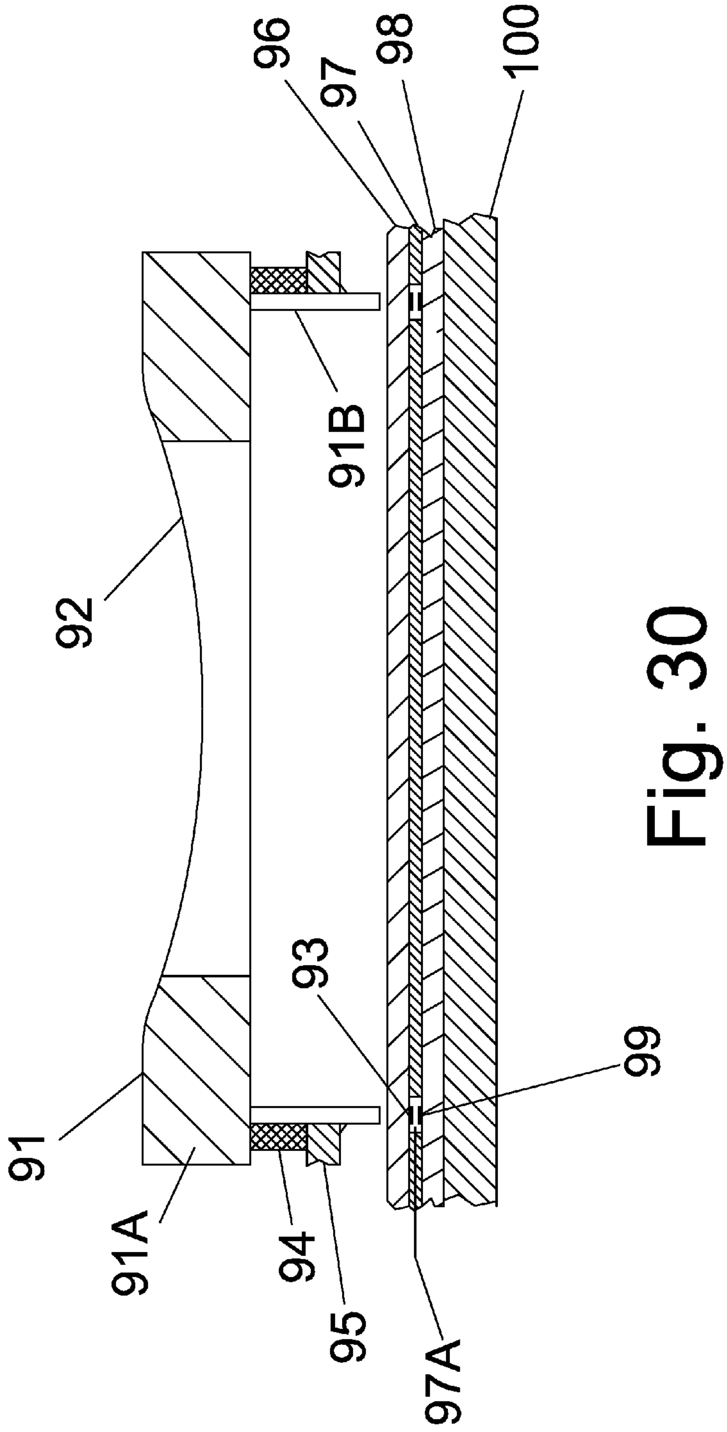
FIG. 30 is a cross-sectional side elevation of a portable computer keyboard key mechanism, in accordance with another embodiment of the invention.

FIG. 30 shows another embodiment of a smart keyboard employing an alternative mechanism for tactile feedback and restoring force upon depression of a keycap. The embodiment of FIG. 30 continues to utilize a three-layer approach to detection of keypresses of keycap 91. Specifically, conductive pads 93 and 99 are attached to layers 96 and 98, respectively. Layers 96 and 98 are separated by layer 97. Layer 97 includes gap 97A, providing for a small air gap between conductive pads 93 and 99 when keycap 91 is not in a depressed position. LCD display 100 can be controlled to display an image beneath keycap transparent portion 92 that is associated with keycap 91.

Keycap 91 is comprised of top portion 91A and stem 91B. Top portion 91A includes transparent center portion 92. Stem 91B extends substantially perpendicularly downwards from the underside of top portion 91A, towards conductive pads 93 and 99. Stem 91B is surrounded by compressible member 94. Supporting structural wall 95 surrounds keycap stem 91B. Compressible member 94 is situated between the underside of keycap top portion 91A and supporting structural wall 95. Compressible member 94 may be comprised of materials such as rubber or foam. During a resting state, compressible member 94 holds keycap top portion 91A away from supporting structural wall 95 by a distance sufficient to prevent stem 91B from compressing layers 96 and 98, such that conductive pads 93 and 99 continue to be separated by an air gap.

Figure 31:
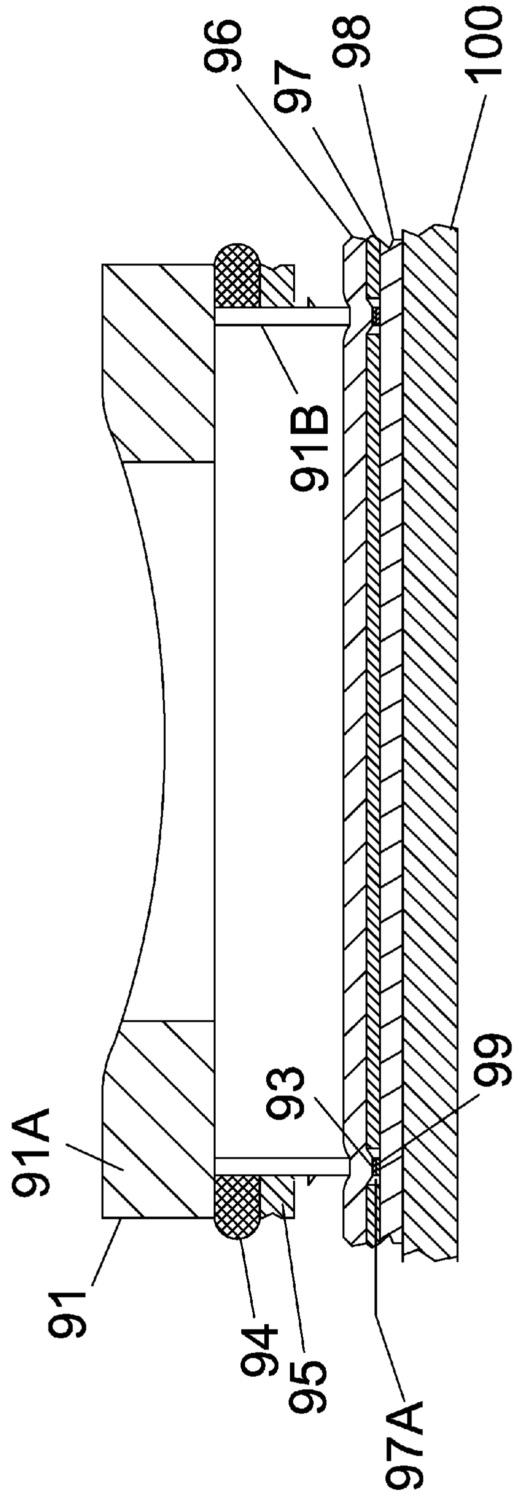
FIG. 31 is the key mechanism of FIG. 30, with the key in a depressed position.

FIG. 31 shows what happens when keycap 91 is depressed. Compressible member 94 deforms as it is compressed between the underside of keycap top portion 91A and supporting structural wall 95, reducing the thickness of compressible member 94 and allowing keycap 91 to descend towards layers 96, 97 and 98. Stem 91B contacts layer 96, compressing layers 96 and 98 within gap 97A and causing conductive pads 93 and 99 to contact one another, closing the circuit.

FIGS. 32-48 show a different embodiment of a smart keyboard which is intended to be installed under the surface of the display panel (as opposed to being installed on top of the display as described in the previous embodiments). This type of keyboard will be referred to as the sub-surface smart keyboard. Embodiments of such a sub-surface smart keyboard enable user input without requiring a touchscreen, therefore enabling high typing speed, high reliability and low cost. Embodiments of the sub-surface smart keyboard can provide tactile feedback to the user without the need for an over-the-surface mechanical keyboard.

Figure 32:
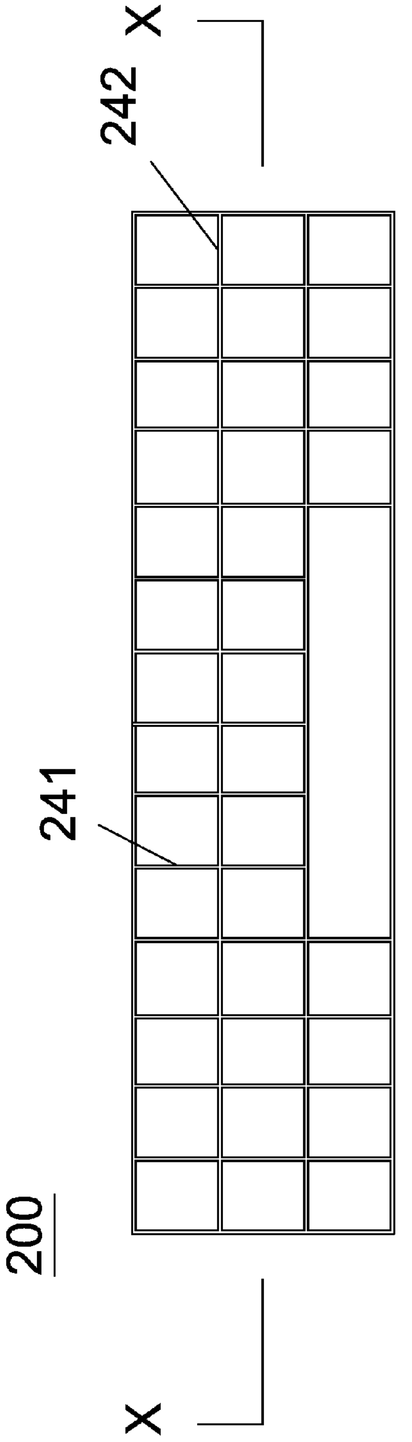
FIG. 32 is a top plan view of a keyboard grid, in accordance with a subsurface keyboard embodiment of the invention.
Figure 33:
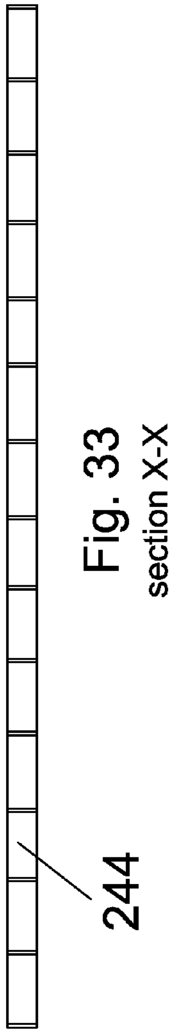
FIG. 33 is cross-section X-X of the keyboard grid in FIG. 32.

FIG. 32 shows a grid or matrix 200, which can be implemented to define key positions in some embodiments of a subsurface smart keyboard. Grid 200 is comprised of plastic, glass or similar transparent material, with a series of walls in X-direction (such as wall 242) and a series of walls in Y-direction (such as wall 241). FIG. 33 is a cross-sectional view of the grid, with X-direction and Y-direction walls defining a series of compartments 244, each corresponding to a key.

Figure 34:
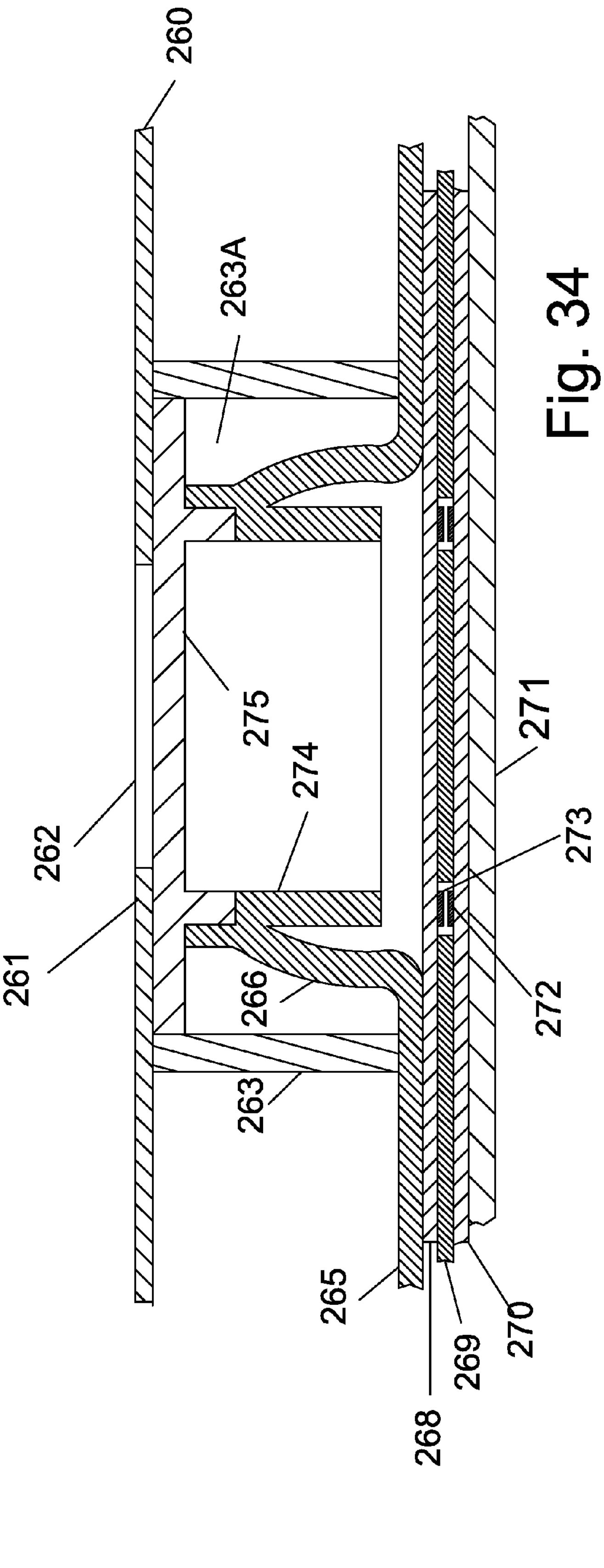
FIG. 34 is a cross-sectional side elevation of a subsurface portable computer key mechanism utilizing the grid of FIG. 32.

FIG. 34 shows a cross-sectional view of a key within a sub-surface smart keyboard with an external flexible transparent overlay. It is understood that a keyboard implemented in accordance with the embodiment of FIG. 34 could include multiple instances of the illustrated key mechanism. The keyboard includes external flexible transparent overlay 260, which may be comprised of a flexible silicone film. Portion 261 (cross-hatched) of overlay 260 is painted, while portion 262 is transparent. Sliding platform 275 retained within compartment 263A by guiding walls 263. Sliding platform 275 compresses flexible dome 266 formed in elastic layer 265, such that sliding platform 275 rests against the underside of overlay 260. Elastic layer 265 further includes stem 274, extending from sliding platform 275 towards contacts 272 and 273. The contact mechanism in the embodiment of FIG. 34 is a 3 layer sandwich comprised of layers 268, 269 and 270, and contacts 272 and 273, operating to detect a keypress similarly to, e.g., the embodiments of FIGS. 30-31 as previously described.

In the embodiment of FIG. 34, a portion of LCD display 271 is viewable through the key mechanism. Accordingly, overlay portion 262, sliding platform 275, and layers 268, 269 and 270 are either transparent and/or cut away to enable light emitted from LCD 271 to travel upwards through overlay portion 262.

Figure 35:
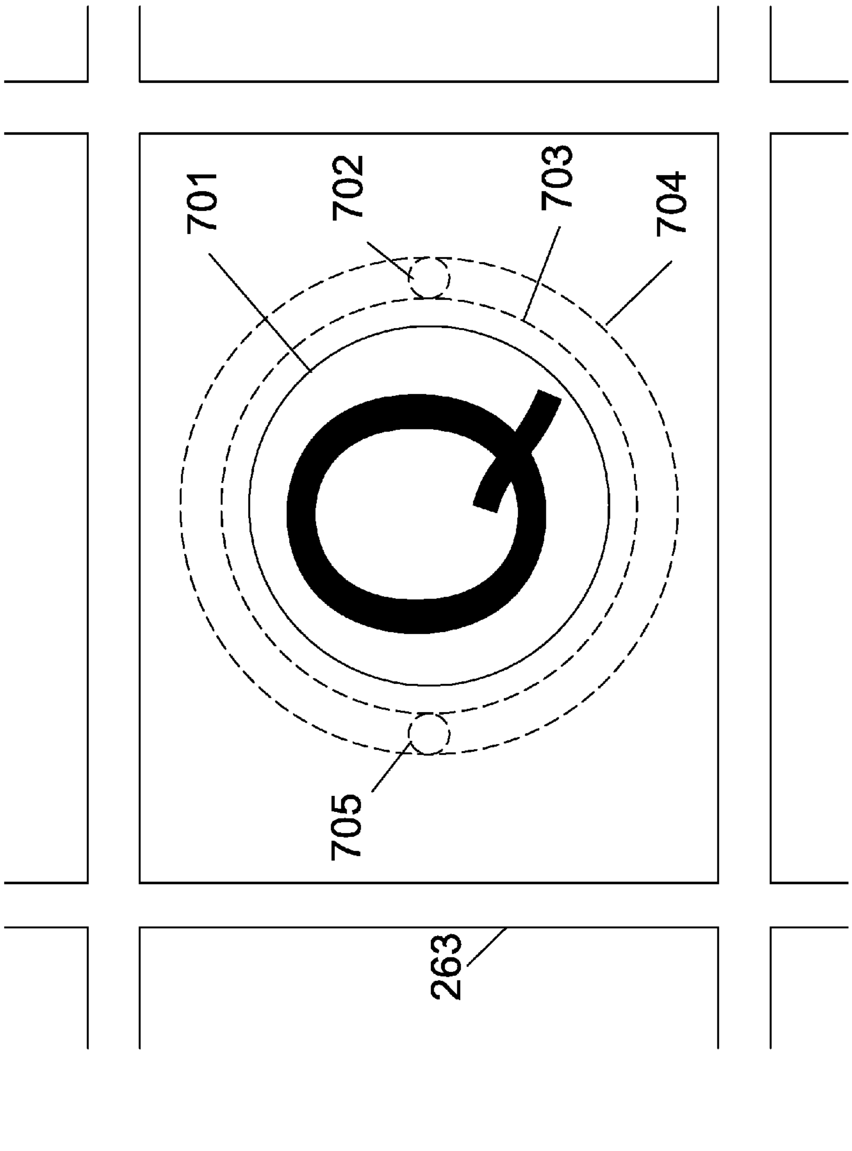
FIG. 35 is a top plan view of a key in accordance with the embodiment of FIG. 34.

FIG. 35 illustrates a top view of a portion of the keyboard of FIG. 34. A portion of subsurface grid 263 is disposed beneath a non-transparent overlay having transparent portion 701 to enable viewing of an underlying portion of an LCD display. Lines 703 and 704 define the interior and exterior borders of keycap stem 274 (FIG. 34). Contact switches 702 and 705 are disposed beneath stem 274.

Figure 36:
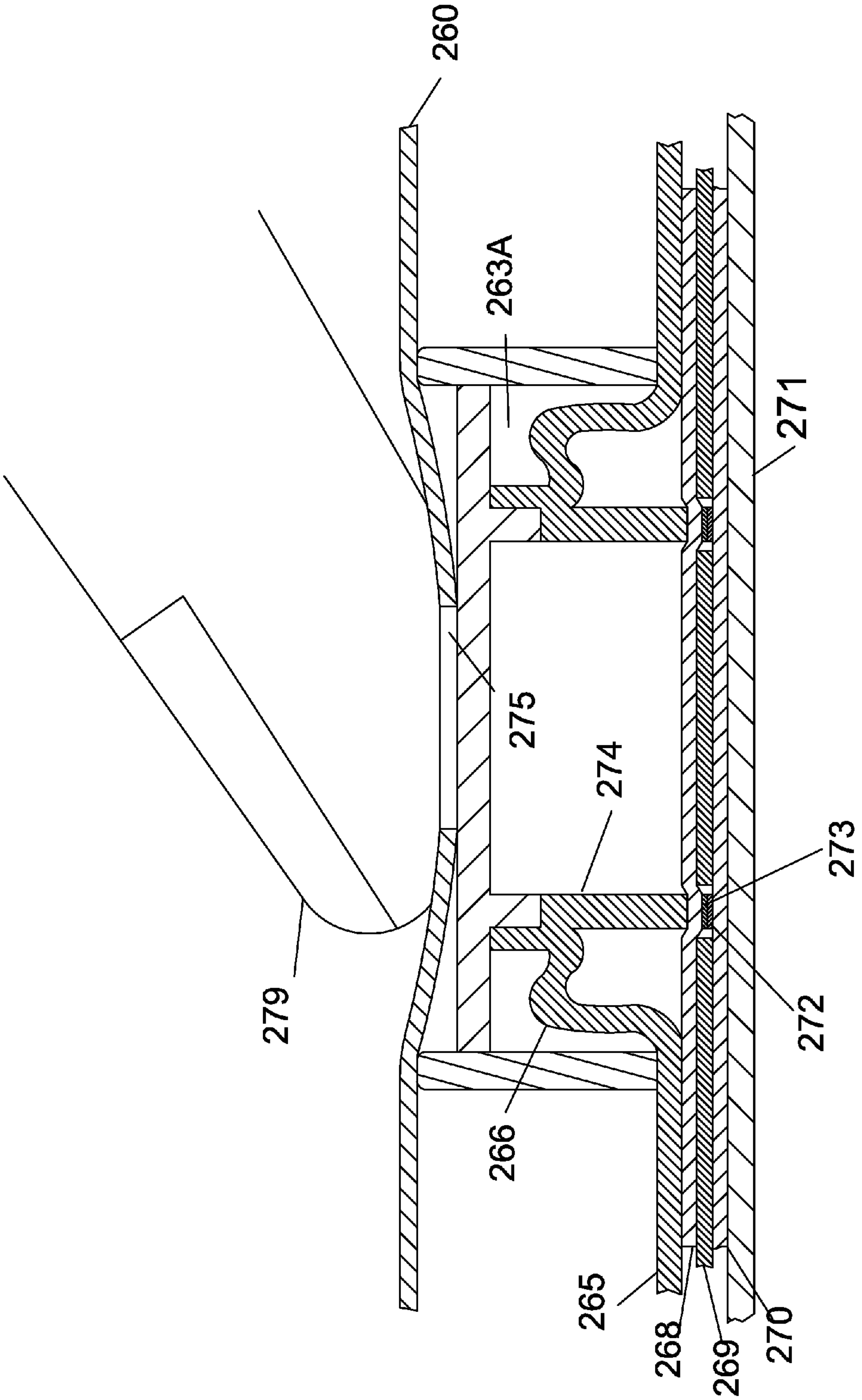
FIG. 36 is a cross-sectional side elevation of the key mechanism of FIG. 34, with the key in a depressed position.

FIG. 36 illustrates the mechanism of FIG. 34, when the key is being depressed by a user's finger. Flexible overlay 260 deforms downwards in response to pressure from finger 274, thereby moving sliding platform 275 downwards within compartment 263A and collapsing flexible dome 266. Cylindrical stem 274 presses against layer 268, forcing contacts 272 and 273 against one another, to close a circuit, thereby indicating activation of the key associated with keycap 275.

Figure 37:
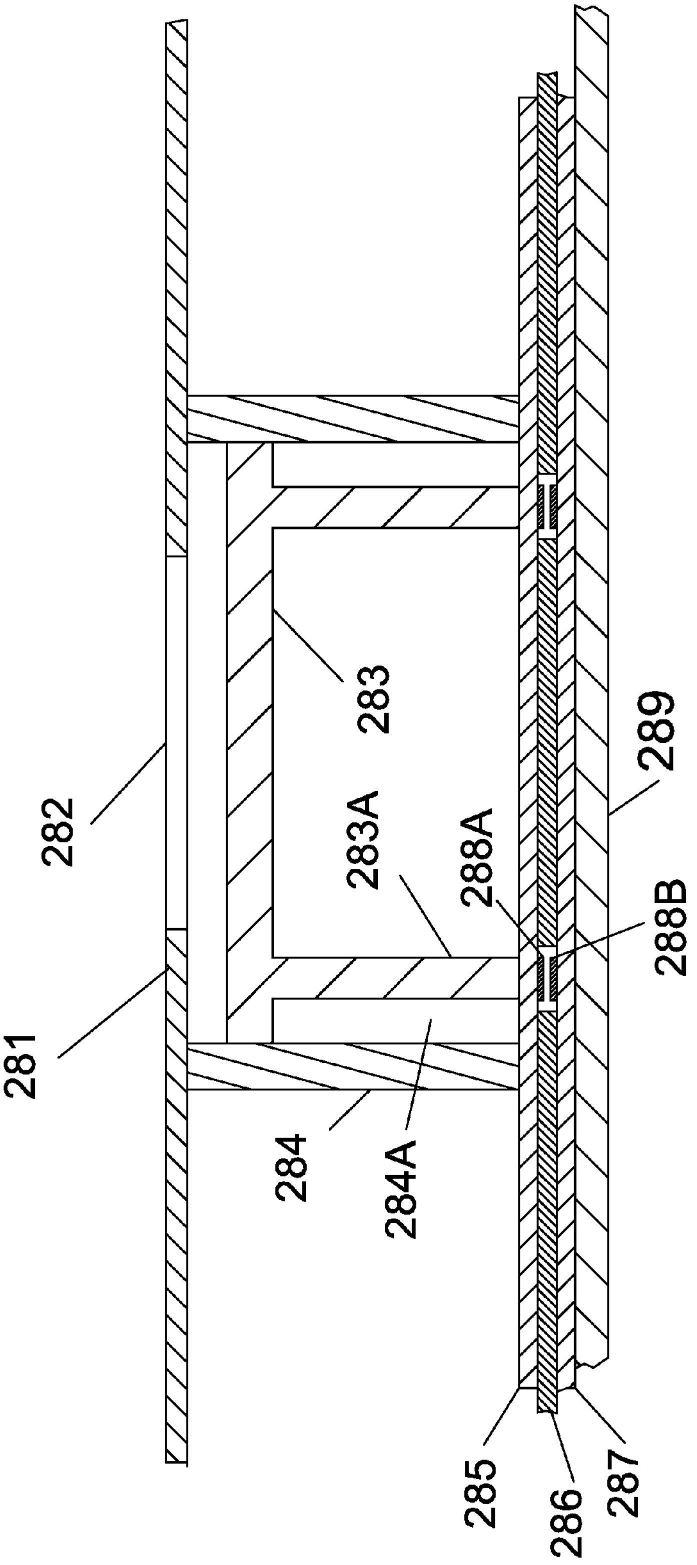
FIG. 37 is a cross-sectional side elevation of a subsurface portable computer key mechanism in accordance with another embodiment of the invention.

FIG. 37 shows a different embodiment of the smart sub-surface keyboard which doesn't have a flexible dome. The resistance and the restoring force are provided by the external overlay itself. Specifically, flexible external overlay 281 includes transparent portion 282. Guiding walls 284 form receptacle 284A, within which keycap 283 is contained. Keycap 283 includes cylindrical stem 283A oriented perpendicularly to flexible external overlay 281. Keycap 283 normally rests upon the three layer structure comprised of layers 285, 286 and 287, and contacts 288 and 289. This three layer structure is structurally and functionally analogous to three layer switch structures described in detail in other embodiments above. LCD 289 lies beneath layers 285, 286 and 287. A portion of LCD 289 is visible through external overlay transparent portion 282 and keycap 283, such that information associated with depression of keycap 283 is displayed to a user.

In operation, if a user pressed on external overlay portion 282, external overlay 281 stretches and deforms downwards, thereby applying pressure to keycap 283. Keycap 283 and cylindrical stem 283A move downwards, collapsing contact 288A against contact 288B to close a circuit and indicate activation of keycap 283.

Figure 38:
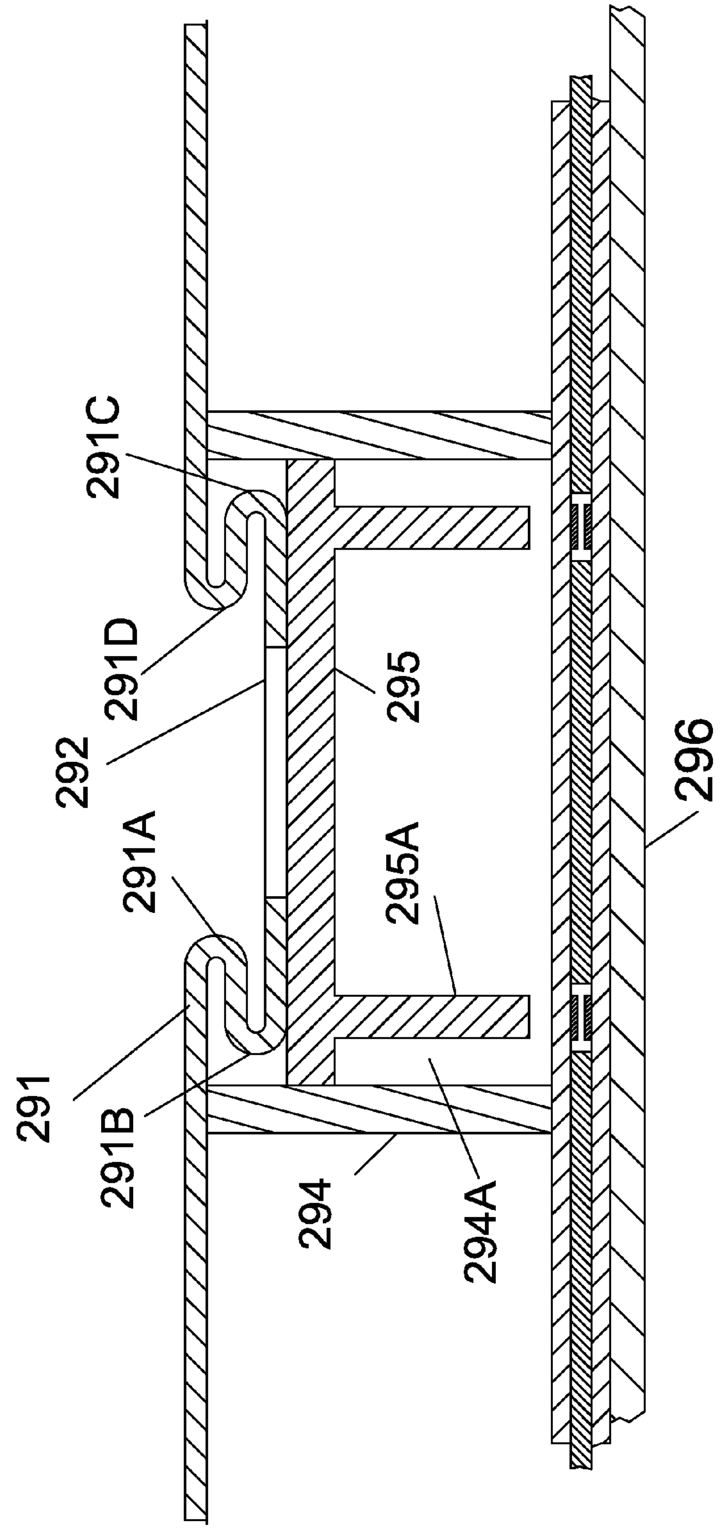
FIG. 38 is a cross-sectional side elevation of a subsurface portable computer key mechanism in accordance with another embodiment of the invention.
Figure 39:
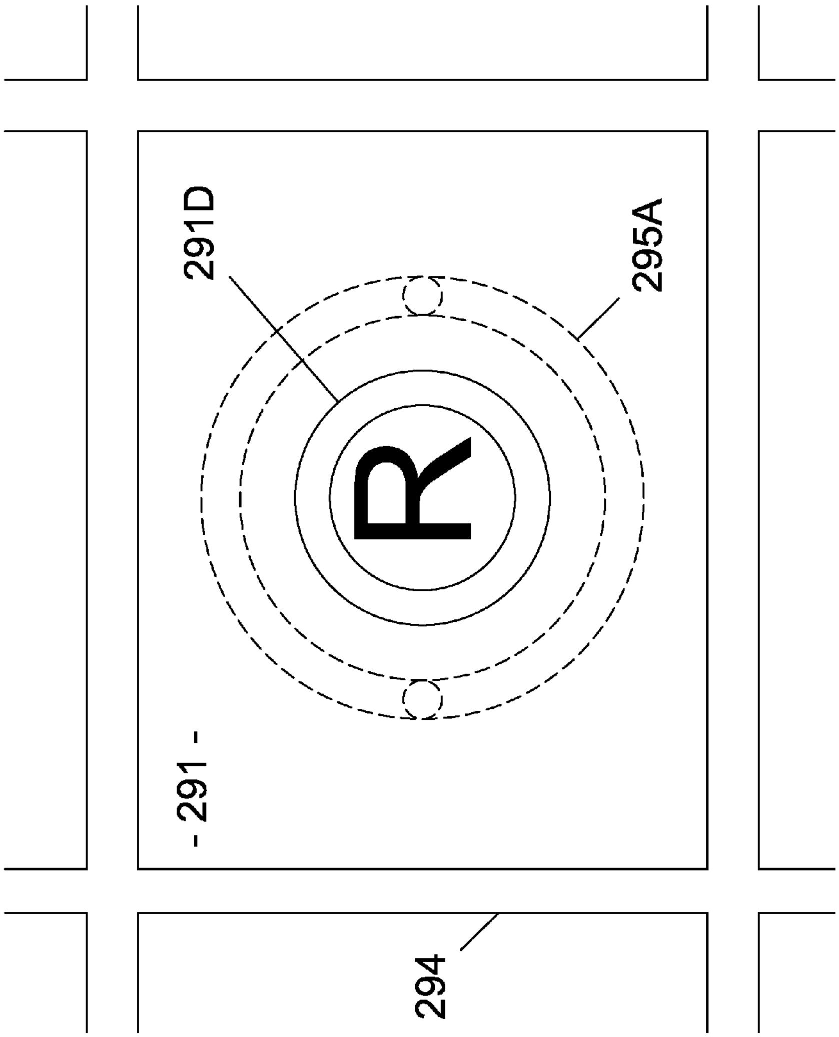
FIG. 39 is a top plan view of the key mechanism of FIG. 38.

FIG. 38 shows a different embodiment of the smart sub-surface keyboard without a flexible dome. The resistance and the restoring force are provided by an external overlay that is folded like a diaphragm. For example, flexible external overlay 291 includes folds 291A, 291B, 291C and 291D, such that overlay transparent portion 292 rests adjacent keycap 295. Keycap 295 includes stem 295A. Keycap 295 moves within receptacle 294A formed by receptacle walls 294, in response to depression of external overlay portion 292. External overlay folds 291A, 291B, 291C and 291D provide normal downward force against keycap 295 to maintain keycap 295 within receptacle 294A. FIG. 39 shows a top plan view of the keyboard of FIG. 38. Subsurface grid 294 and keycap stem 295A lie beneath flexible external overlay 291. External overlay 291 folds downwards at fold 291D.

Figure 40:
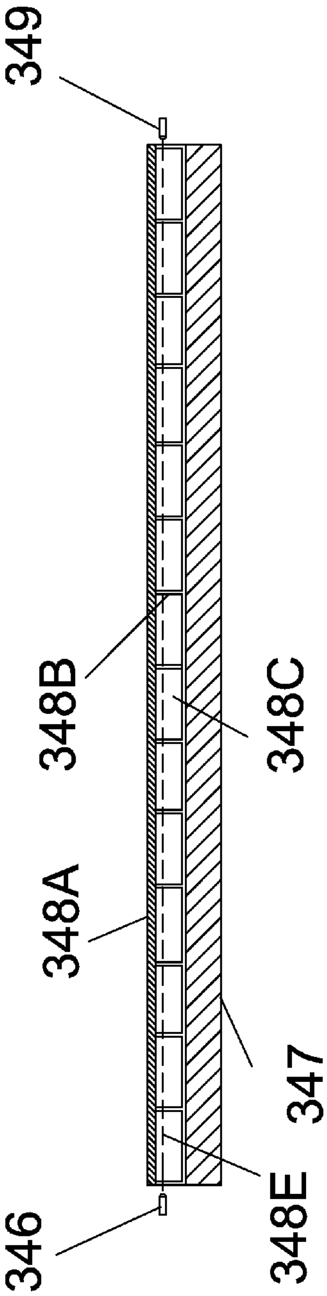
FIG. 40 is a cross-sectional side elevation of a subsurface portable computer keyboard utilizing an optical key press detection mechanism.

In other embodiments of the invention, key actuation can be detected via means other than direct closing of an electrical contact. For example, FIG. 40 shows a cross-section view of a variation of the sub-surface smart keyboard that uses light beams to detect actuation of a key. Light gun 346 is positioned beneath external overlay surface 348A, oriented to project an infrared beam parallel to surface 348A, towards infrared signal receptor 349. The light beam from light gun 346 passes through grid 348B, which is analogous in structure to grid 200 of FIG. 32 and which forms a plurality of compartments 348C which each correspond to a key. When surface 348A remains in a resting position, light from light gun 346 is received at receptor 349, thereby indicating that none of the keys corresponding to compartments 348C are being actuated by a user.

Figure 41:
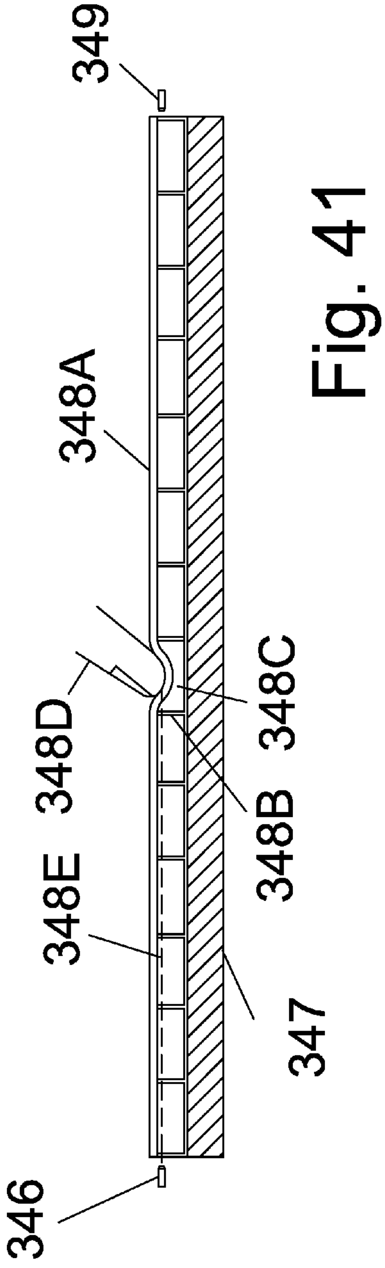
FIG. 41 illustrates the keyboard of FIG. 40, with a key in a depressed position.

FIG. 41 illustrates the keyboard of FIG. 40, when a user 348D depressed external overlay 348A above compartment 348C formed by grid 348B. External overlay 348A elastically deforms downwards into compartment 348C. Intrusion of user 348D into compartment 348C interrupts light beam 348E. The small but perceivable elastic deformation an elastic resistance of overlay 348A provides the sensation of a yielding key, thus giving the desired tactile feedback to the user. At the same time, the interruption of light ray 348E is reported by receptor 349 and interpreted by the touchscreen processor.

Figure 42:
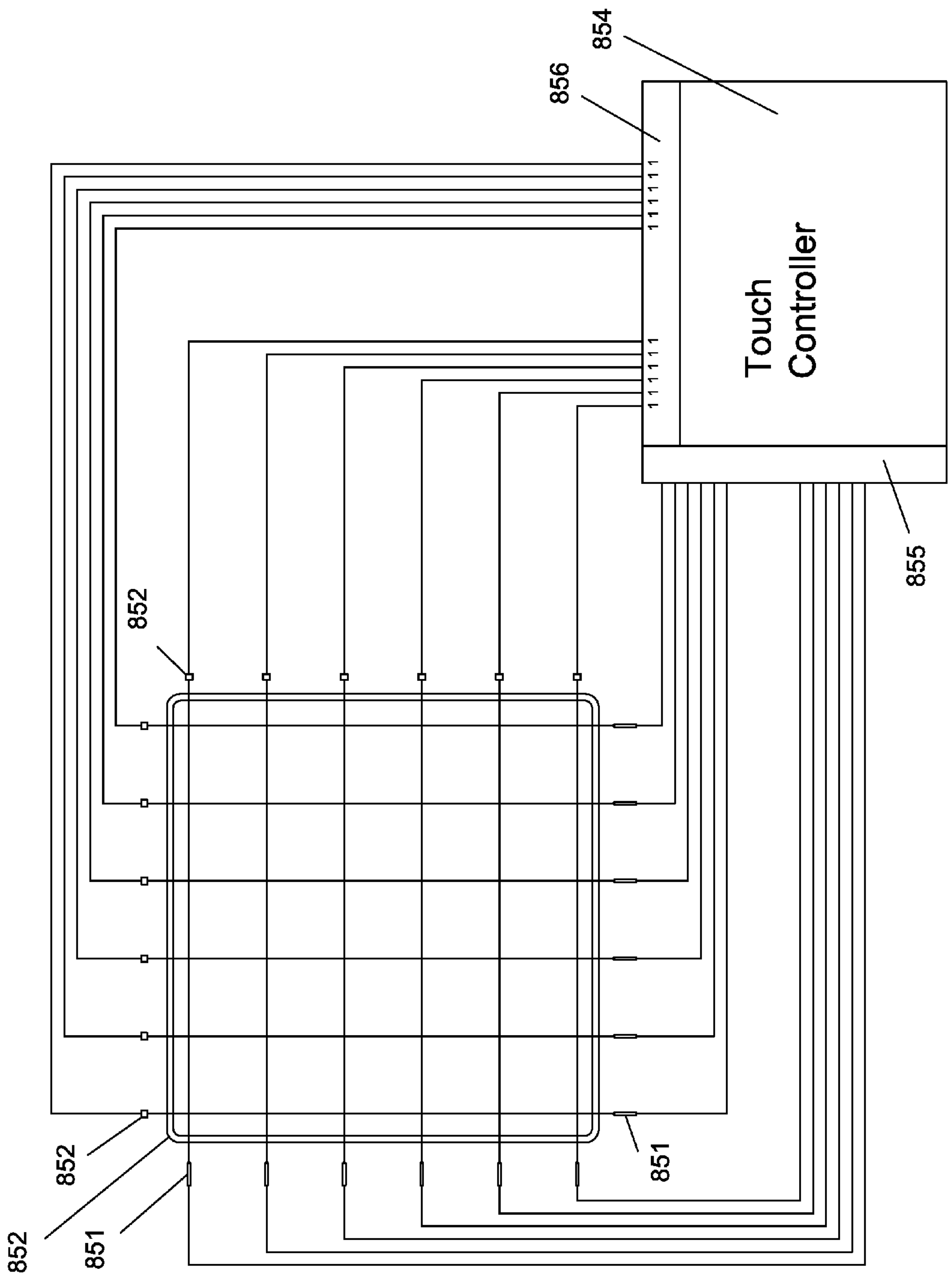
FIG. 42 is a schematic diagram of the keyboard structure of FIG. 40.

As illustrated in FIG. 42, the keyboard includes an array of light guns 851 and receptors 852 in both X and Y directions, such that each depression of a compartment interrupts two light rays. The processor can assign coordinates along X and Y axes to the point of touch to uniquely identify which key was pressed. Touch controller 854 includes an output module 855 connected to light emitters 851. Touch controller input module 856 receives signals from receptors 852. When light passes undisturbed between an emitter and receptor, input module 856 reports a signal indicative of a closed circuit.

Figure 43:
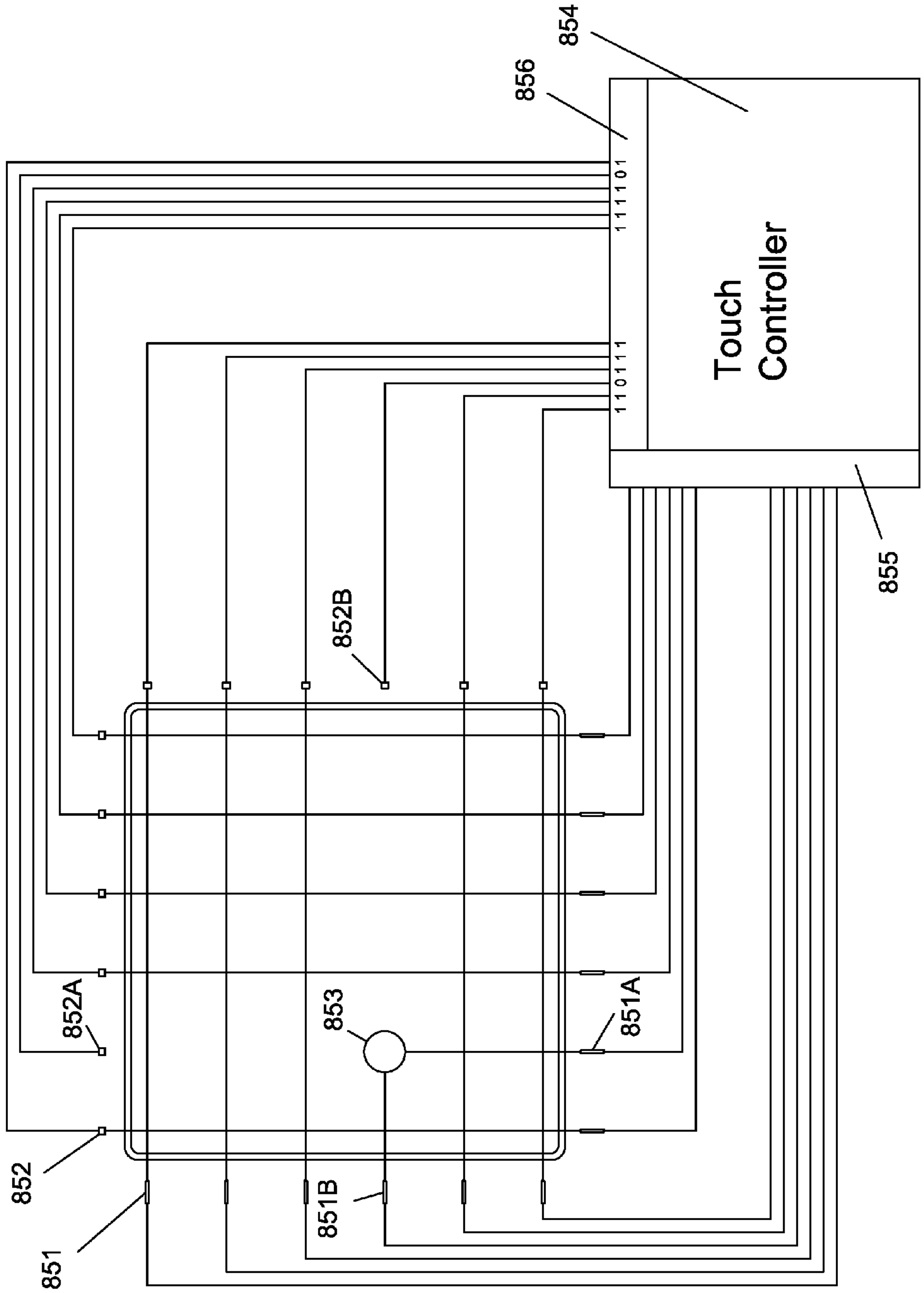
FIG. 43 is a schematic diagram of the keyboard structure of FIG. 41, having a key depressed.

FIG. 43 provides a schematic illustration of the arrangement of FIG. 42, when a user's finger has made contact with a key at position 853. Light from emitter 851A is interrupted and prevented from reaching receptor 852A. Light from emitter 851B is interrupted and prevented from reaching receptor 852B. Receptors 852A and 852B emit signals indicative of an open circuit. Touch controller 854 processes signals received at input module 856 to identify the key actuated by the user, and report the key identification to the portable computer CPU.

Figure 44:
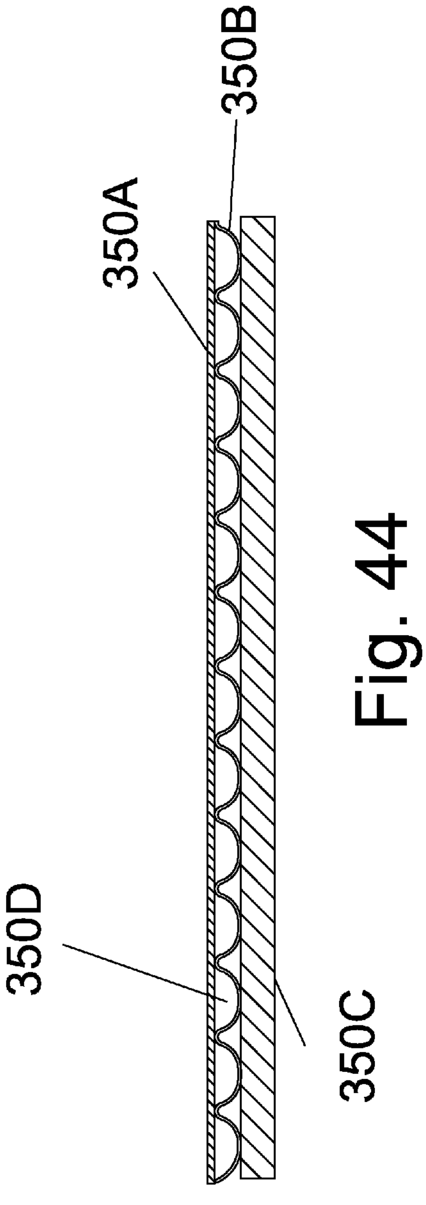
FIG. 44 illustrates a cross-sectional side elevation of another embodiment of a subsurface keyboard, utilizing a grid structure with concave depressions.
Figure 45:
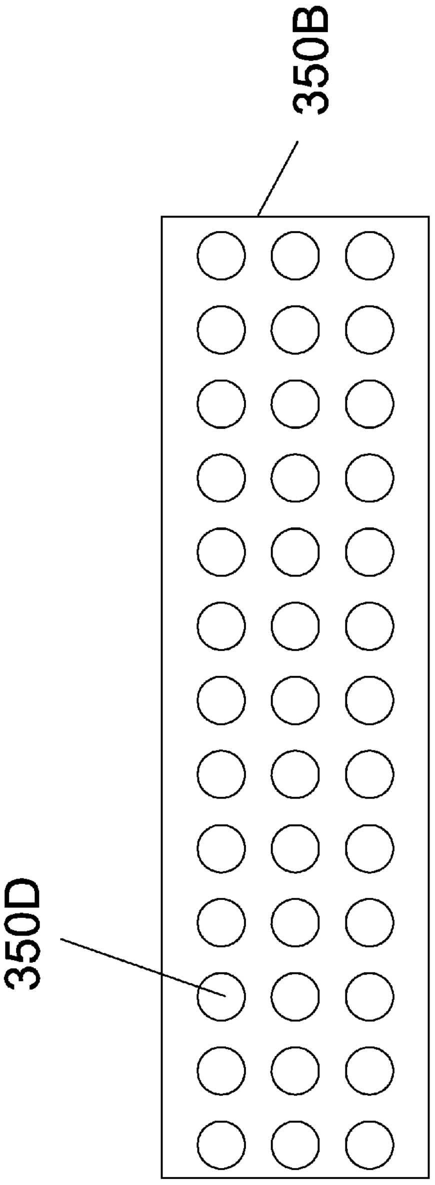
FIG. 45 is a top view of the subsurface keyboard of FIG. 44.

FIG. 44 illustrates another embodiment having a different subsurface grid structure for defining key areas. Specifically, external overlay 350A covers grid structure 350B. LCD 350C lies beneath grid 350B. In the embodiment of FIG. 44, grid 350B is shaped in a rounded, wavy pattern having a plurality of concave depressions 350D, rather than a set of criss-crossing walls extending perpendicularly down from the overlay. Providing a continuously curved grid 350B reduces the visibility of the grid to a user. Additionally, the curvature of the grid can also act as a set of lenses to magnify the appearance of key labels displayed on LCD display 350C. FIG. 45 is a top plan view of curved grid 350B, with concave depressions 350D.

While certain optical effects caused by the curvy grid in FIG. 44 may be desirable in some applications, in other applications it may be preferable to minimize optical distortions of the underlying LCD.

Figure 46:
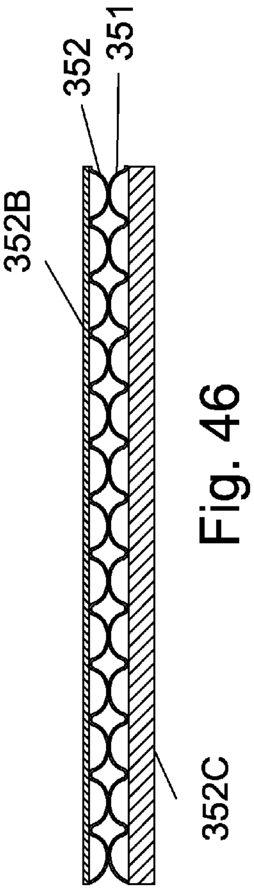
FIG. 46 is a cross-sectional side elevation of another embodiment of a subsurface keyboard, utilizing two grid structures with concave depressions.

FIG. 46 shows another embodiment that may serve to reduce optical distortions of an underlying LCD. The embodiment of FIG. 46 includes two curved grids 351 and 352, disposed between overlay 352B and LCD 352C. Grids 351 and 352 are generally mirror images of one another across a plane parallel to overlay 352B.

Figure 47:
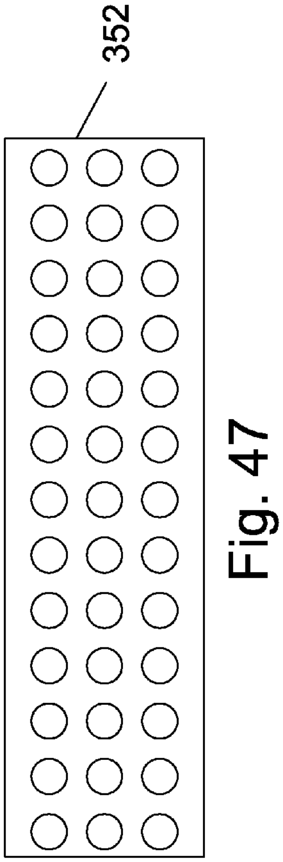
FIGS. 47 and 48 are top plan views of the grid structures in the embodiment of FIG. 46.
Figure 48:
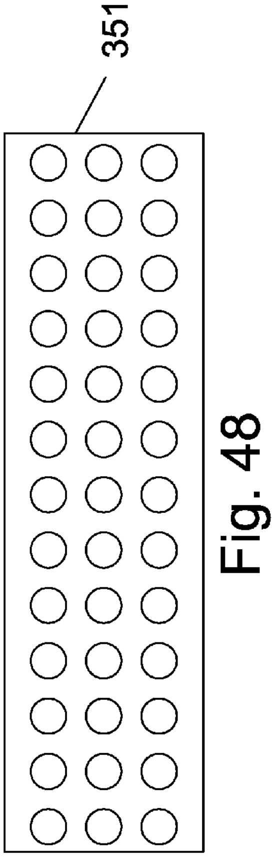

FIG. 47 provides a top plan view of curved grid 352, while FIG. 48 provides a top plan view of curved grid 351.

Figure 49:
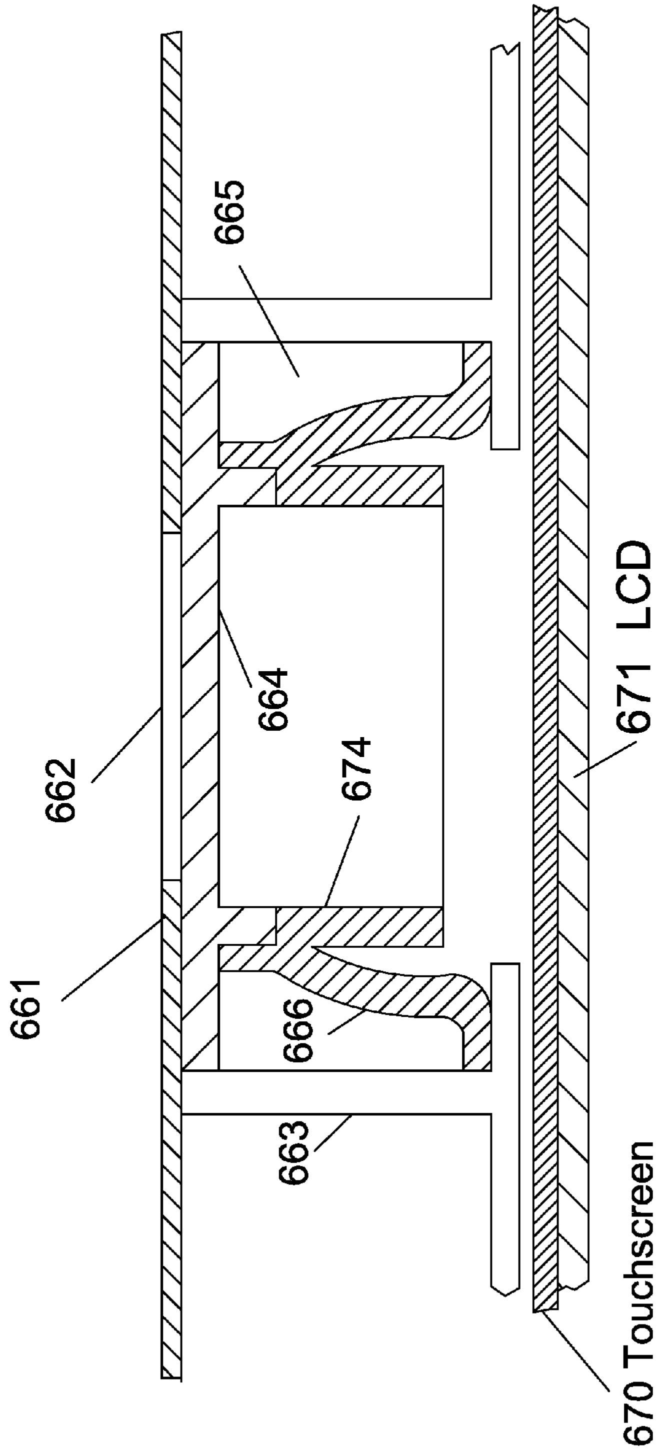
FIG. 49 is a cross-sectional side elevation of a keyboard mechanism in accordance with an embodiment of the invention that operates in conjunction with a touchscreen display.
Figure 50:
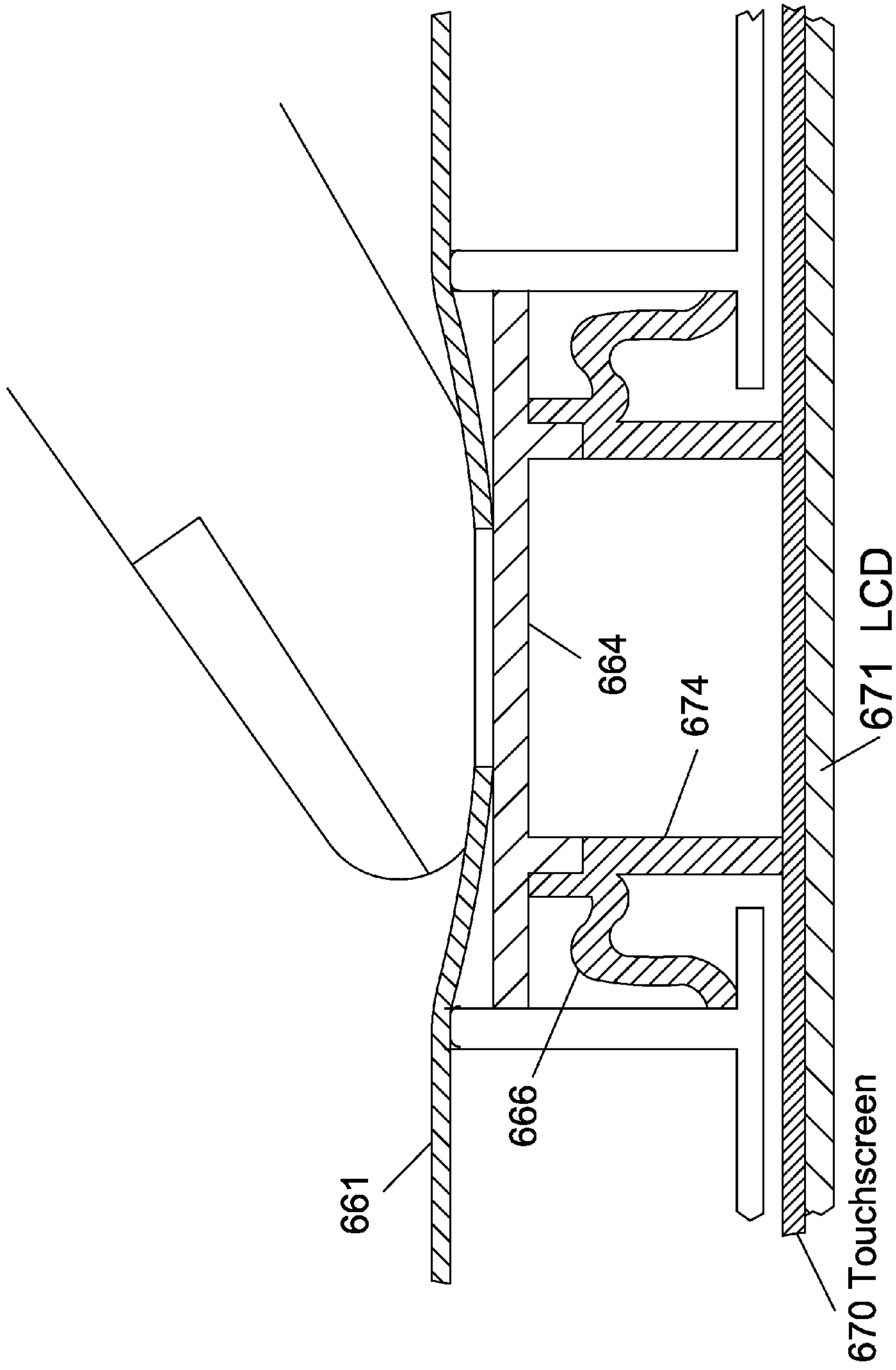
FIG. 50 illustrates the key mechanism of FIG. 49, with the key in a depressed position.
Figure 51:
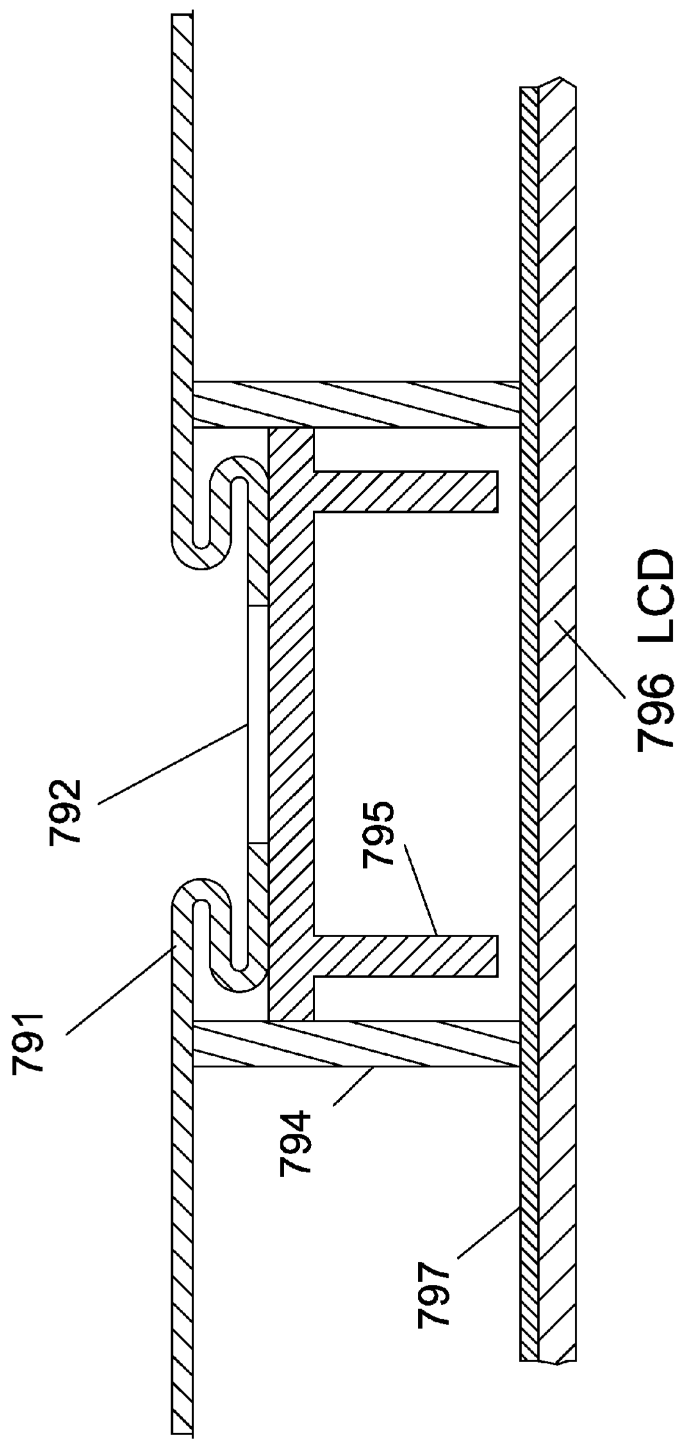
FIG. 51 illustrates another embodiment of a keyboard mechanism operable in conjunction with a touchscreen display.

The following FIGS. 49-51 show other embodiments of a smart keyboard that work in conjunction with a touchscreen display panel, but without losing the tactile feedback of a real keyboard. This will be referred to as the tactile touchscreen smart keyboard.

FIG. 49 shows a sub-surface smart keyboard with a flexible external membrane 661 featuring see-through area 662, which allows a user to see a portion of display panel 671 for display of a symbol indicative of the function associated with depression of sliding platform 664. Sliding platform 664 is normally biased towards the underside of external overlay 661 by elastic dome 666 and stem 674. Elastic dome 666 and stem 674 are maintained within compartment 665 by subsurface grid 663. Stem 674 is comprised of a material that enables contact detection by touchscreen surface 670, such as a conductive material.

When the key is depressed by the user in FIG. 50, external overlay 661 deforms downwards, and sliding platform 664 collapses elastic dome 666 and cylindrical stem 674 contacts touchscreen 670. Contact of stem 674 with touchscreen 670 indicates depression of the key associated with sliding platform 664.

FIG. 51 shows a sub-surface smart keyboard with a see-through area 792 that lets the user see the label displayed on the LCD panel underneath. This embodiment does not have a collapsible dome. The overlay 791, which is folded like a diaphragm, provides the resistance and the restoring force. When the key is depressed, the cylindrical plunger 795 touches touchscreen 797.

FIGS. 52-61 show several different embodiments of the multitasking laptop, utilizing various combinations of keyboards and displays.

Figure 52:
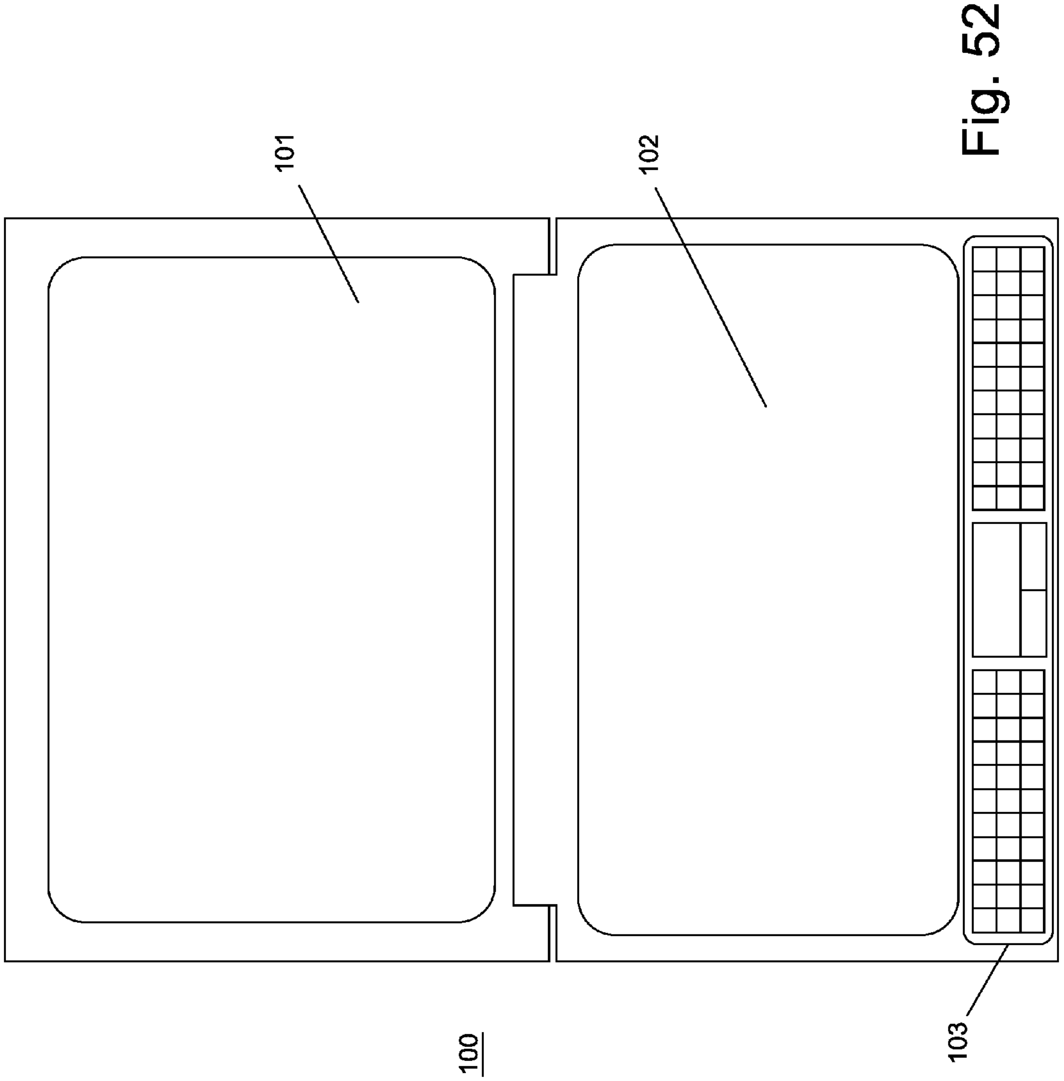
FIG. 52 is a top plan view of a portable computer having a keyboard mechanism incorporating a separate underlying display panel.

FIG. 52 shows the multitasking laptop with a large main screen 101 and a large second screen 102. The large size of the second screen is possible because of the use of a narrow smart keyboard 103 with fewer keys and smaller keys than a conventional keyboard, analogous to the embodiments of FIGS. 4, 20 and 21. The smart keyboard 103 is self-contained, i.e. it doesn't rely on the laptop screen to display its key labels. Instead, this keyboard has its own underlying small LCD, which can be an inexpensive two color LCD or LED display.

Figure 53:
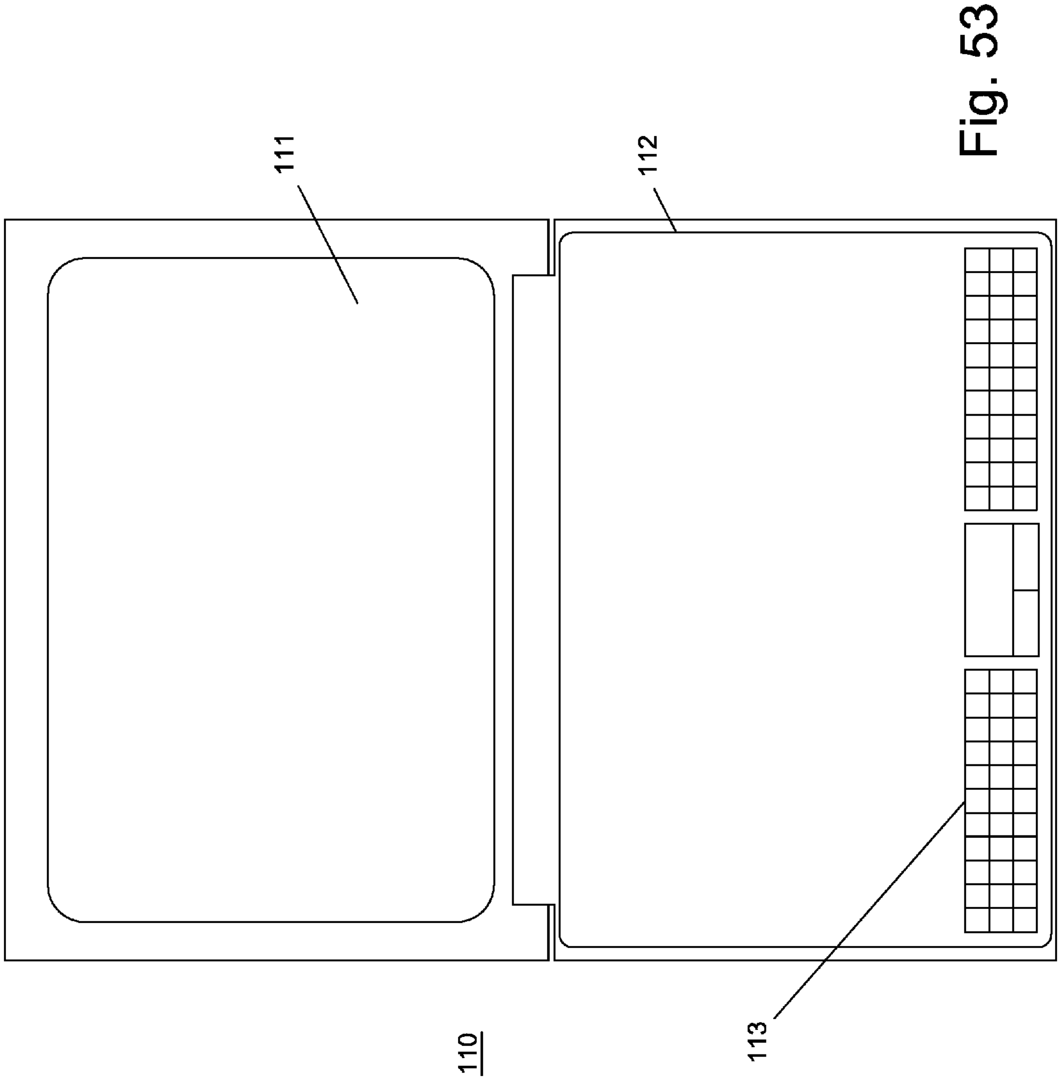
FIG. 53 is a top plan view of a portable computer having a keyboard mechanism mounted atop a portion of a base unit display panel.

In FIG. 53 the smart keyboard 113 is mounted on top of the screen 112, which displays the key labels the user can see through the transparent area of the keys.

Figure 54:
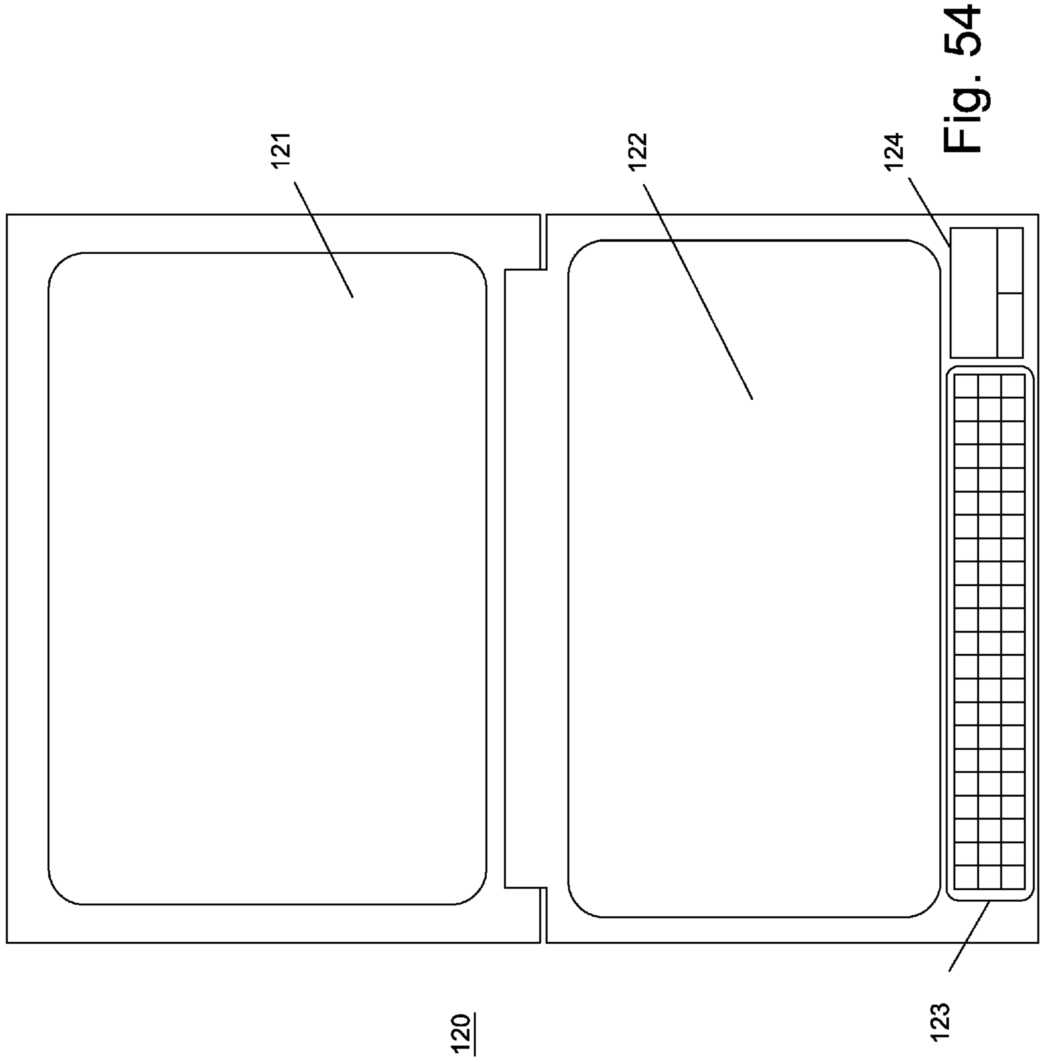
FIG. 54 is a top plan view of another embodiment of a portable computer having a keyboard mechanism with underlying display panel, and a touchpad with buttons for pointer control.

In FIG. 54 a smaller stand-alone smart keyboard 123 with its own LCD back panel is provided alongside with a separate touchpad 124 and touch buttons.

Figure 55:
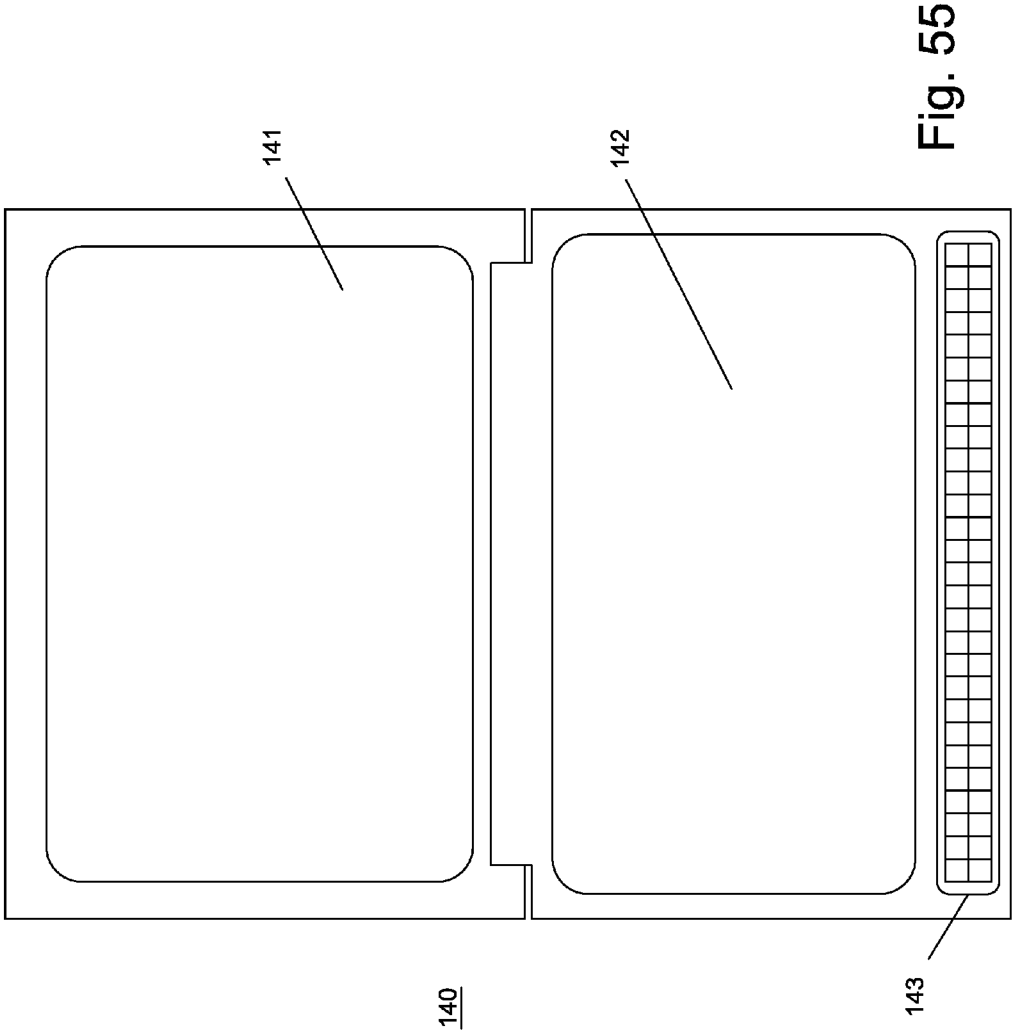
FIG. 55 is a top plan view of another embodiment of a portable computer having a smart keyboard extending across the width of the base unit.

In FIG. 55 a stand-alone smart keyboard 143 extends across the full width of the laptop base.

Figure 56:
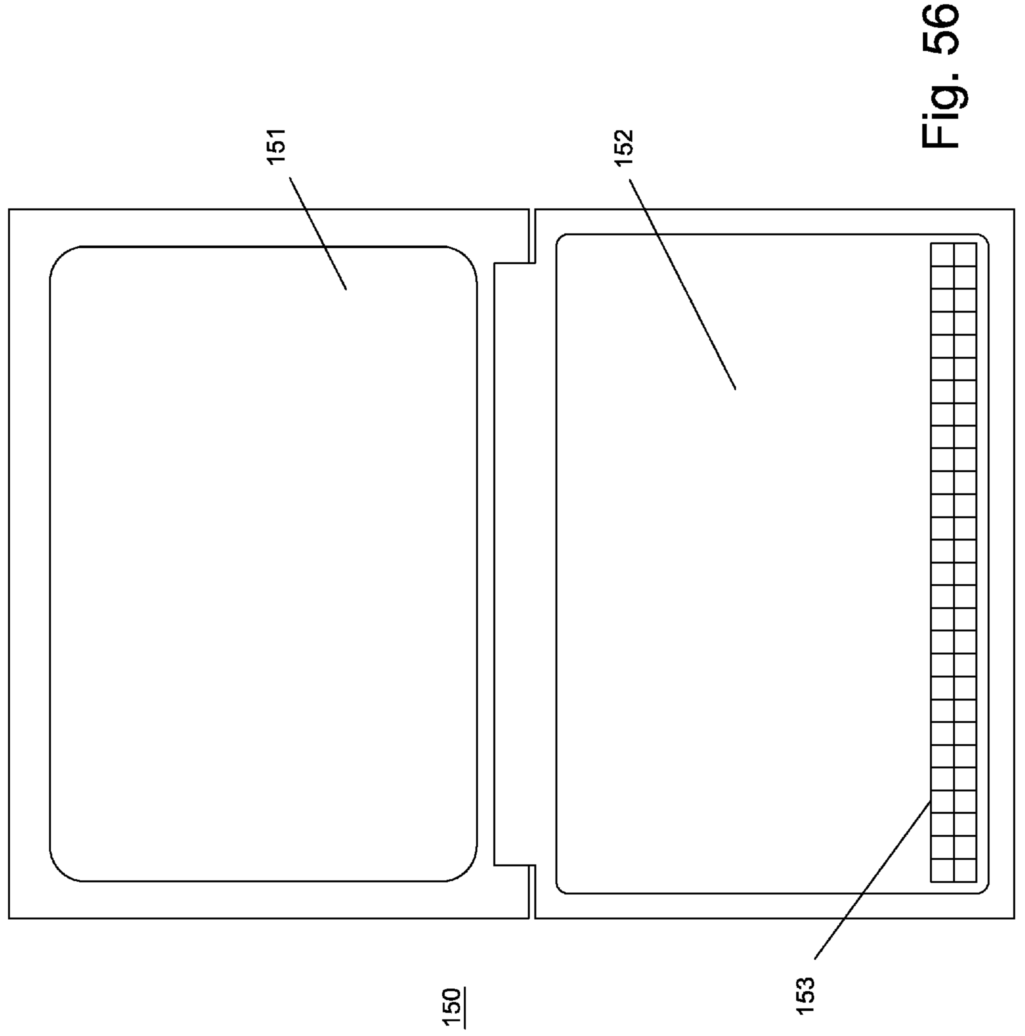
FIG. 56 is a top plan view of another embodiment of a portable computer with keyboard structure extending across a bottom portion of a base unit display.

In FIG. 56 a smart keyboard 153 mounted on top of the screen 152 extends across the full width of the laptop base.

Figure 57:
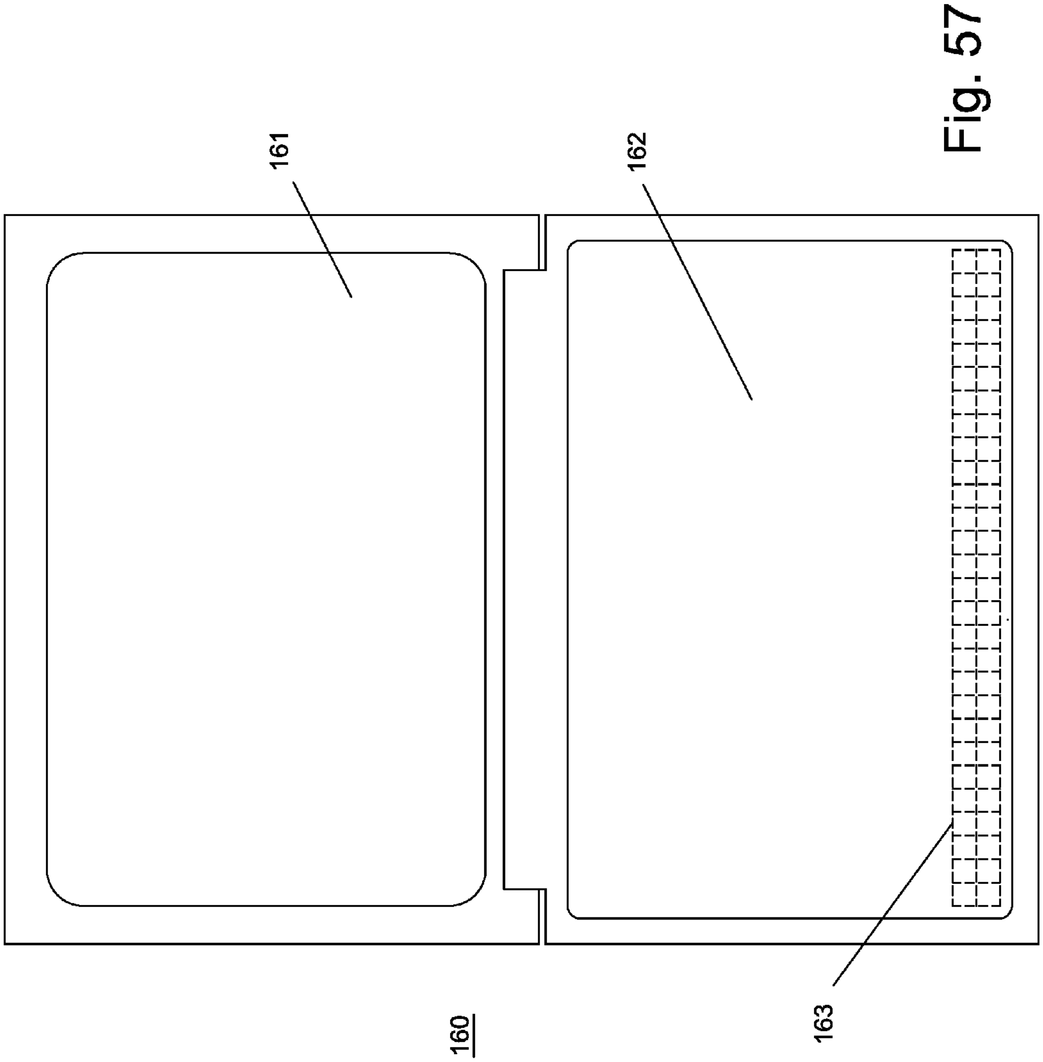
FIG. 57 is a top plan view of another embodiment of a portable computer with subsurface keyboard structure extending across a bottom portion of a base unit display.

In FIG. 57, a sub-surface smart keyboard is provided beneath screen surface 162, which keyboard includes sub-surface grid 163 as previously described in connection with, e.g., FIGS. 40-41.

Figure 58:
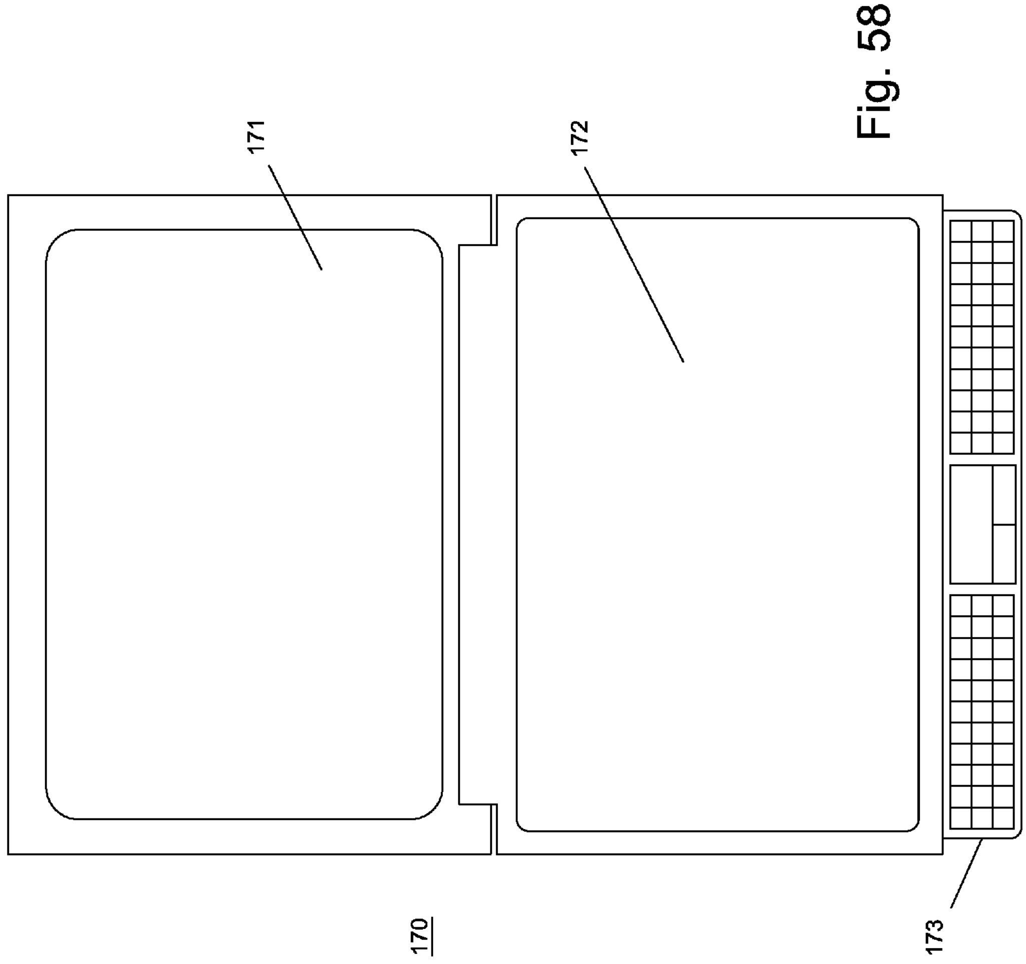
FIG. 58 is a top plan view of a further embodiment of a portable computer with a slidable keyboard structure deployed from the base unit.
Figure 59:
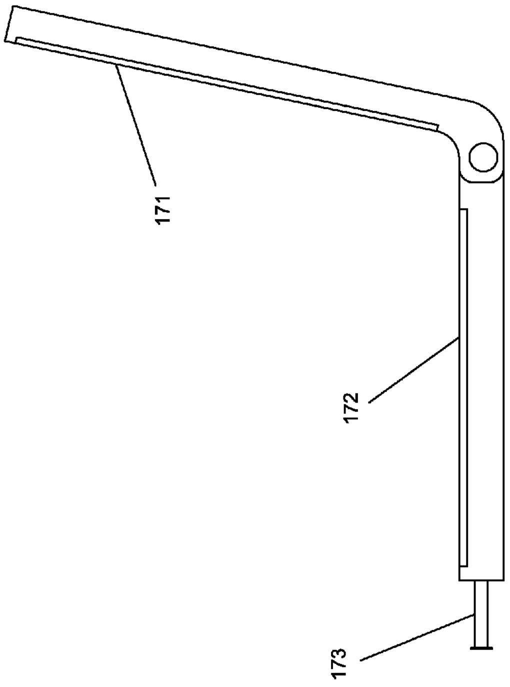
FIG. 59 is a side elevation of the computer of FIG. 58.
Figure 60:
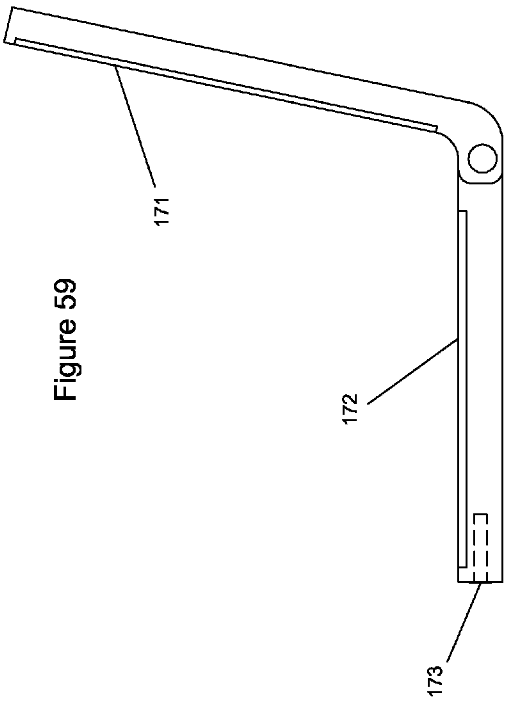
FIG. 60 is a side elevation of the computer of FIG. 39, with the keyboard structure in a withdrawn position.

In other embodiments of a clamshell configuration portable computer, a keyboard structure described herein can be selectively deployed from or stowed within the front edge of the base unit. Such an embodiment enables a user to utilize the computer solely via display unit and base unit touch-screens in some applications, while still providing an effective, tactile keyboard when desired by a user. For example, FIG. 58 shows portable computer 170, having display unit display panel 171 and base unit display panel 172. Keyboard 173 can be alternatively stowed within or deployed from portable computer 170. Keyboard 173 is constructed using a smart keyboard structure described above, whereby full-size keys can be utilized in a compact structure. The deployment method can be a button similar to the deployment mechanism of CD-ROM trays (not shown). FIG. 59 is a side elevation of computer 170, with keyboard 173 in a deployed position. FIG. 60 is a side elevation of computer 170, with keyboard 173 in a stowed position.

Figure 61:
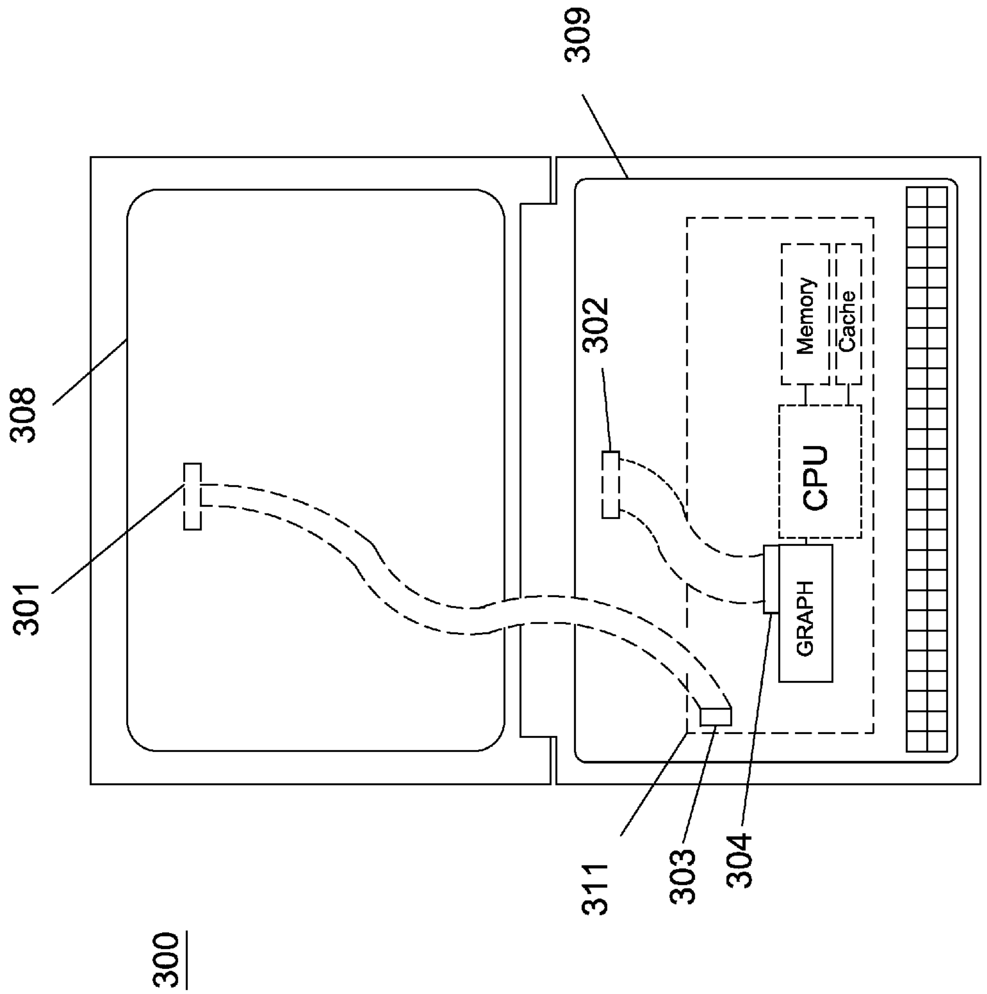
FIG. 61 is a schematic diagram of a portable computer in accordance with an exemplary embodiment having dual displays.

FIG. 61 shows one possible embodiment of the internal configuration of multitasking laptop 300, providing dual displays 308 and 309, and a smart keyboard such as that described above. The embodiment of FIG. 61 is a relatively simple approach requiring minimal custom development. In FIG. 61, the video connector 301 of the upper screen 308 is connected to the motherboard 311, in slave mode, into external video connector 303. Video connector 303 exists as a standard interface on most modern motherboards, and in some embodiments, may consist of a VGA, DVI or HDMI video connector. Video connector 303 is usually intended for an external monitor to be operated in slave mode. The motherboard's internal video connector 304 is connected to the video connector 302 of the lower screen 309. Therefore, in this configuration, the lower screen is the master screen and the upper screen is the slave screen. With this configuration it is possible to move the cursor between the two screens and cut and paste objects between the two screens.

However, with many standard motherboards, the capabilities of the slave screen are limited. For instance, if an object is minimized, it will always revert to the master screen. When modifications are made to an object located in the slave screen, typically many software applications will not allow those modifications to be made at the slave screen, and the user will have to make them in the master screen, which requires constant jumping back and forth between the two screens, which may be tiring and detrimental to user productivity. The use of the VGA connector 303 also involves digital to analog signal conversions, which increase complexity and cost.

Figure 62:
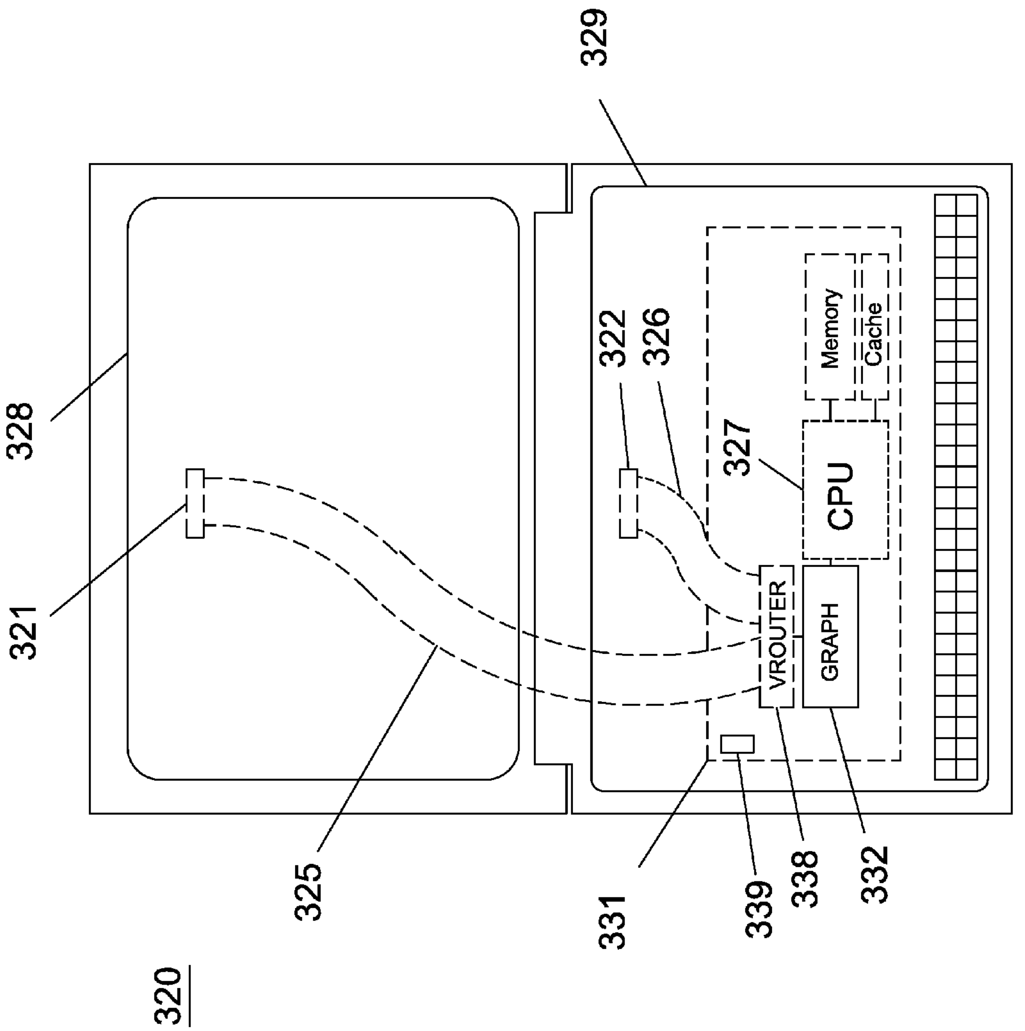
FIG. 62 is a schematic diagram of an alternative embodiment of a portable computer having dual displays.

FIG. 62 shows a further embodiment of the hardware configuration. The video cable 325 connects the graphics controller 332 (GRAPH) to both screens through Video Router 338 (VROUTER). Video Router 338 is a hardware and/or software component that selects the path for each signal coming out of the graphics controller 332. Each signal is sent either to Screen 328 or Screen 329. In this configuration the computer is truly multitasking, generating two separate independent output screens (instead of generating just one screen and allowing the user to transfer some objects to a separate slave screen). While Video Router 338 is illustrated as a separate component for conceptual clarity, in practice, video router 338 can be comprised of circuitry integrated internally into a video card or graphics controller. Video router 38 can alternatively be implemented via software or firmware or other means. Rather than requiring the use of two different video signal outputs, the configuration of FIG. 62 can work efficiently with just one type of signal, typically LVDS (low-voltage differential signaling). This configuration can be characterized as one video card running two screens.

Figure 63:
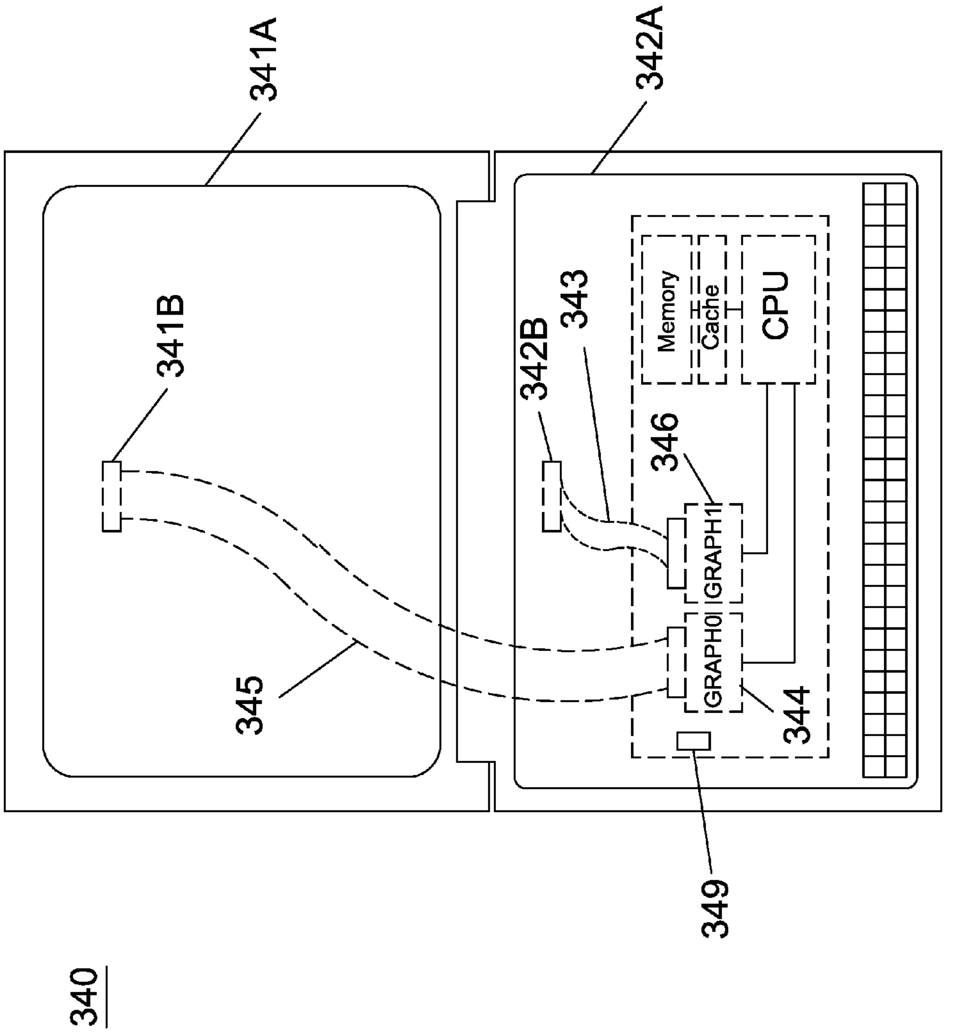
FIG. 63 is a schematic diagram of a further embodiment of a portable computer having dual displays.

FIG. 63 shows another configuration of the invention. The motherboard uses two graphics controllers to run each screen separately. Graphics controller 344 connects with top screen 341A through video cable 345 and connector 341B, while graphics controller 346 connects with bottom screen 342A through video cable 343 and display connector 342B. This configuration lends itself potentially to higher performance than the previous configuration (FIG. 62) and depending on the complexity and dynamic nature of the graphics being displayed in the two screens it may be required for some applications. Of course, the graphics controllers can be integrated directly into the motherboard circuitry, but they are shown here as separate components for the sake of conceptual clarity. This configuration can be operated in fully multitasking mode and lends itself to high performance graphics.

Figure 64:
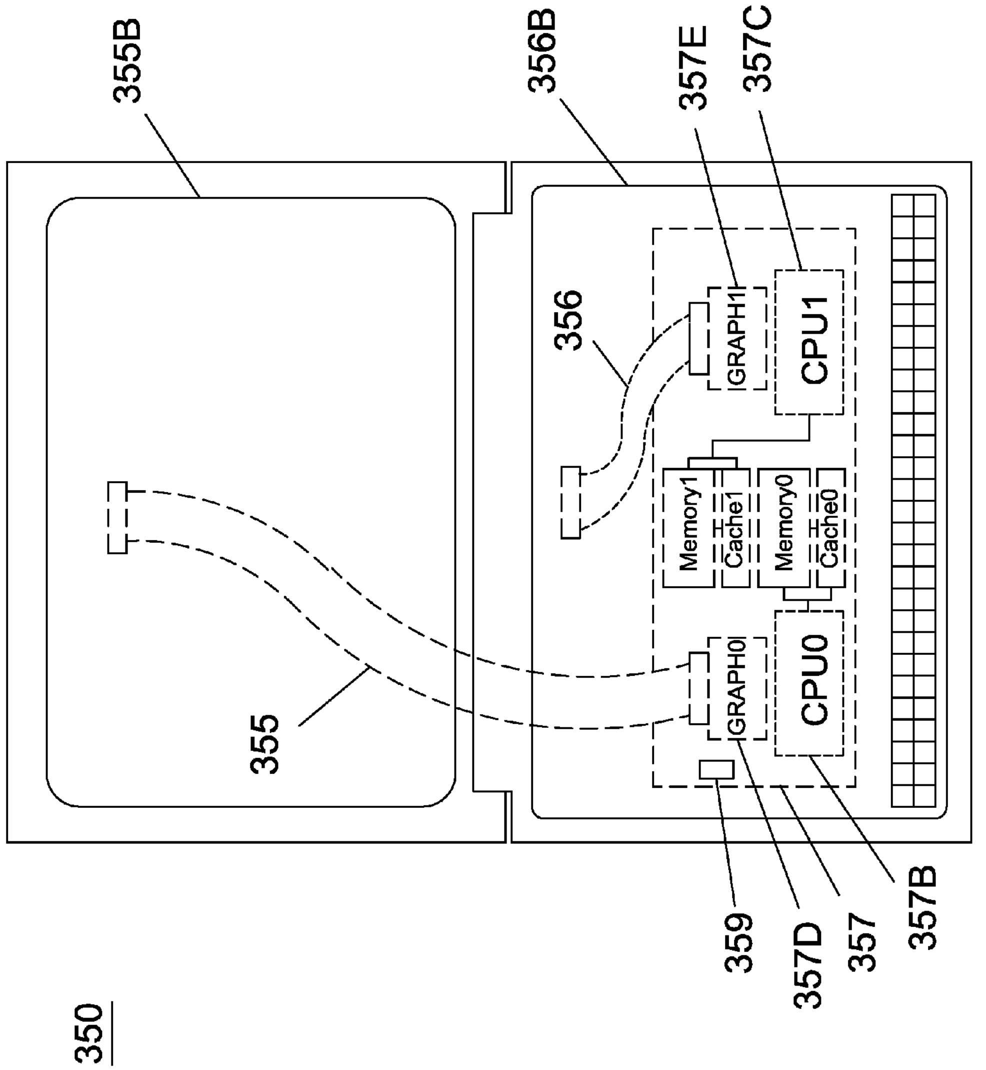
FIG. 64 is a schematic diagram of a further embodiment of a portable computer having dual displays, driven by separate CPUs and GPUs.

FIG. 64 shows another embodiment of the invention. The motherboard 357 contains two CPUs (CPU0 357B and CPU1 357C). Each CPU operates its own memory bank and cache, as well as its own graphics controller (GRAPH0 357D and GRAPH1 357E) to run screens 355B and 356B independently in fully multi-tasking mode. Of course it is also possible to share memory and cache resources between the two CPUs with the appropriate bus and bridge infrastructure. If extreme reliability and fault-tolerance are desired, the motherboard architecture should ensure that sharing of resources will not create interdependence and negate stand-alone operability in case of certain failures.

Figure 65:
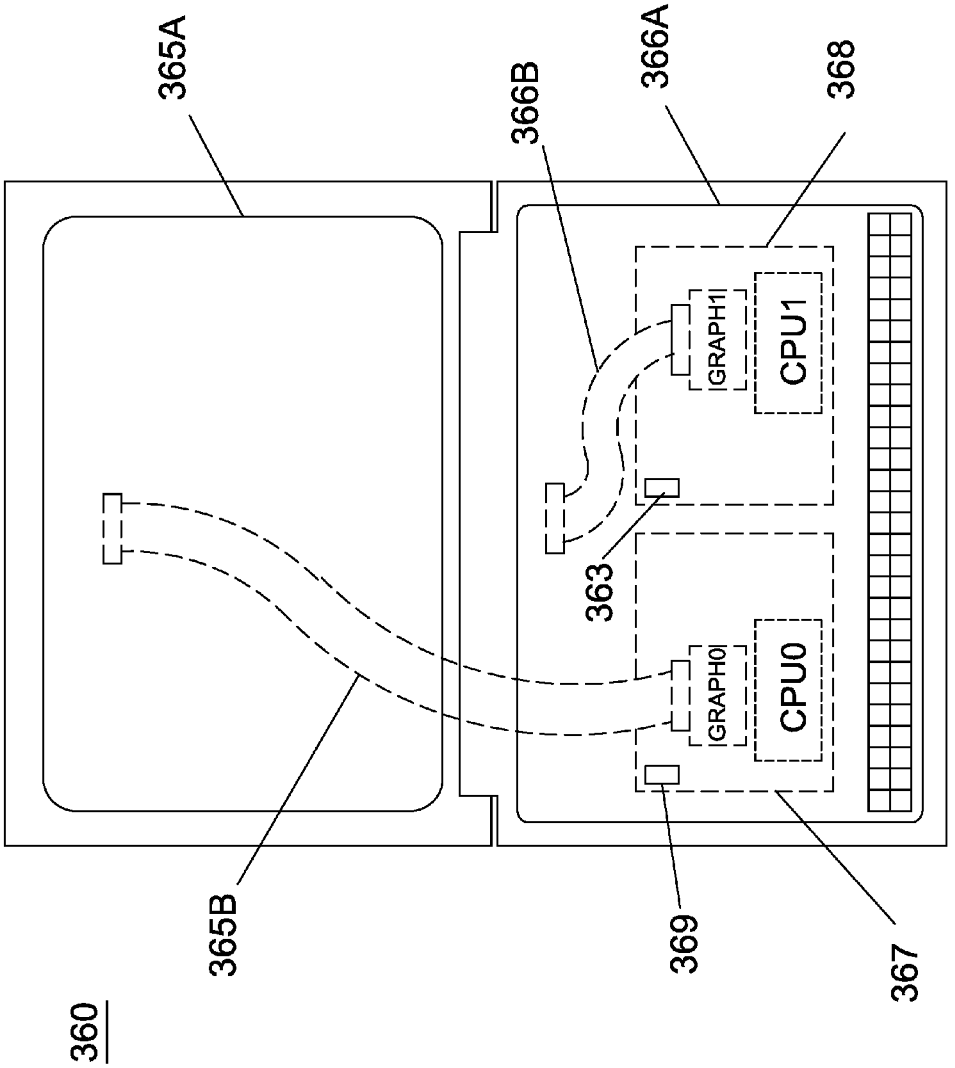
FIG. 65 is a schematic diagram of a further embodiment of a portable computer having dual independently operable motherboards.

FIG. 65 shows another embodiment of the invention, in which computer 360 includes two motherboards 367 and 368, each with its own processor (CPU0 and CPU1). CPU0 and CPU1 drive separately, fully-multitasking graphics controllers GRAPH0 and GRAPH1, respectively. The output of GRAPH0 controls display 365A via cable 365B, while the output of GRAPH1 controls display 366A via cable 366B. In other embodiments, it is also possible to configure one of the two motherboards as a daughterboard of the other in order to share some resources. The configuration of FIG. 44 lends itself to extreme high performance and simultaneously a high degree of fault-tolerance. Optionally, providing a connecting bus between motherboards 367 and 368 can increase performance even further (possibly at the cost of sacrificing some degree of fault-tolerance).

Figure 66:
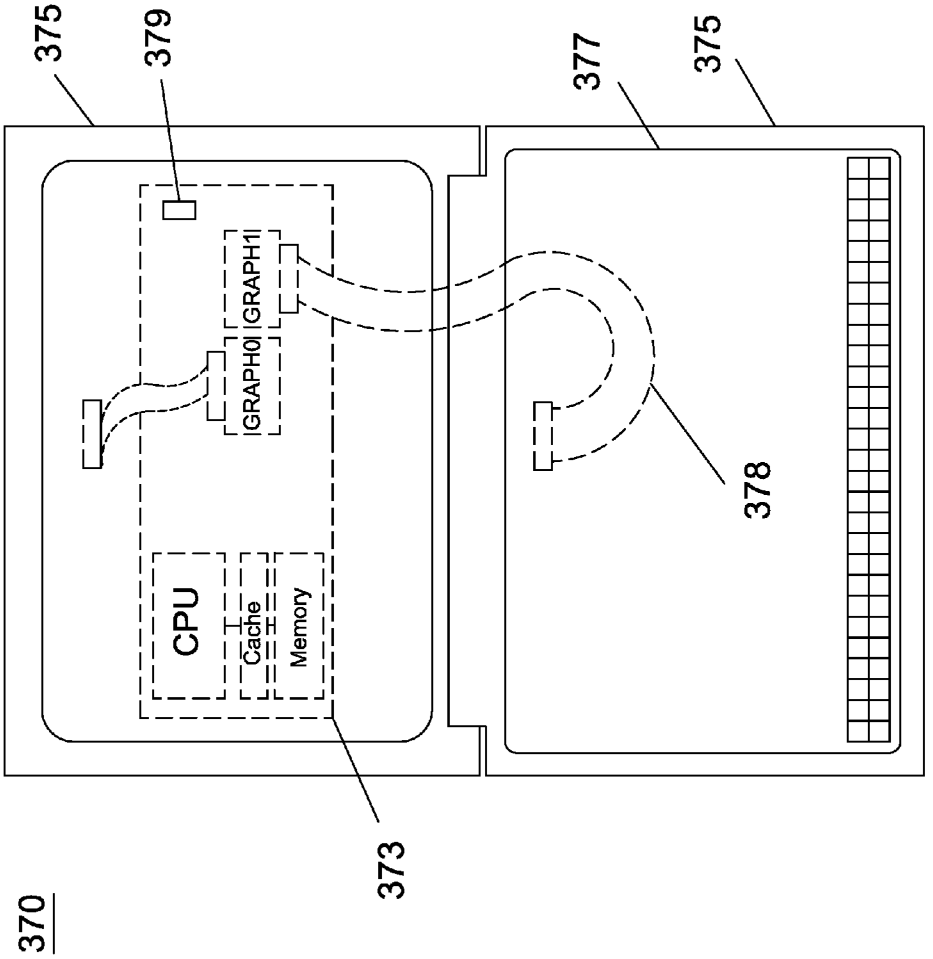
FIG. 66 is a schematic diagram of a further embodiment of a portable computer having a motherboard within the display unit.

While embodiments described above include motherboards within the base portion of a portable computer, it is understood that other embodiments may alternatively include a motherboard and associated components within the display unit. FIG. 66 shows such an embodiment, in which portable computer 370 includes motherboard 373, which is located inside the display unit 375 instead of the base unit 376. Motherboard 373 drives base unit display 377 via cable 378.

Figure 67:
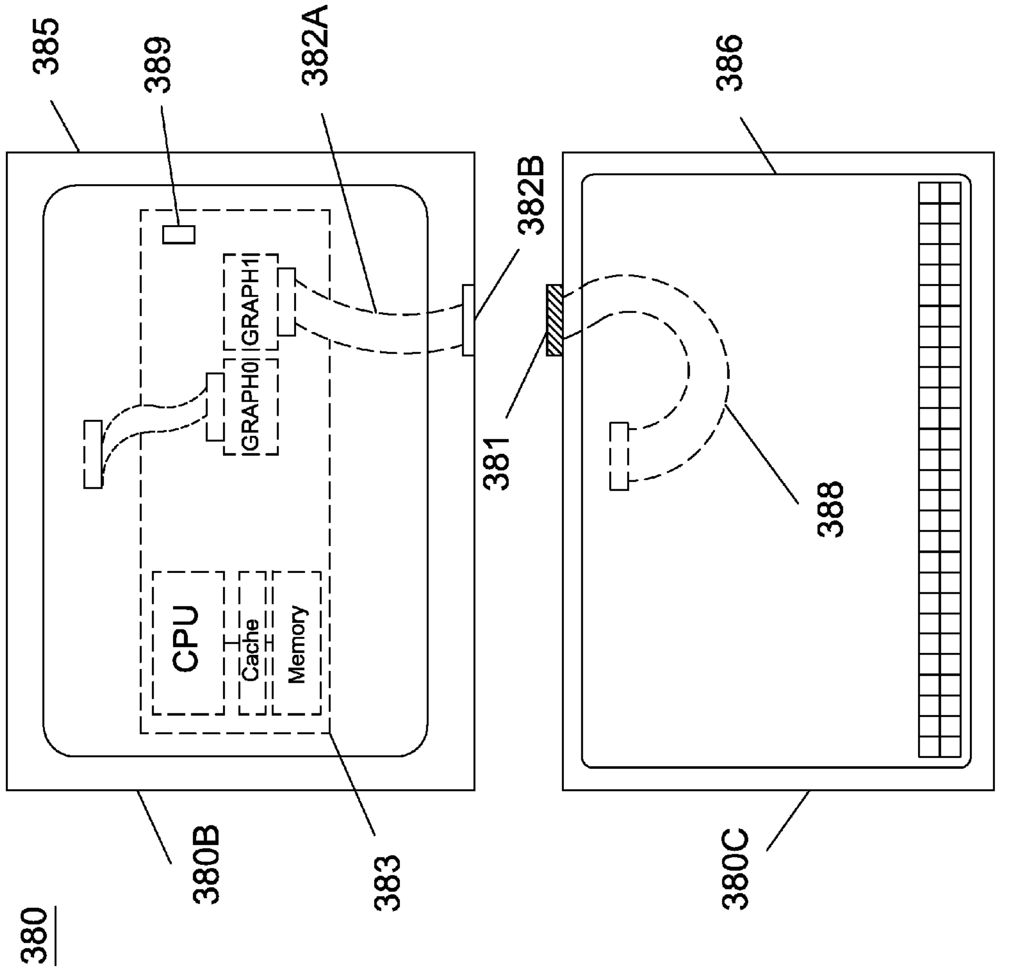
FIG. 67 is a schematic diagram of a further embodiment of a portable computer having dual displays, where the display unit is separable from the base unit and independently operable.

FIG. 67 shows a variation of the previous embodiment (FIG. 66) wherein portable computer 380A includes display unit 380B and base unit 380C. Display unit 380B contains motherboard 383 and display panel 385. Motherboard 383 includes two graphics controllers GRAPH0 and GRAPH1, which drive display unit display panel 385 and base unit display panel 386, respectively. Display unit 380B is separable from base unit 380C for portability purposes. When separated, display unit 380B can be utilized in a standalone manner, as a tablet computer. When display unit 380B is connected with base unit 380C, motherboard 383 and graphics controller GRAPH1 drive base unit display panel 386 via cable 382A, display unit connector 382B, base unit connector 381 and cable 388. Connector 382B can be removably engaged with base unit connector 381.

Figure 68:
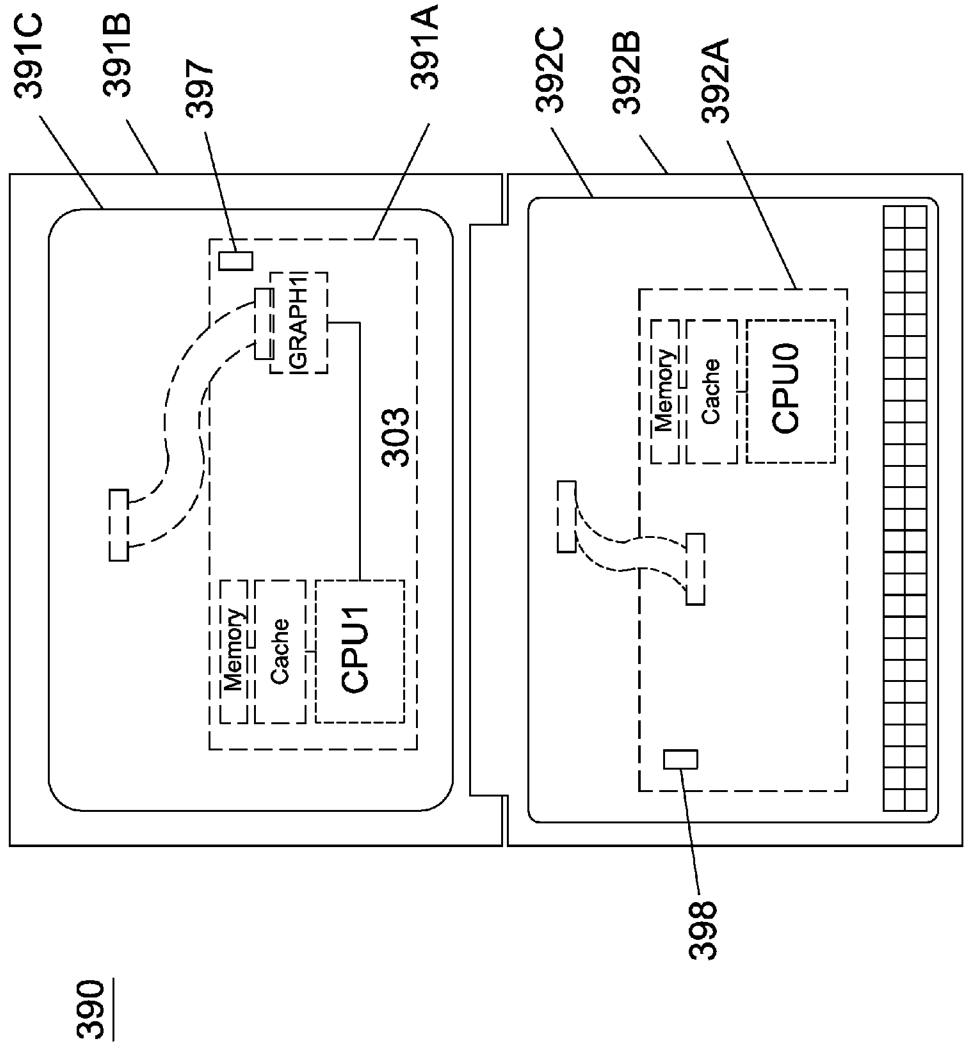
FIG. 68 is a schematic diagram of a further embodiment of a portable computer having dual displays, where the base unit and display unit each contain a motherboard and processor driving their respective displays.

While the embodiment of FIG. 65 includes two motherboards housed within a portable computer base unit, in other embodiments it may be desirable to distribute components different between the base and display units. FIG. 68 shows another embodiment of the invention in which first motherboard 391A is housed in display unit 391B, and second motherboard 392A is housed in base unit 392B. Each of motherboards 391A and 392A include a processor driving corresponding screens 391C and 392C, respectively. This configuration can provide extreme performance as well as a high level of fault-tolerance.

Figure 69:
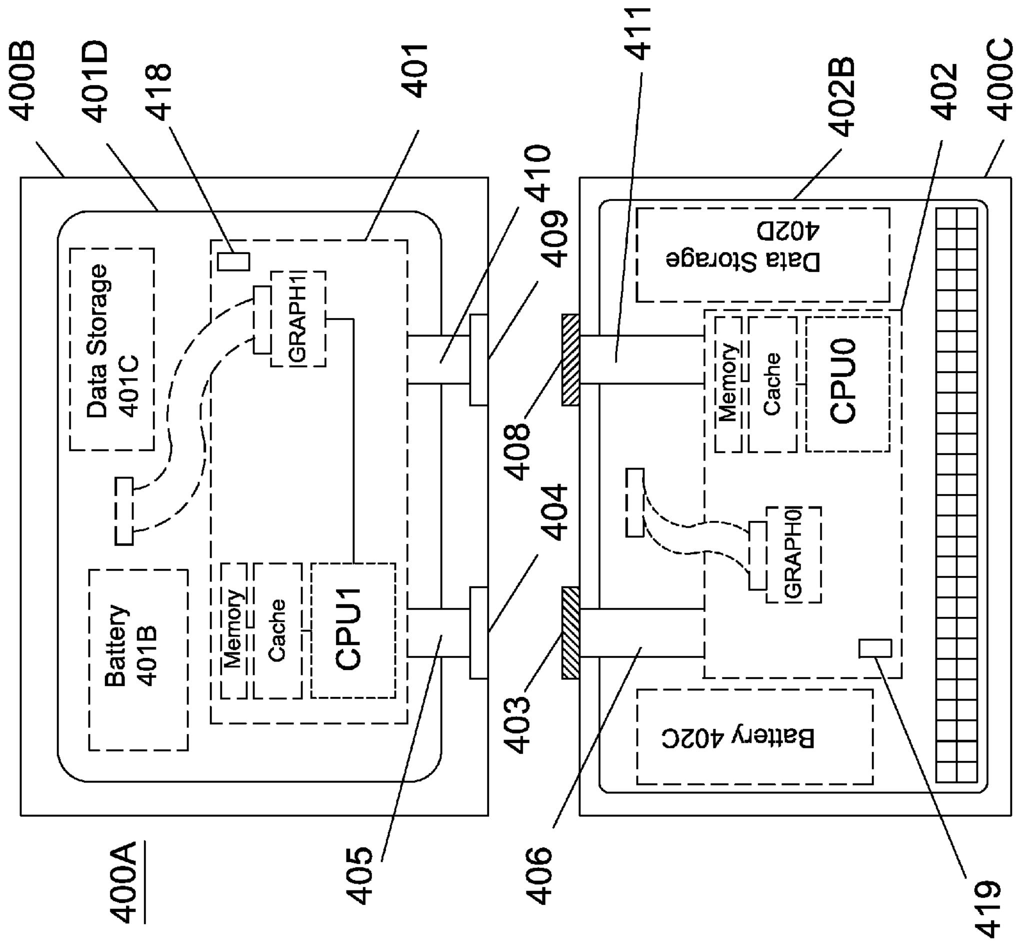
FIG. 69 is a schematic diagram of a further embodiment of a portable computer having dual displays, where the base unit and display unit are separable and each contain a motherboard.

FIG. 69 shows a variation of the previous embodiment (FIG. 68) wherein portable computer 400A includes display unit 400B and base unit 400C. Display unit 400B houses motherboard 401, while base unit 400C houses motherboard 402. Display unit 400B is separable from base unit 400C for portability purposes. Since display unit 400B has its own motherboard 401, processor CPU1 and display panel 401D, it can operate as an autonomous tablet computer when separated from base unit 400C. For that purpose the display unit is also ideally equipped with battery 401B for energy storage and with a data storage device 401C, such as a hard disk, ideally a solid state disk. Base unit 400C also has its own motherboard 402, processor CPU0 and screen 402B, and therefore continues to be fully operable even when the display unit has been removed. While not required in all embodiments, interface connectors 403/404 and 408/409 (which link the connectors with the corresponding motherboards through cable/bus 405, 406, 410 and 411) are provided for data synchronization purposes between the two units, and also to allow the two units to cooperate with each other in a multitasking mode (for instance by both recognizing the same cursor, which can be dragged between the two screens at any time when the two units are coupled together). When working together, base unit 400C also makes its larger hard disk 402D and its higher capacity battery 402C accessible to display unit 400B, all of which is enabled by the interface connectors 403/404 and 408/409 that link motherboards 401 and 402.

Figure 71:
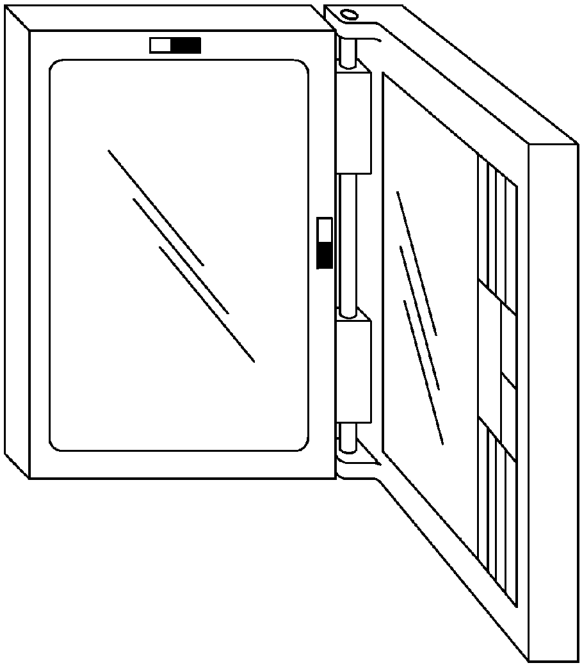
FIG. 71 is a perspective view of the portable computer of FIG. 69, in which the base unit and display unit are engaged.
Figure 70:
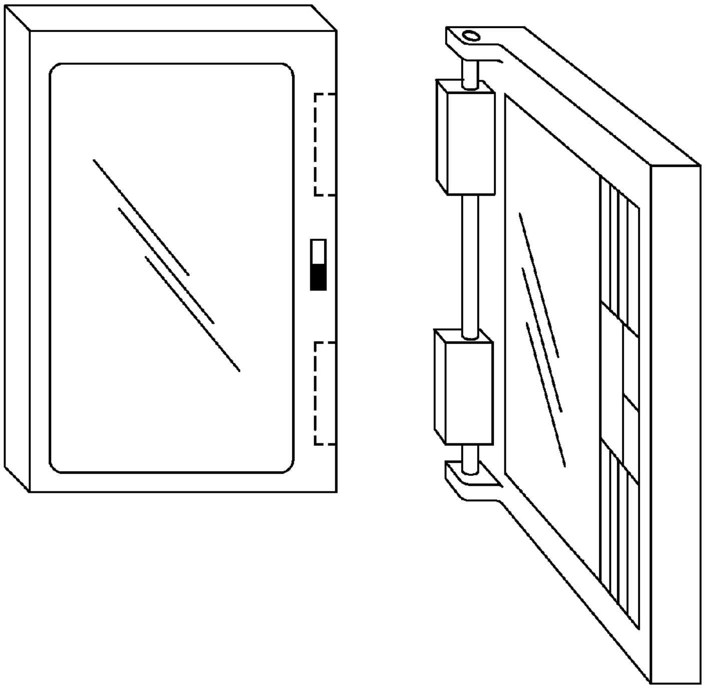
FIG. 70 is a perspective view of the portable computer of FIG. 69, in which the base unit and display unit are separated.

FIG. 70 is a perspective view of the embodiment of FIG. 69, showing the two separable units in the decoupled position, each one with a screen, and the connectors that allow them to work together as a multitasking system when coupled together. FIG. 71 shows the units coupled together.

Figure 72:
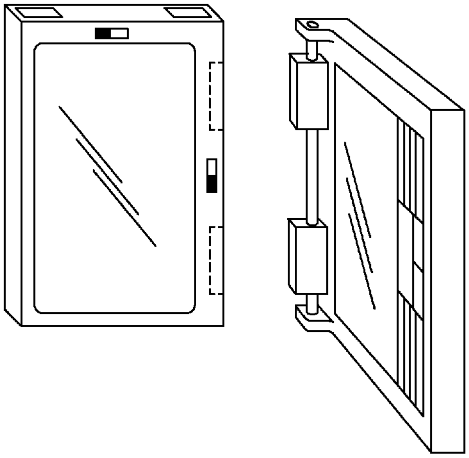
FIG. 72 is a perspective view of another embodiment of a portable computer with removable display unit, having two base unit connectors removably engageable with the display unit in landscape or portrait orientations.
Figure 74:
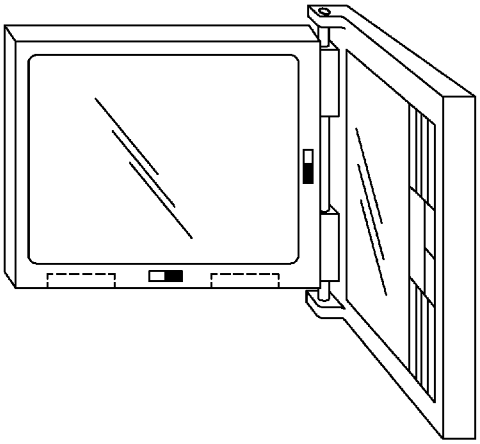
FIG. 74 is a perspective view of the portable computer of FIG. 72, with the display engaged in a portrait orientation.
Figure 73:
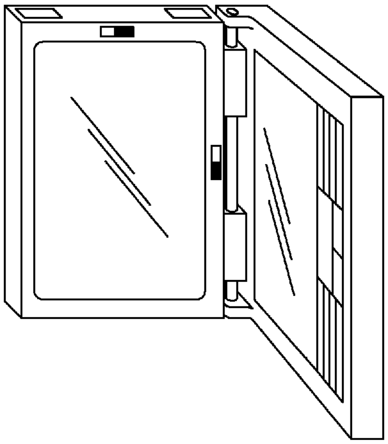
FIG. 73 is a perspective view of the portable computer of FIG. 72, with the display engaged in a landscape orientation.

FIG. 72 is a variation of the embodiment of FIG. 70 wherein the separable display unit is equipped with connectors on two adjacent sides, in order to be able to couple the units together in either landscape or portrait position. FIG. 73 shows the two units coupled in landscape mode. FIG. 74 shows the two units coupled in portrait mode. Further details of mechanisms enabling coupling and decoupling of base and display units in FIGS. 70-74 are described in Applicant's U.S. Pat. No. 7,656,652, issued on Feb. 2, 2010; Applicant's copending U.S. patent application Ser. No. 12/634,672, filed Dec. 9, 2009; Applicant's copending U.S. patent application Ser. No. 12/856,686, filed Aug. 16, 2010; and Applicant's copending U.S. patent application Ser. No. 12/856,687, filed Aug. 16, 2010; the contents of which are hereby incorporated by reference.

Figure 75:
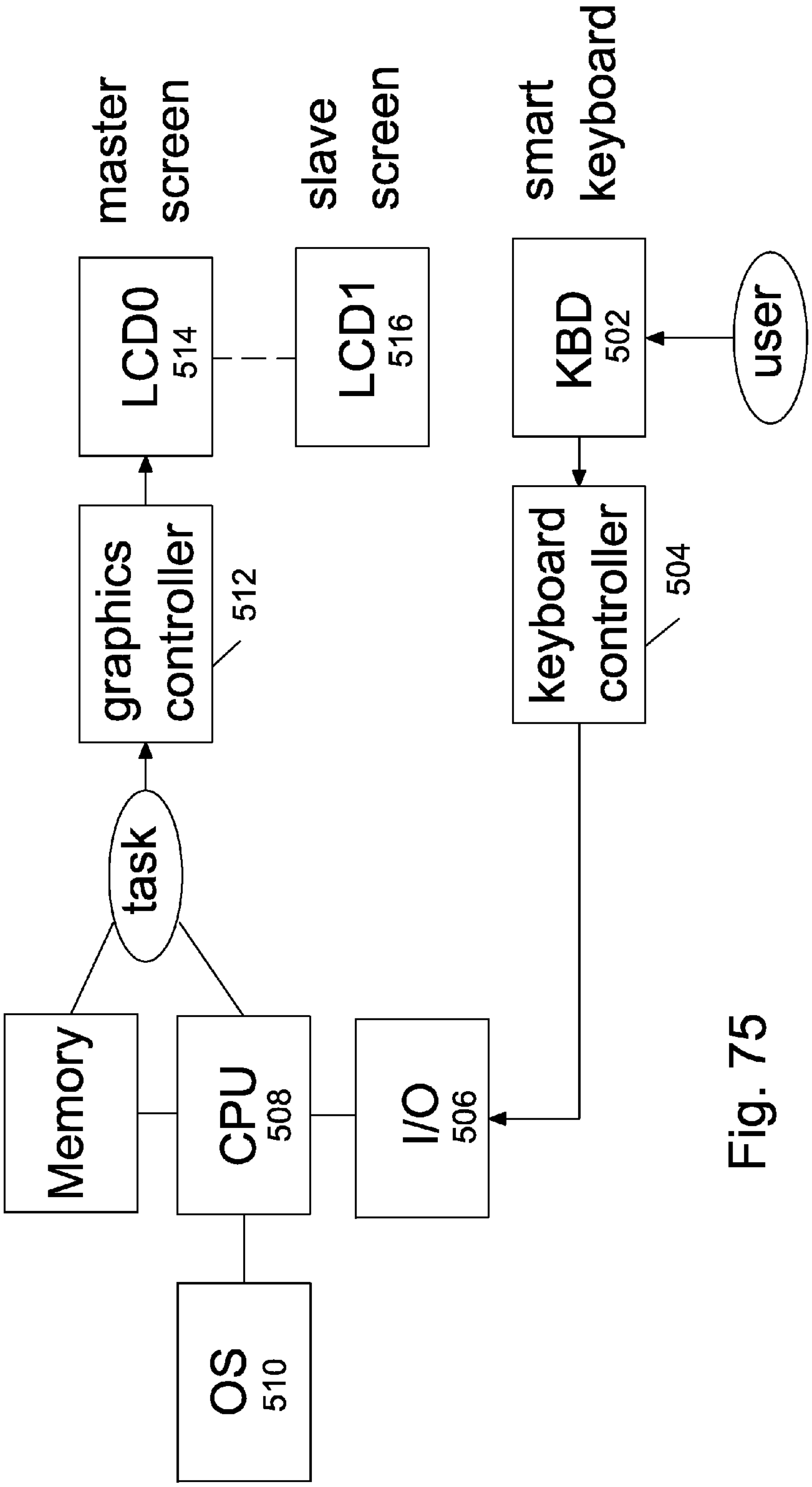
FIG. 75 is a schematic logic diagram of a dual screen portable computer.

FIG. 75 is a logic diagram of the master/slave configuration for the dual screens, such as that illustrated in FIG. 61. The user enters a command (e.g. by clicking on the icon representing a task or a program) at the keyboard 502 (KBD), which conveys it through the keyboard controller 504 to the Input/Output unit 506 (I/O) on the motherboard and then to the CPU 508. CPU 508 uses logic and instructions contained in Operating System 510 (OS) to create a task or process, which generates output. The output destined to the console is processed by the graphics controller 512, which sends the resulting image(s) to master screen 514, which displays it. The user can manually select objects from master screen 514 and transfer them to slave screen 516, for instance by dragging them over with the mouse.

Figure 76:
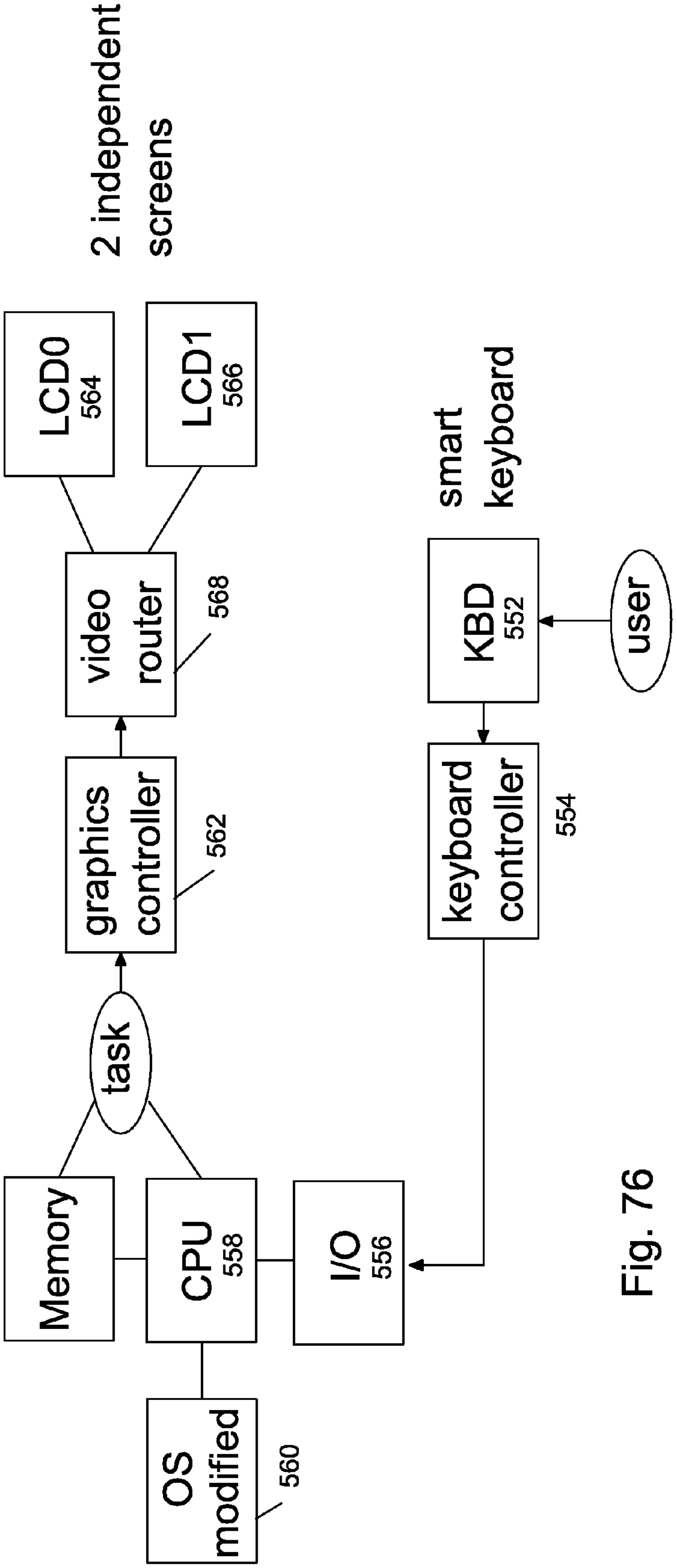
FIG. 76 is a schematic diagram of an alternative embodiment of a dual screen portable computer.

FIG. 76 shows an embodiment of the new logic needed to implement the current invention for increased efficiency and convenience. The user enters a command (e.g. by clicking on the icon representing a task or a program) at keyboard 552 (KBD), which conveys it through keyboard controller 554 to Input/Output unit 556 (I/O) on the motherboard and then to CPU 558. CPU 558 uses the logic and instructions contained in Modified Operating System 560 (OS) to create a task or process, which generates output. The output destined to the console is processed by graphics controller 562, which sends the resulting image(s) to one of two screens 564 and 566 according to the routing instructions contained in Modified Operating System 560 and user preferences previously obtained from the user (for instance, preferences regarding where to show the output of a particular task). Video router 568 (which can be a hardware, software and/or firmware component) routes the video output to the desired screen. The two screens LCD0 564 and LCD1 566 are now not in a master/slave relationship any longer, but instead in a more efficient independent status situation which makes true full multitasking operation of the computer possible.

FIGS. 77-86 illustrate usage and advantages of certain embodiments of the invention, as well as important software and user interface features of such embodiments.

Figure 77:
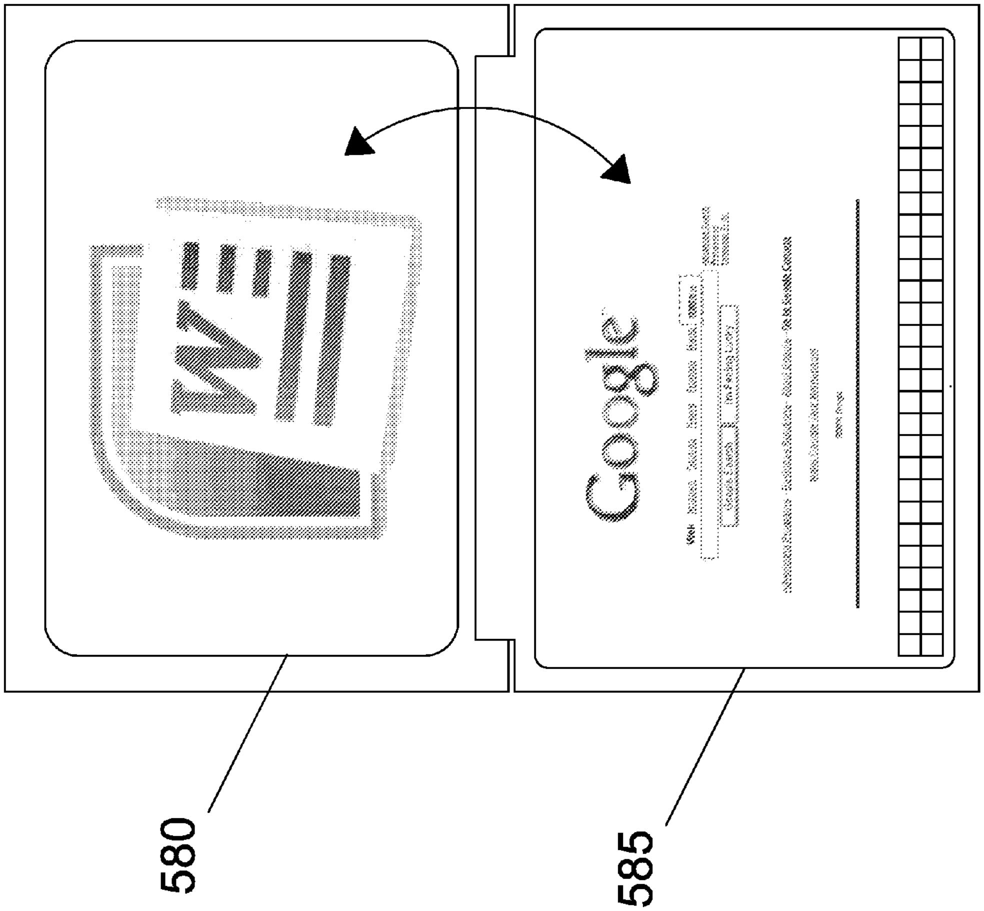
FIGS. 77-81 are schematic views of multitasking environments enabled by certain embodiments of a dual screen portable computer.

FIG. 77 illustrates how a user can conveniently multi-task with a laptop computer constructed in accordance with embodiments described hereinabove. The user can work simultaneously on a document such as a Microsoft Word document on display unit screen 580, while simultaneously conducting Internet searches on Google, Yahoo, Bing or other search engines on base unit screen 585 whenever some additional information is needed for the Word document that would require a search.

Figure 78:
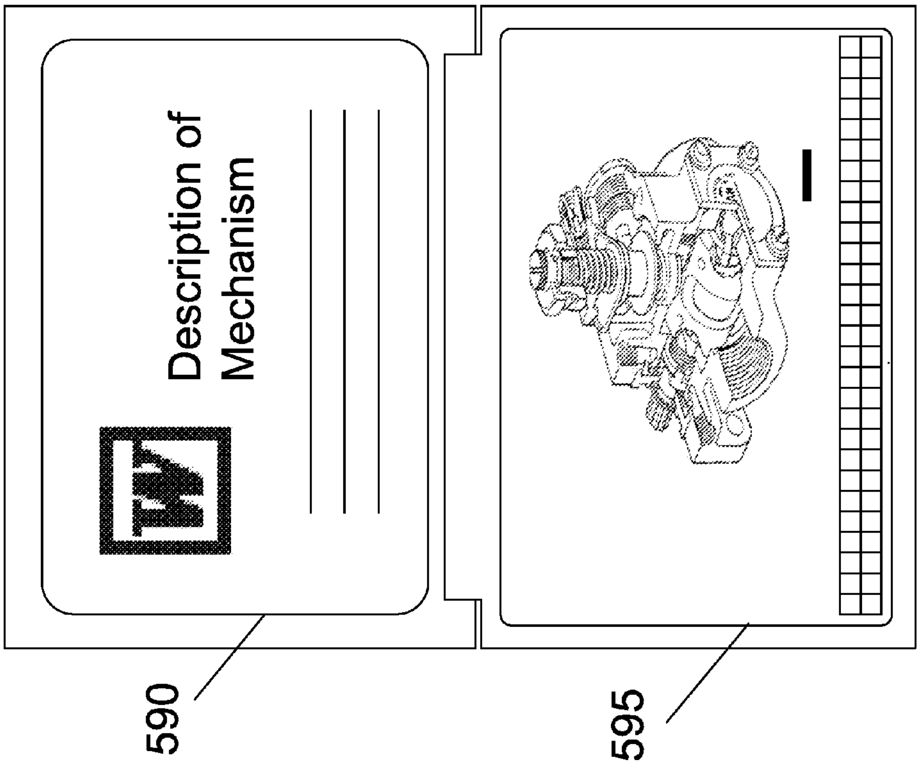
Figure 81:
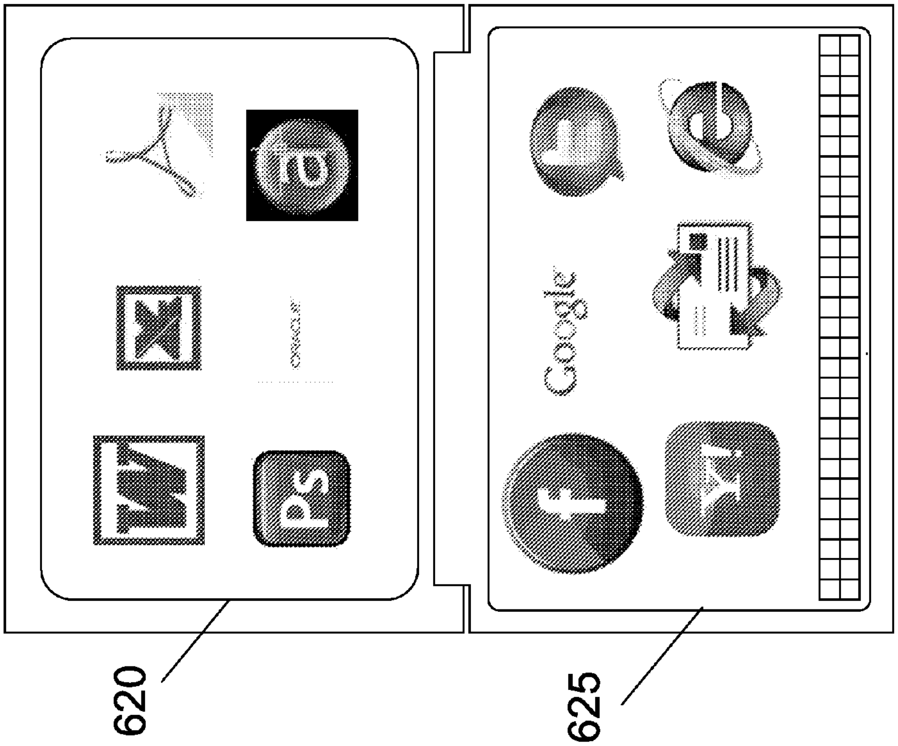

FIG. 78 shows a typical common situation where a user needs to see two documents for the work he or she is doing. The top screen 590 can be displaying a document such as a description of a mechanism, while base unit screen 595 can display a drawing of the mechanism being described. Doing such a task without simultaneously viewing both the document and the drawing may be significantly more difficult and/or inefficient. Another example would be comparing or working on two legal drafts or almost any other two documents related to each other, which is an extremely common situation.

Figure 79:
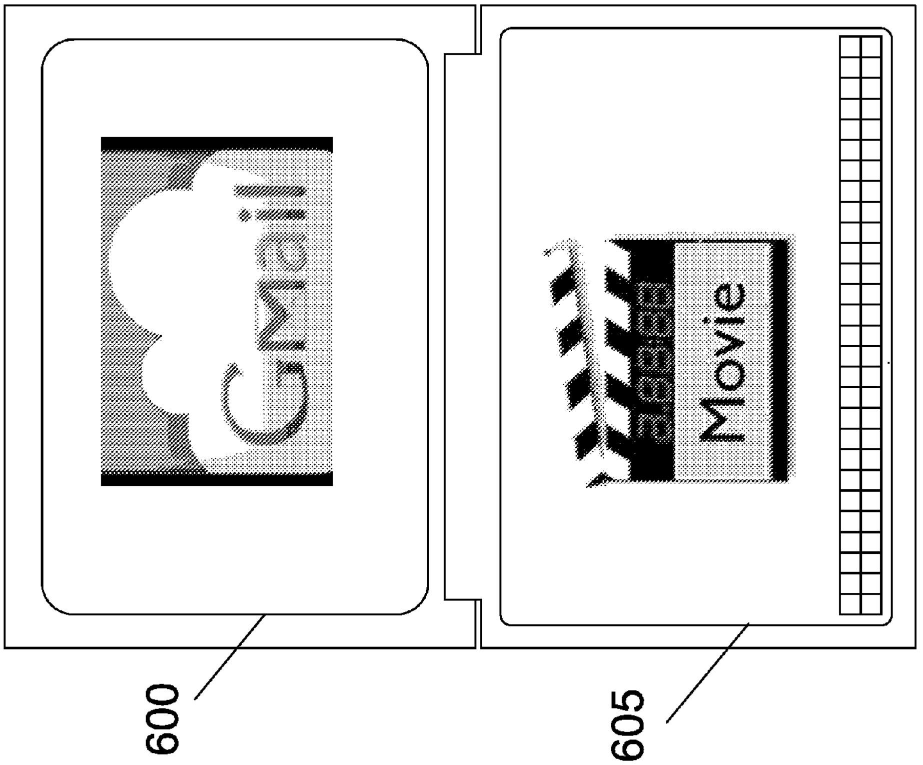

In FIG. 79, a portable computer operating in accordance with any of the above-described embodiments allows a user to check email with Gmail on one screen, such as display unit screen 600, while showing a movie on the second, base unit screen 605.

Figure 80:
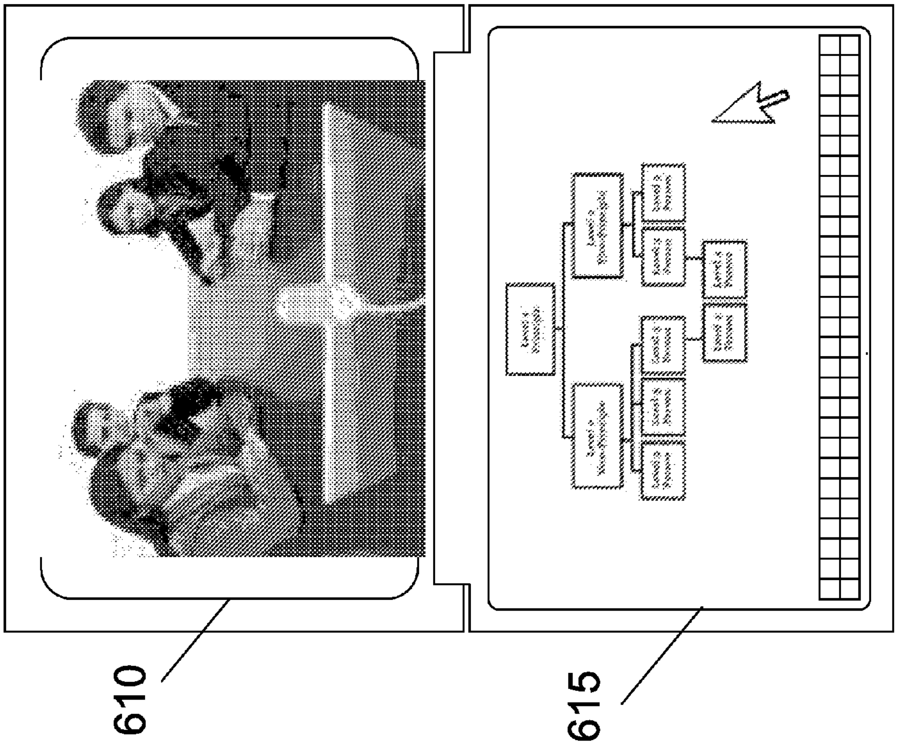

The multitasking capabilities provided by the above-described portable computer arrangement can also be advantageous in videoconferencing application, as illustrated in FIG. 80. Top screen 610 may be used to display a video feed from a remote location, while bottom screen 615 is used to display shared documents that are the subject of discussion on screen 610, thereby facilitating collaborative work via videoconference.

Portable computer embodiments described above may also provide users with different paradigms for desktop organization. For example, in FIG. 81, top screen 620 is used to run applications primarily for the local creation or consumption of content, such as Microsoft Word, Microsoft Excel, Adobe Acrobat, Adobe Photoshop, Oracle and AutoCad in the top screen, while bottom screen 620 is used primarily for Internet-related tasks using Facebook, Google, Tweeter, Yahoo, Outlook and Internet Explorer.

Figure 82:
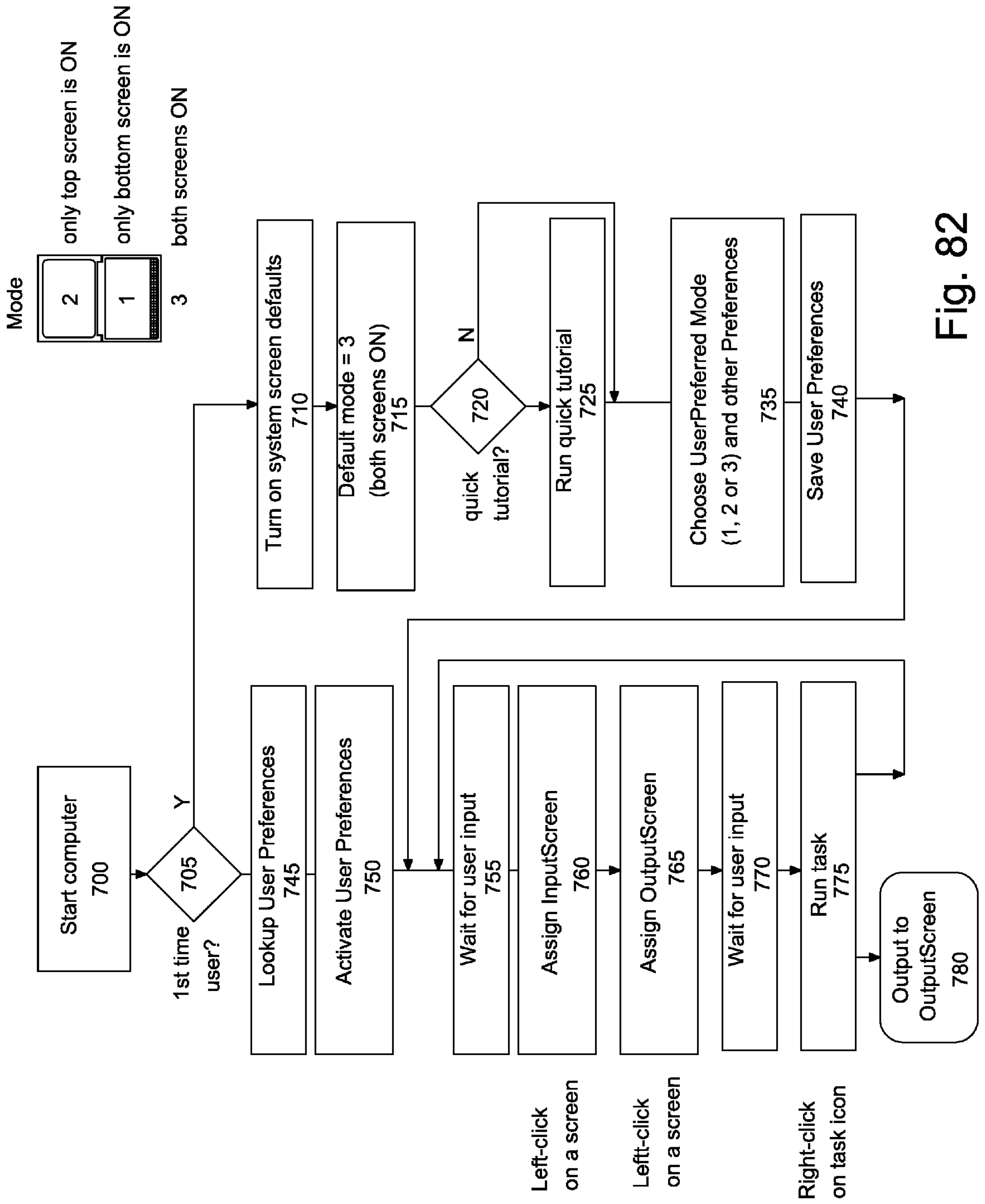
FIG. 82 is a flowchart illustrating an embodiment of a user interface and operating logic for a portable computer.
Figure 84:
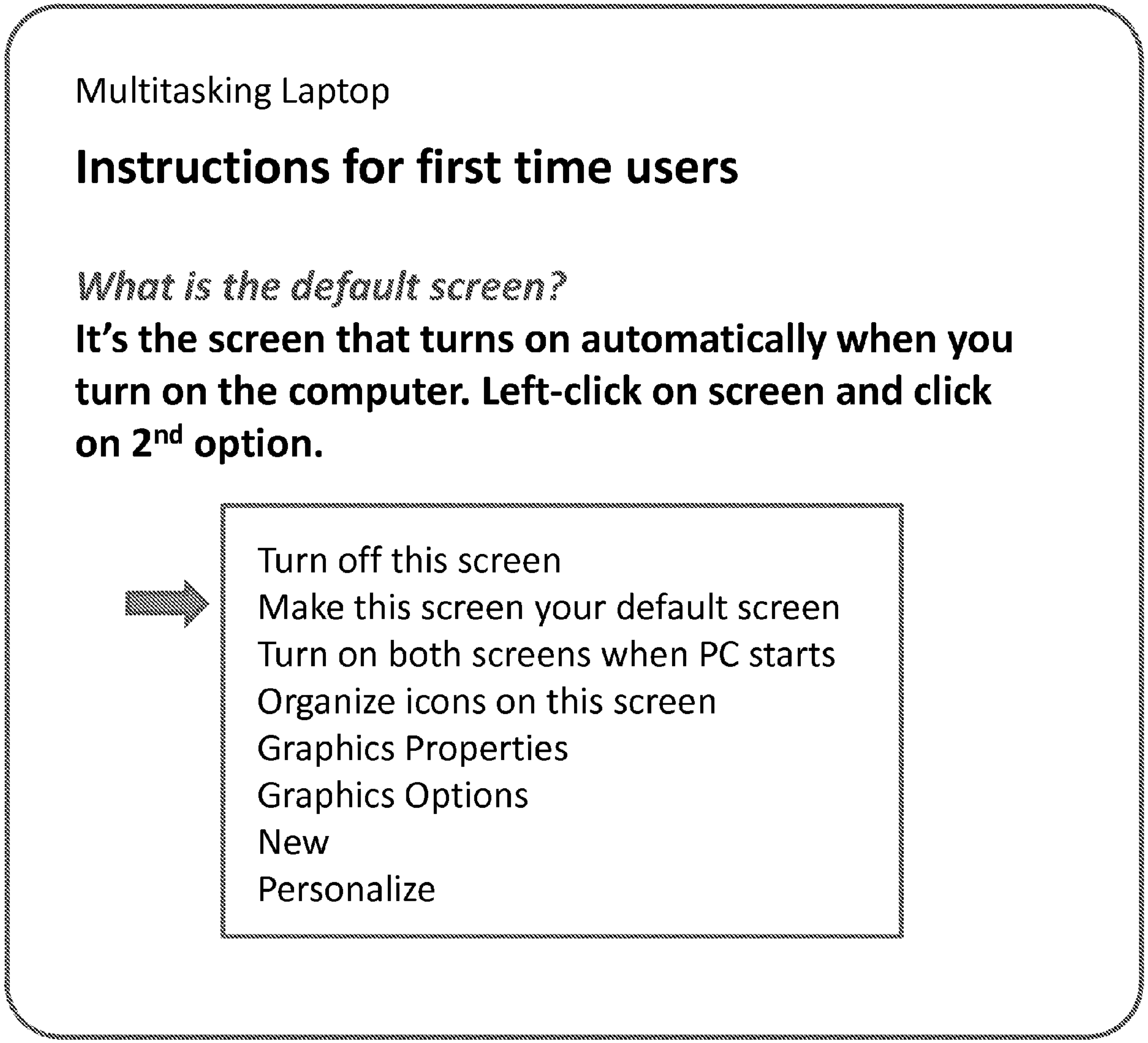
Figure 85:
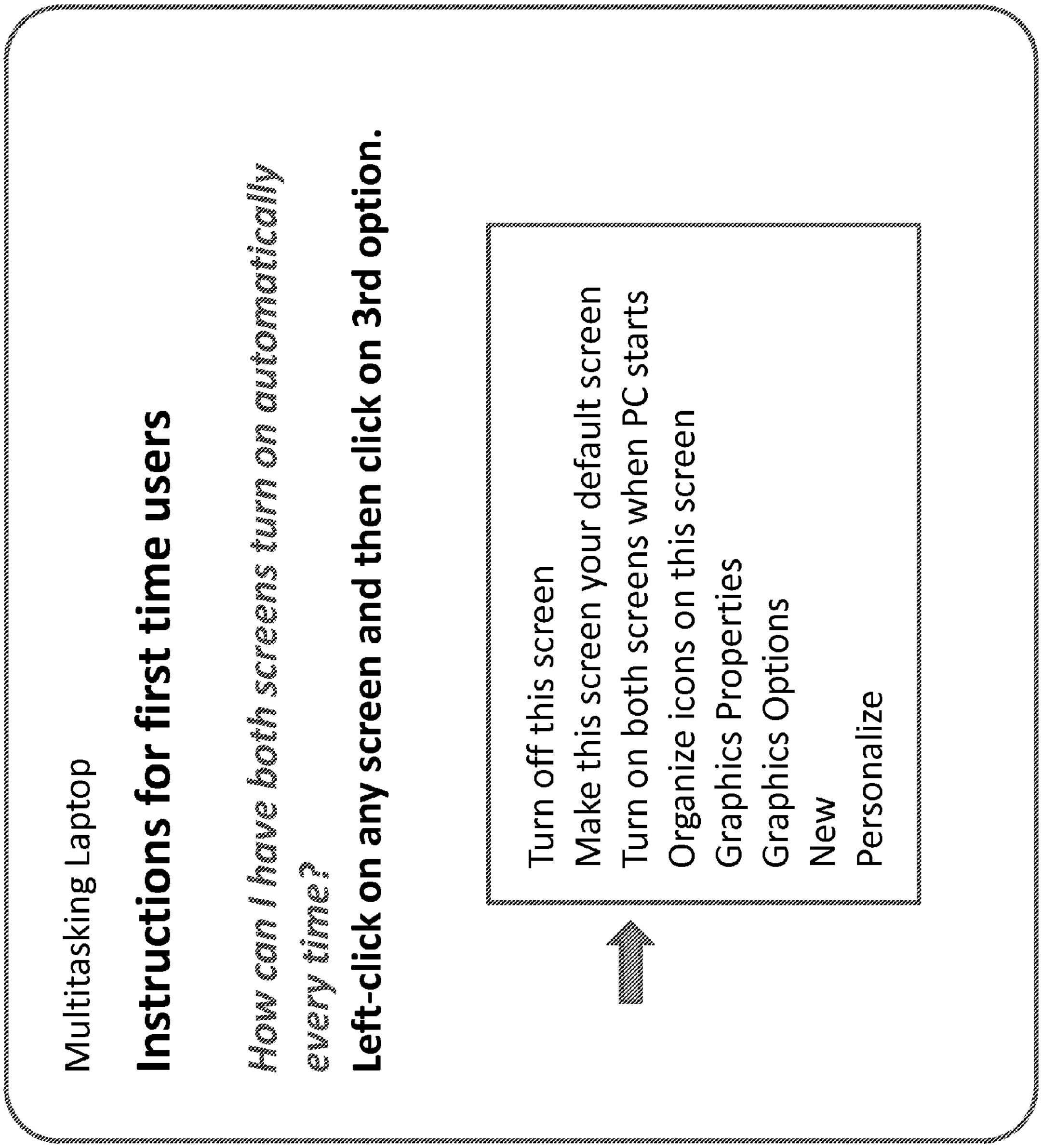

FIG. 82 shows one embodiment of a user interface and operating logic in a multitasking laptop computer of the type described above. The system allows the user to create preferences as to where each task will be executed and displayed. It is a click-based system, wherein a left click can be used to define the current location of the cursor as the current screen (current screen is defined as the screen where video output should be routed to, until superseded by another lick instruction). Therefore, a simple left click on a screen turns it active. A right click can be used at any time to change the status of a screen from active to dormant, or vice versa (an active screen is defined as a screen that is electrically powered on, dormant is a screen that is electrically turned off and is therefore dormant until the user turns it on). A program, task or process can be also be right clicked to assign or re-assign at any time the destination of the video output generated by the execution of that task, program or process. A left click on a task icon triggers the execution of that task, with the output being sent to the screen defined as current screen. The user can also drag icons from screen to screen, which automatically links any video output generated by a click on that icon to the screen where the icon is located (until superseded by the user). Ideally the implementation of the multitasking laptop should be done with a modified Operating System, which incorporates support for the multiple features of this invention. Most of the changes needed for the new modified Operating System can be achieved by creation of new addresses linked to tasks and processes, and redirection of output intended for the console to the device (LCD0 or LCD1) identified by the address information linked to the task. In other words video output needs to be tagged with the address where it should be displayed.

While a new modified Operating System is the ideal way to implement this invention, it is also possible to implement it based on a software plug-in or set of redirection subroutines.

In the embodiment of FIG. 82, at step 700, a multitasking portable computer, such as one of the embodiments described herein, is started up. In step 705, the computer determines whether a user is a first time (i.e. unconfigured) user of the system. If so, system defaults values for screen utilization are activated (step 710). In particular, a mode of operation is assigned. There are three possible modes of operation, as shown on the top of FIG. 61: mode 1 (top screen is on and bottom screen is off), mode 2 (top screen is off and bottom screen is on) and mode 3 (both screens are on). Preferably, machines are initially configured to default to mode 3.

In step 720, the user is asked whether they would like to view a brief tutorial for utilization of the system (step 720). If so, a tutorial is displayed (step 725). Exemplary content for the tutorial of Step 725 is illustrated in FIGS. 83-86. Otherwise, the user is queried about his/her preferences, including without limitation, a preferred mode of operation. Then, the user preferences are saved (step 740).

If it is determined in step 705 that the user is not a first time user, i.e. the user has previously configured preferences, the system operates to recall those preferences (step 745). The active and current screens are then configured according to previously-stored preferences (step 750).

The user preferences are then activated. This includes the preferred mode (for instance, mode 3 activation of both screens), the preferred InputScreen (i.e. where the user prefers to enter input and commands) and the preferred OutputScreen (i.e. where the user prefers to receive the results from the programs he/she executes) (step 750). For instance, a user may select as InputScreen the bottom screen (screen number 1) and as OutputScreen the top screen (screen number 2). Then this user may start a task like a spreadsheet by clicking on an icon on the bottom screen and the spreadsheet will be displayed in the top screen.

In operation, the system awaits user input in Step 755. In steps 760 and 765, the assignment of InputScreen and OutputScreen can be easily changed by the user at any time. The method illustrated in accordance with an exemplary embodiment permits the user to left-click on a screen at any time in order to display a drop-down menu that lets the user redefine preferences with respect to the screens, such as reassign InputScreen, reassign OutputScreen, turn off a screen, turn on a screen, change mode and the like. Those assignments are shown in steps 760 and 765.

In step 775, the user triggers a task, typically by clicking on an icon that represents a software package. The results of the execution of that software package are then sent to the currently assigned OutputScreen (step 780). After that, the system loops back to step 755 to await further user input.

What is claimed:

1. A portable computer system comprising:

a display unit and a base unit attached along a first edge via a first display unit hinge structure in a clamshell configuration, whereby a front surface of the base unit and a front surface of the display unit can fold adjacent to one another;

a first display panel mounted within the display unit, the first display panel comprising the majority of surface area of the front surface of the display unit;

a second display panel mounted within the base unit, the second display panel comprising the majority of surface area of the front surface of the base unit;

a viewing angle adjustment mechanism different than the first display unit hinge structure, disposed on a second edge of the second display panel opposite to the first edge attached to the first display unit hinge structure, adapted to allow a user to adjust only the angle of the second display panel by lifting or lowering only a top edge of the second display panel.

2. The portable computer system of claim 1, wherein the angle of said second display panel relative to said base unit can be adjusted between a retracted position and a deployed position.

3. The portable computer system of claim 2, in which:

said viewing angle adjustment mechanism is located along the second edge of said second display unit furthest from said first display unit hinge structure.

4. The portable computer system of claim 2, further comprising an electrically-actuated adjustment mechanism within the base unit acting on the second display panel to rotate the second display panel relative to the base unit.

5. The portable computer system of claim 4, in which the electrically-actuated adjustment mechanism comprises an electric motor.

6. The portable computer system of claim 4, in which the electrically-actuated adjustment mechanism comprises a solenoid.

7. The portable computer system of claim 2, in which said base display hinge comprises a friction hinge, whereby said second display panel can be manually deployed by pushing it and rotating it against the resistance of its friction hinge to the desired position.

8. The portable computer system of claim 2, in which said second display panel can be deployed from or retracted into a recess cavity within said base unit, whereby the second display panel can be stowed away in a retracted flush position with respect to the base unit.

9. The portable computer system of claim 8, in which said base unit comprises a latch mechanism for securing said second display panel in a retracted position.

10. The portable computer system of claim 2, further comprising software executed by a microprocessor within said portable computer system which prevents a portable computer operating system from shutting down unless the second display panel is in said retracted position.

11. The portable computer system of claim 2, further comprising software executed by a microprocessor within said portable computer system which moves said second display panel into said retracted position prior to shutting down.

12. The portable computer of claim 1 in which said viewing angle adjustment mechanism comprises:

a support structure moveable between a stowed position and a deployed position said support structure attached to said base unit via a support structure hinge, said support structure hinge having an axis of rotation parallel with an axis of rotation associated with said display unit hinge structure;

a recess within said base unit within which said support structure recedes when moved into the stowed position;

wherein said support structure extends downwards from the bottom side of said base unit when in the deployed position.

13. The portable computer system of claim 12, in which said support structure comprises a telescoping member, wherein the length of said support structure can be adjusted by a user.

14. The portable computer system of claim 1, in which said viewing angle adjustment mechanism comprises a sliding member which can be linearly extended out of a stowed recess area within said base unit in order to change the tilt angle of the base display unit.

15. The portable computer system of claim 1, further comprising:

a keyboard slidably extendable from or retractable within a recess within said base unit.

16. The portable computer system of claim 1, further comprising:

a third display panel within said base unit, a keyboard overlying said third display panel, the keyboard comprising a plurality of keys having a portion that is at least partially-transparent, such that said third display panel is visible through said plurality of keys.

17. The portable computer system of claim 1, further comprising:

a keyboard overlying at least a portion of the second display panel, the keyboard comprising a plurality of keys having a portion that is at least partially transparent, such that the second display panel is visible through said plurality of keys.

18. The portable computer system of claim 1, further comprising:

a support structure moveable between a stowed position and a deployed position, said support structure attached to said base unit via a support structure hinge, said support structure hinge having an axis of rotation parallel with an axis of rotation associated with said display unit hinge structure;

a recess within said base unit within which said support structure recedes when moved into the stowed position;

wherein said support structure extends downwards from the bottom side of said base unit when in the deployed position.

* * * * *